United States Patent
Yun et al.

(10) Patent No.: US 12,463,353 B2
(45) Date of Patent: Nov. 4, 2025

(54) ELECTRONIC DEVICE INCLUDING ANTENNA

(71) Applicant: Samsung Electronics Co., Ltd., Suwon-si (KR)

(72) Inventors: Sumin Yun, Suwon-si (KR); Soonheung Kwon, Suwon-si (KR); Hosaeng Kim, Suwon-si (KR); Hyungjoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 332 days.

(21) Appl. No.: 18/327,502

(22) Filed: Jun. 1, 2023

(65) Prior Publication Data

US 2023/0361483 A1    Nov. 9, 2023

Related U.S. Application Data

(63) Continuation of application No. PCT/KR2023/006159, filed on May 4, 2023.

(30) Foreign Application Priority Data

May 4, 2022 (KR) .................. 10-2022-0055448
Jun. 20, 2022 (KR) .................. 10-2022-0074793

(51) Int. Cl.
*H01Q 1/24* (2006.01)
*H01Q 9/04* (2006.01)
(Continued)

(52) U.S. Cl.
CPC .......... *H01Q 21/065* (2013.01); *H01Q 1/241* (2013.01); *H01Q 9/0435* (2013.01)

(58) Field of Classification Search
None
See application file for complete search history.

(56) References Cited

U.S. PATENT DOCUMENTS 10,181,657 B2   1/2019   Ai et al.
10,784,566 B1   9/2020   Chang et al.
(Continued)

FOREIGN PATENT DOCUMENTS

JP         2016-208223     12/2016
KR    10-2020-0096633     8/2020
(Continued)

OTHER PUBLICATIONS

Search Report and Written Opinion dated Aug. 14, 2023 issued in International Patent Application No. PCT/KR2023/006159.
(Continued)

*Primary Examiner* — Anh Q Tran
(74) *Attorney, Agent, or Firm* — Nixon & Vanderhye, P.C.

(57) ABSTRACT

According to an example embodiment of the disclosure, an electronic device may include: an antenna array comprising a plurality of antenna elements; a wireless communication circuit configured to perform communication with a signal source outside of the electronic device through the antenna array in an ultra-wideband (UWB); and a processor electrically connected to the wireless communication circuit, wherein the wireless communication circuit is configured to simultaneously radiate a first linearly polarized wave through a first antenna element among the plurality of antenna elements and a second linearly polarized wave through a second antenna element among the plurality of antenna elements, wherein an electric field of the first linearly polarized wave oscillates in a first direction, and wherein an electric field of the second linearly polarized wave oscillates in a second direction at an acute angle with respect to the first direction, and wherein the processor is configured to perform a positioning function with respect to the signal source based on a difference between arrival times
(Continued)

of signals received from the signal source through the first and second antenna elements.

20 Claims, 22 Drawing Sheets

(51) Int. Cl.
*H01Q 21/06* (2006.01)
*H01Q 21/08* (2006.01)

(56) References Cited

U.S. PATENT DOCUMENTS

| | | | |
|---|---|---|---|
| 11,024,972 B2 | 6/2021 | Jang et al. | |
| 11,579,243 B2 | 2/2023 | Mayer et al. | |
| 2019/0097317 A1* | 3/2019 | Di Nallo | H01Q 3/2605 |
| 2020/0021011 A1* | 1/2020 | Cooper | G01S 3/48 |
| 2020/0303833 A1 | 9/2020 | Jeda | |
| 2020/0411986 A1 | 12/2020 | Cooper et al. | |
| 2021/0320417 A1 | 10/2021 | Lee et al. | |
| 2021/0400614 A1* | 12/2021 | Lee | G01S 13/765 |
| 2022/0094053 A1 | 3/2022 | Jiang et al. | |
| 2023/0163469 A1 | 5/2023 | Yun et al. | |
| 2023/0178901 A1 | 6/2023 | Kim et al. | |

FOREIGN PATENT DOCUMENTS

| | | |
|---|---|---|
| KR | 10-2021-0158199 | 12/2021 |
| KR | 10-2022-0012065 | 2/2022 |
| KR | 10-2022-0017131 | 2/2022 |
| KR | 10-2022-0022606 | 2/2022 |
| WO | 2022244978 A1 | 11/2022 |

OTHER PUBLICATIONS

Extended European Search Report dated Jun. 25, 2025 issued in European Patent Application No. 23799723.4.

* cited by examiner

FIG. 3
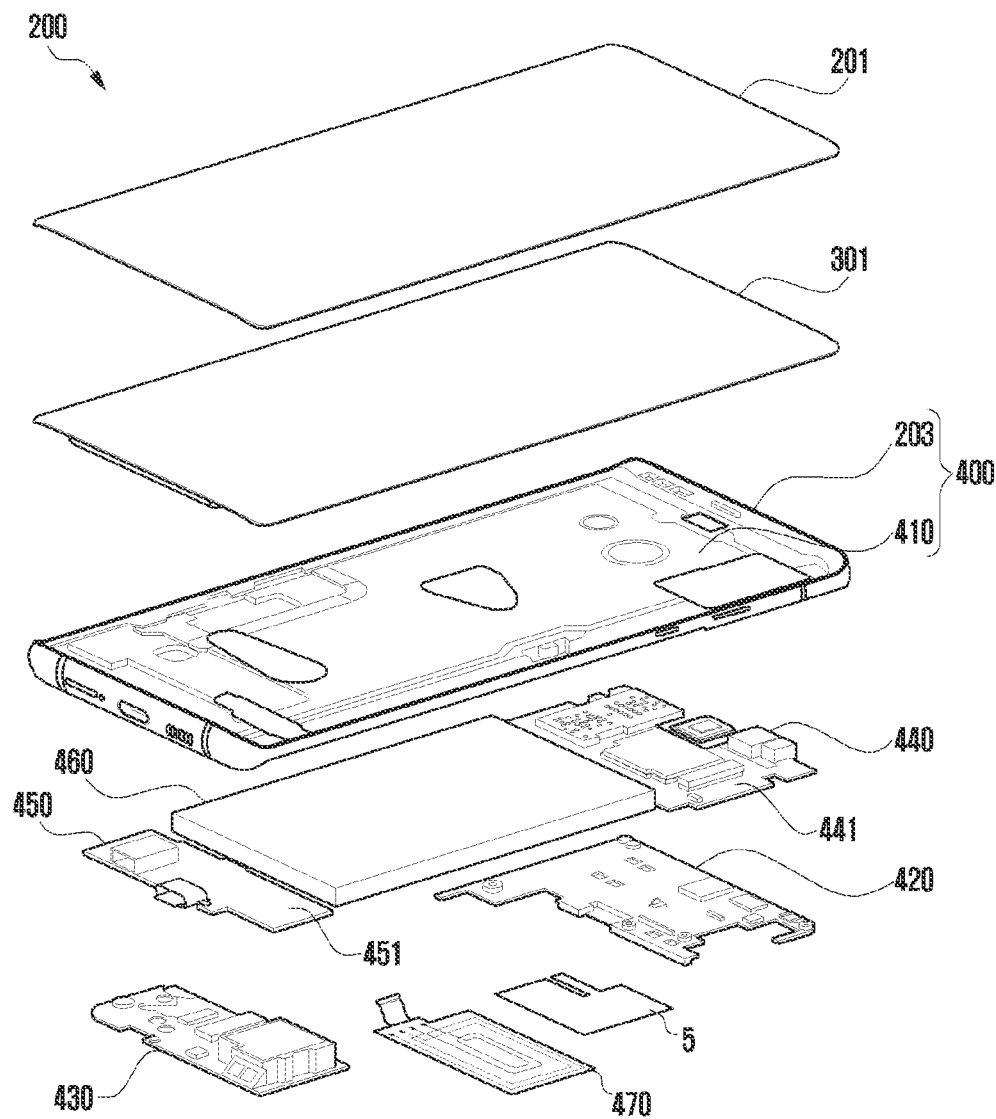
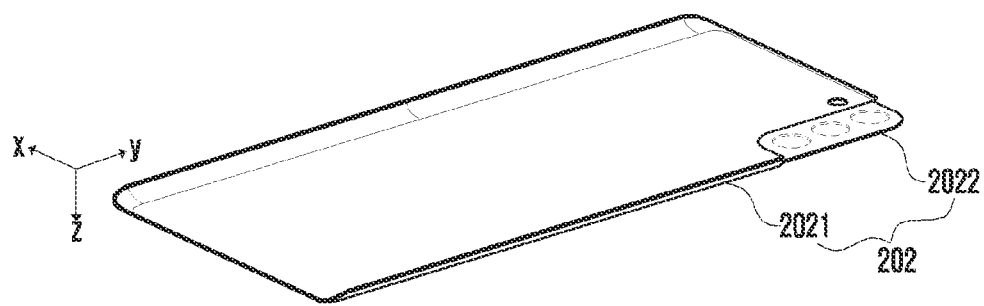

FIG. 19

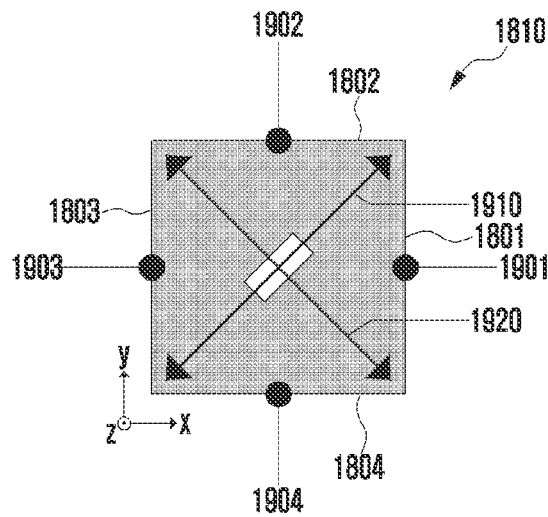

| POWER FEEDING POSITION | POLARIZED WAVE WITH LOW RESONANT FREQUENCY | POLARIZED WAVE WITH HIGH RESONANT FREQUENCY | CIRCULARLY POLARIZED WAVE | DOMINANT LINEARLY POLARIZED WAVE RESONANT FREQUENCY |
|---|---|---|---|---|
| 1901 | SECOND DIAGONAL POLARIZATION COMPONENT | FIRST DIAGONAL POLARIZATION COMPONENT | LHCP | HORIZONTAL POLARIZATION COMPONENT |
| 1902 | SECOND DIAGONAL POLARIZATION COMPONENT | FIRST DIAGONAL POLARIZATION COMPONENT | RHCP | VERTICAL POLARIZATION COMPONENT |
| 1903 | SECOND DIAGONAL POLARIZATION COMPONENT | FIRST DIAGONAL POLARIZATION COMPONENT | LHCP | HORIZONTAL POLARIZATION COMPONENT |
| 1904 | SECOND DIAGONAL POLARIZATION COMPONENT | FIRST DIAGONAL POLARIZATION COMPONENT | RHCP | VERTICAL POLARIZATION COMPONENT |

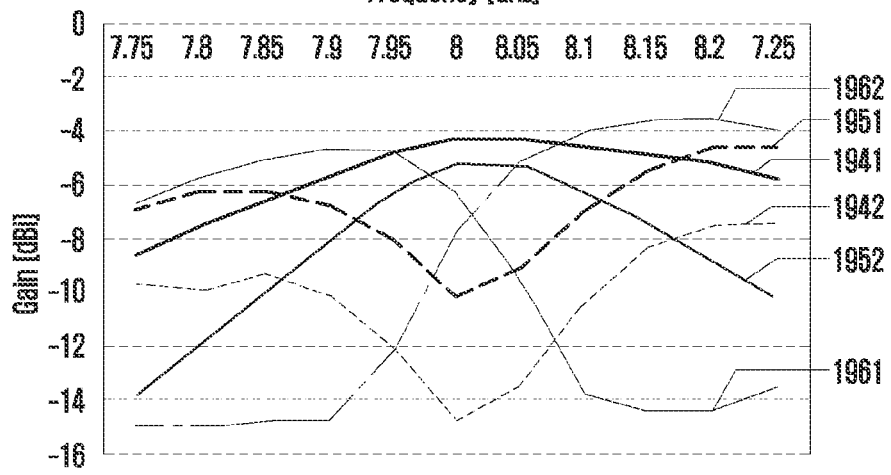

ELECTRONIC DEVICE INCLUDING ANTENNA

CROSS-REFERENCE TO RELATED APPLICATIONS

This application is a continuation of International Application No. PCT/KR2023/006159 designating the United States, filed on May 4, 2023, in the Korean Intellectual Property Receiving Office and claiming priority to Korean Patent Application No. 10-2022-0055448, filed on May 4, 2022, in the Korean Intellectual Property Office, and to Korean Patent Application No. 10-2022-0074793, filed on Jun. 20, 2022, in the Korean Intellectual Property Office, the disclosures of all of which are incorporated by reference herein in their entireties.

BACKGROUND

Field

The disclosure relates to an electronic device including an antenna.

Description of Related Art

An electronic device may support ultra-wideband (UWB). UWB refers to a technology that complies with international standard, IEEE 802.15.4 and may perform communication which is a broadband bandwidth. UWB has been developed as a type of technology for performing positioning using broadband bandwidth with respect to communication in the related art.

The above-mentioned information may be provided as a related art for the purpose of assisting in understanding the disclosure. No argument or decision is raised about whether the above-mentioned contents can be applied to the prior art related to the disclosure.

An electronic device may identify or estimate a position of a signal source using a phase difference between signals received by two antennas. The electronic device may identify a receiving angle of a signal (e.g., a direction of a signal) with respect to a configured axis of the electronic device and identify a distance between the electronic device and the signal source using a positioning method (e.g., an angle of arrival (AOA)). For example, polarized wave characteristics of electromagnetic waves radiated from the electronic device may vary depending on various directions (orientations) in which the electronic device is directed or postures of the electronic device. In case it is difficult to ensure efficiency in receiving radio waves from the signal source because of the polarized wave characteristics, it may be difficult to ensure accuracy and reliability (or quality) in performing positioning.

SUMMARY

Embodiments of the disclosure may provide an electronic device including an antenna, capable of improving communication performance (or radio wave transmitting/receiving performance).

Embodiments of the disclosure may provide an electronic device including an antenna, capable of ensuring accuracy and quality in performing positioning with respect to a signal source even though polarized wave characteristics of a signal transmitted from the signal source vary, directions in which the electronic device is directed vary, or postures of the electronic device vary.

Technical problems addressed by the disclosure are not limited to the above-mentioned technical problems, and other technical problems, which are not mentioned above, may be understood from the following descriptions by those skilled in the art to which the disclosure pertains.

According to an example embodiment of the disclosure, an electronic device may include: an antenna array comprising a plurality of antenna elements; a wireless communication circuit configured to perform communication with a signal source outside of the electronic device through the antenna array in an ultra-wideband (UWB); and a processor electrically connected to the wireless communication circuit, wherein the wireless communication circuit is configured to simultaneously radiate a first linearly polarized wave through a first antenna element among the plurality of antenna elements and a second linearly polarized wave through a second antenna element among the plurality of antenna elements, wherein an electric field of the first linearly polarized wave oscillates in a first direction, and wherein an electric field of the second linearly polarized wave oscillates in a second direction at an acute angle with respect to the first direction, and wherein the processor is configured to perform a positioning function with respect to the signal source based on a difference between arrival times of signals received from the signal source through the first and second antenna elements.

According to an example embodiment of the disclosure, an electronic device may include: an antenna array comprising a plurality of antenna elements; a wireless communication circuit configured to perform communication with a signal source outside of the electronic device through the antenna array in an ultra-wideband (UWB); and a processor electrically connected to the wireless communication circuit, wherein the wireless communication circuit is configured to simultaneously radiate a first circularly polarized wave and a first linearly polarized wave through a first antenna element among the plurality of antenna and a second linearly polarized wave through a second antenna element among the plurality of antenna elements, wherein the first circularly polarized is included in a first frequency band of the UWB, wherein the first linearly polarized wave and the second linearly polarized wave is included in a second frequency band of the UWB at least partially different from or wider than first frequency band, wherein the first linearly polarized wave has more dominant electric field in the second frequency band than the first circularly polarized wave, wherein the first linearly polarized wave and the second linearly polarized wave have a same polarization direction in which an electric field oscillates, and wherein the processor is configured to perform a positioning function with respect to the signal source using the first linearly polarized wave and the second linearly polarized wave in the second frequency band.

An electronic device an including antenna according to various example embodiments of the disclosure may improve the communication performance (or the radio wave transmitting/receiving performance). For example, the electronic device including an antenna according to the disclosure may perform positioning with respect to the signal source and easily ensure accuracy and quality in performing the positioning even though the polarized wave characteristics of a signal transmitted from the signal source vary, the directions in which the electronic device is directed vary, or the postures of the electronic device vary.

Other effects, which may be obtained or expected by the various example embodiments of the disclosure, will be directly or implicitly disclosed in the detailed description below.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 3 and 4 are exploded perspective views of the electronic device according to various embodiments;

FIG. 19 is a table illustrating radiation characteristics related to the antenna element according to the antenna element in FIG. 18 according to various embodiments and a power feeding position of the antenna element, and a graph illustrating gains for respective polarized waves when power is supplied to a first or third position according to various embodiments;

DETAILED DESCRIPTION

Hereinafter, various example embodiments of the disclosure disclosed herein will be described in greater detail below with reference to the accompanying drawings.

Figure 1:
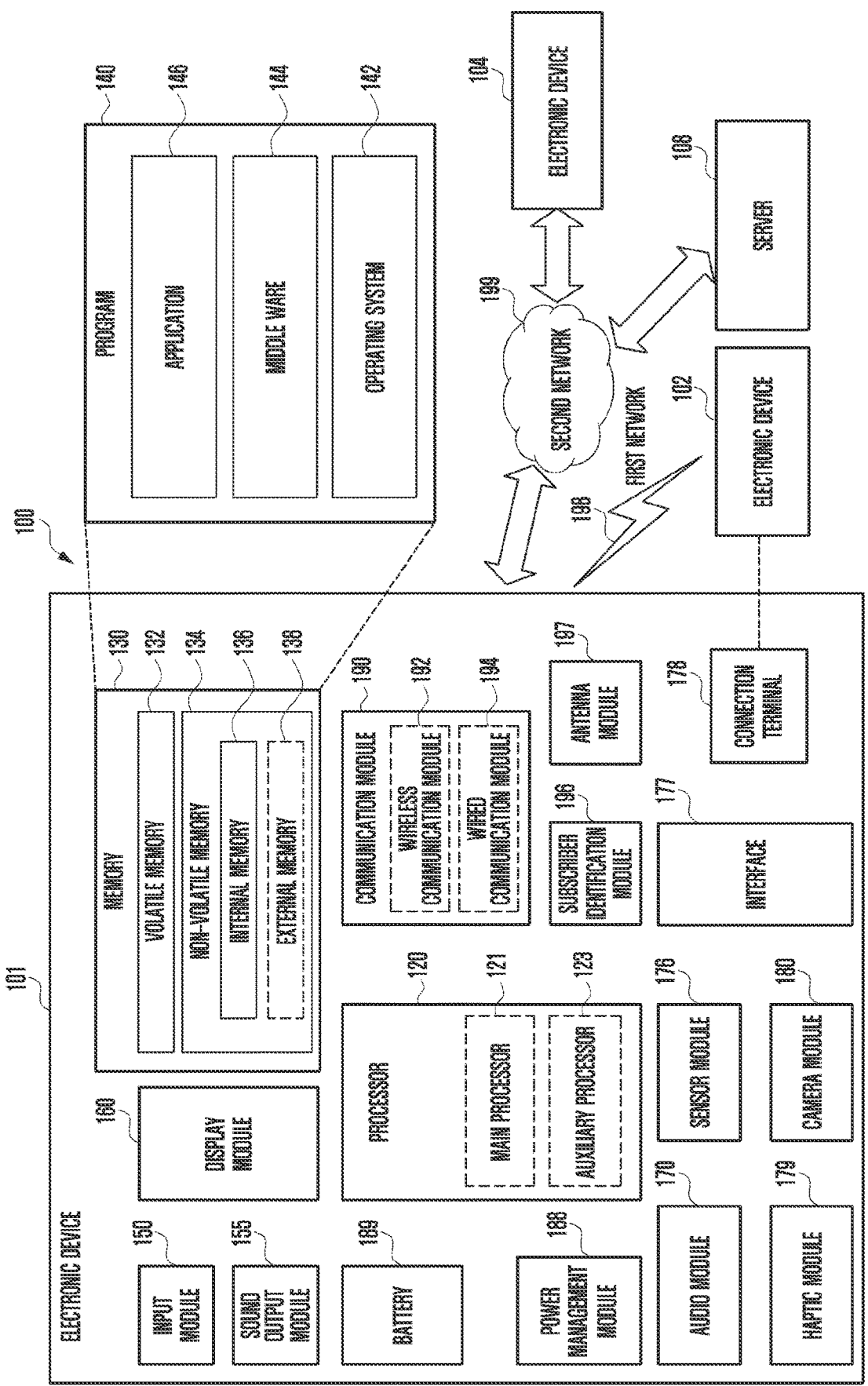
FIG. 1 is a block diagram illustrating an example electronic device in a network environment according to various embodiments.

FIG. 1 is a block diagram illustrating an example electronic device 101 in a network environment 100 according to various embodiments.

With reference to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In various embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5$^{th}$ generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In an embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
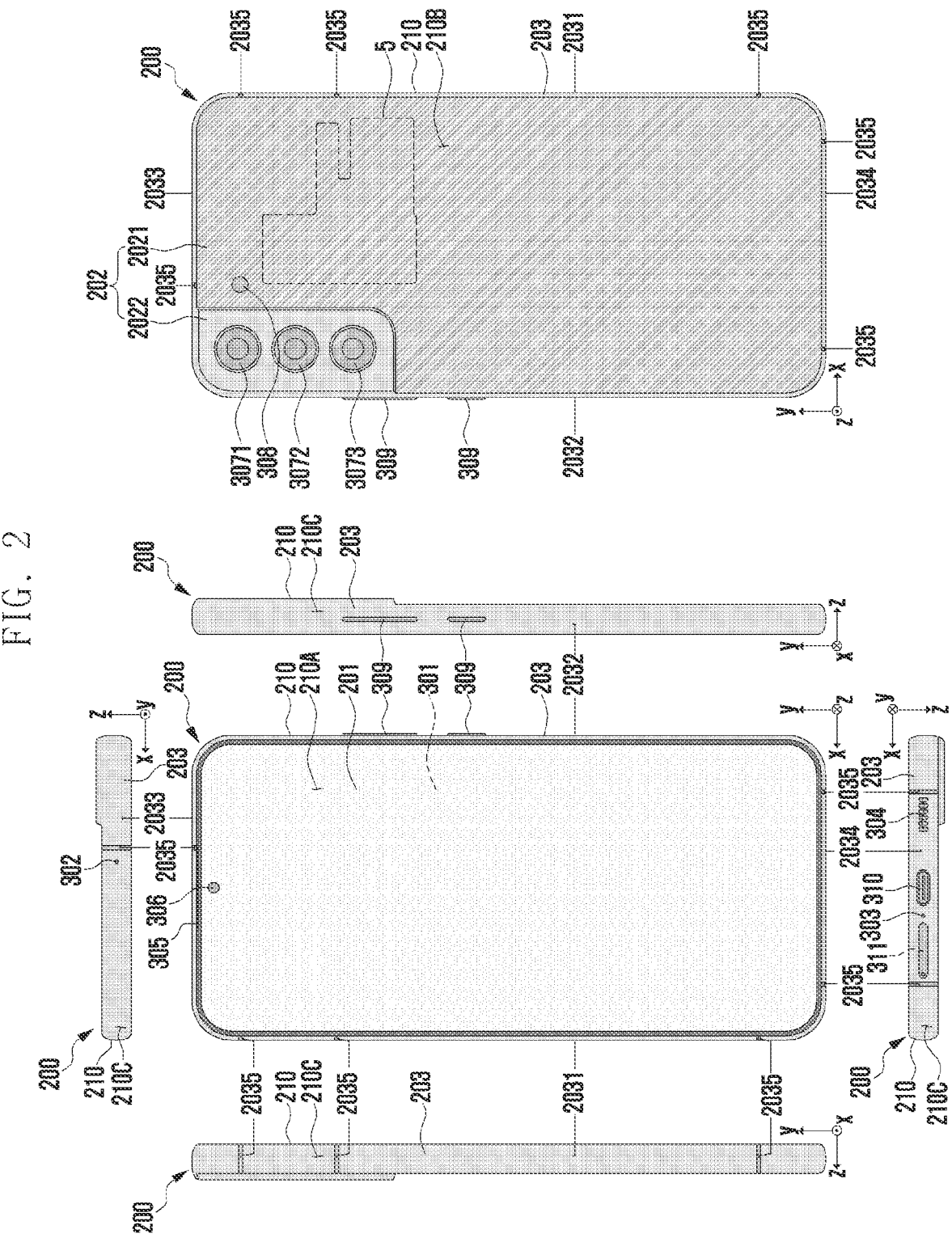
FIG. 2 is a diagram illustrating various views of the electronic device according to various embodiments.

FIG. 2 is a diagram illustrating various views of an electronic device 200 according to various embodiments.

For convenience of description, in various embodiments of the disclosure, a surface in a direction (e.g., a −z-axis direction) in which a display module 301 included in the electronic device 200 is visually exposed (e.g., visible) is defined as a front surface and used, and a surface in a direction (e.g., a +z-axis direction) opposite to the above-mentioned direction is defined as a rear surface and used. As used herein, the terms "exposed", "visually exposed", "visible", or the like may be used interchangeably and include an arrangement wherein the display module 301 may include a cover glass, protective plate, or the like.

With reference to FIG. 2, the electronic device 200 (e.g., the electronic device 101 in FIG. 1) may include a housing 210. For example, the housing 210 may provide a front surface 210A of the electronic device 200, a rear surface 210B of the electronic device 200, and a side surface 210C of the electronic device 200. In any embodiment, the housing 210 may be referred to as a structure including at least some of the front surface 210A, the rear surface 210B, and the side surface 210C. In an embodiment, the housing 210 may include a front surface plate (or a first plate) 201, a rear surface plate (or a second plate) 202, and/or a lateral member (or a side surface bezel structure, a sidewall portion, or a side surface portion) 203. The front surface 210A of the electronic device 200 may be provided by the front surface plate 201. At least a part of the front surface plate 201 may be substantially transparent. For example, the front surface plate 201 may include a glass or polymer plate including various coating layers. The rear surface 210B of the electronic device 200 may be provided by the rear surface plate 202. The rear surface plate 202 may be substantially opaque. For example, the rear surface plate 202 may be made of coated or colored glass, ceramic, polymer, metal (e.g., aluminum, stainless steel (STS), or magnesium), or a combination of at least two of the above-mentioned materials. The lateral member 203 may be coupled to the front surface plate 201 and the rear surface plate 202 and provide the side surface 210C of the electronic device 200. The lateral member 203 may include metal and/or polymer.

According to an embodiment, the rear surface plate 202 may include a first rear surface plate 2021 and a second rear surface plate 2022. The first rear surface plate 2021 may provide a partial area of the rear surface 210B of the electronic device 200, and the second rear surface plate 2022 may provide another partial area of the rear surface 210B of the electronic device 200. The second rear surface plate 2022 may be positioned while corresponding to a plurality of rear surface camera modules 3071, 3072, and 3073 and connected to the first rear surface plate 2021 and the lateral member 203.

According to an embodiment, it is possible to provide an integrated structure or member including the second rear surface plate 2022 and the lateral member 203.

According to various embodiments, it is possible to provide the integrated rear surface plate including the first rear surface plate 2021 and the second rear surface plate 2022.

According to an embodiment, the lateral member 203 may include a first side surface portion (or a first sidewall, a first sidewall portion, a first bezel, or a first bezel portion) 2031, a second side surface portion (or a second sidewall, a second sidewall portion, a second bezel, or a second bezel portion) 2032, a third side surface portion (or a third sidewall, a third sidewall portion, a third bezel, or a third bezel portion) 2033, and/or a fourth side surface portion (or a fourth sidewall, a fourth sidewall portion, a fourth bezel, or a fourth bezel portion) 2034. When viewed from above the front surface plate 201 (e.g., when viewed in the +z-axis direction), the first side surface portion 2031 may be positioned to be spaced apart from the second side surface portion 2032 in the +x-axis direction, and the first side surface portion 2031 may be substantially parallel to the second side surface portion 2032. The first side surface portion 2031 may provide a first side surface of the side surface 210C that corresponds to the +x-axis direction of the electronic device 200. The second side surface portion 2032 may provide a second side surface of the side surface 210C that corresponds to the −x-axis direction of the electronic device 200. The third side surface portion 2033 may connect one end of the first side surface portion 2031 and one end of the second side surface portion 2032. The fourth side surface portion 2034 may connect the other end of the first side surface portion 2031 and the other end of the second side surface portion 2032. When viewed from above the front surface plate 201, the third side surface portion 2033 may be positioned to be spaced apart from the fourth side surface portion 2034 in a +y-axis direction, and the third side surface portion 2033 may be substantially parallel to the fourth side surface portion 2034. The third side surface portion 2033 may provide a third side surface of the side surface 210C that corresponds to the +y-axis direction of the electronic device 200. The fourth side surface portion 2034 may provide a fourth side surface of the side surface 210C that corresponds to a −y-axis direction of the electronic device 200. A corner at which the first side surface portion 2031 and the third side surface portion 2033 are connected may be implemented in a smooth curved shape, a corner at which the first side surface portion 2031 and the fourth side surface portion 2034 are connected may be implemented in a smooth curved shape, a corner at which the second side surface portion 2032 and the third side surface portion 2033 are connected may be implemented in a smooth curved shape, and/or a corner at which the second side surface portion 2032 and the fourth side surface portion 2034 are connected may be implemented in a smooth curved shape.

According to an embodiment, the lateral member 203 may include a plurality of insulation portions 2035, and a plurality of conductive portions separated by the plurality of insulation portions 2035. The side surface 210C of the electronic device 200 may be provided by the plurality of conductive portions and the plurality of insulation portions 2035. The side surface 210C of the electronic device 200 may include first areas provided by the plurality of conductive portions included in the lateral member 203. The side surface 210C may include second areas provided by the plurality of insulation portions 2035 included in the lateral member 203. The first and second areas of the side surface 210C may be connected smoothly without a substantial height difference. The plurality of conductive portions included in the lateral member 203 may be referred to as various terms a 'side surface conductive structure', a 'side surface metal structure', an 'outer conductive structure', an 'outer metal structure', a 'side surface conductor', a 'side surface metal body, an 'outer conductor', or an 'outer metal body' of the electronic device 200.

According to an embodiment, the electronic device 200 may include at least one of the display module 301, a first audio module, a second audio module, a third audio module, a fourth audio module, a sensor module, a front surface camera module 306, a plurality of rear surface camera modules (e.g., the first rear surface camera module 3071, the second rear surface camera module 3072, and the third rear surface camera module 3073), a light-emitting module 308, an input module 309, a first connection terminal module 310, a second connection terminal module 311, and/or a second antenna structure 5. In any embodiment, the electronic device 200 may exclude at least one of the elements or further include other elements.

For example, a display area (e.g., a screen display area or an active area) of the display module 301 may be visually exposed (e.g., visible) through the front surface plate 201. In an embodiment, the electronic device 200 may be implemented so that the display area, which is visible through the front surface plate 201, may be shown as widely as possible (e.g., a large screen or a full screen). For example, the display module 301 may be implemented to have an outer peripheral shape approximately identical to an outer peripheral shape of the front surface plate 201. In an embodiment, the display module 301 may include a touch detection circuit. In any embodiment, the display module 301 may include a pressure sensor capable of measuring intensity (pressure) of touch. In any embodiment, the display module 301 may be coupled to a digitizer (e.g., an electromagnetic induction panel) configured to detect an electronic pen (e.g., a stylus pen) using a magnetic field. Alternatively, the display module 301 may be positioned adjacent to the digitizer. In any embodiment, the display module 301 may include the digitizer.

For example, the first audio module may include a first microphone positioned in the electronic device 200 while corresponding to a first microphone hole 302 provided in the side surface 210C of the electronic device 200. The first microphone hole 302 may be provided in the side surface 210C of the electronic device 200, e.g., the third side surface portion 2033 of the lateral member 203. For example, the second audio module may include a second microphone positioned in the electronic device 200 while corresponding to a second microphone hole 303 provided in the side surface 210C of the electronic device 200. The second microphone hole 303 may be provided in the side surface 210C of the electronic device 200, e.g., the fourth side surface portion 2034 of the lateral member 203. The position or number of audio modules including the microphone may be variously implemented without being limited to the illustrated example. As another example, the electronic device 200 may include a microphone hole provided in the rear surface 210B of the electronic device 200, and a microphone positioned in the electronic device 200 while corresponding to the microphone hole. In any embodiment, the electronic device 200 may include a plurality of microphones used to detect a direction of sound.

For example, the third audio module may include a first speaker positioned in the electronic device 200 while corresponding to a first speaker hole 304 provided in the side surface 210C of the electronic device 200. The first speaker hole 304 may be provided in the side surface 210C of the electronic device 200, e.g., a fourth side surface provided by the fourth side surface portion 2034 of the lateral member 203. For example, the fourth audio module may include a second speaker positioned in the electronic device 200 while corresponding to a second speaker hole 305 provided in the front surface 210A of the electronic device 200. The second speaker hole 305 may include a notched opening provided in the front surface plate 201 and disposed between the front surface plate 201 and the first side surface portion 2031. In an embodiment, the second speaker may include a receiver for phone calls, and the second speaker hole may be referred to as a receiver hole. The position or number of third or fourth audio modules may be variously implemented without being limited to the illustrated example. In any embodiment, the microphone hole and the speaker hole may each be provided in the form of a single hole. In any embodiment, the third or fourth audio module may include a piezoelectric speaker that has no speaker hole.

For example, the sensor module may generate electrical signals or data values corresponding to an internal operating state of the electronic device 200 or an external environment state. In an embodiment, the sensor module may include an optical sensor positioned in the electronic device 200 while corresponding to the front surface 210A of the electronic device 200. For example, the optical sensor may include a proximity sensor or an illuminance sensor. The optical sensor may be aligned with an opening provided in the display module 301. External light may reach the optical sensor through openings of the front surface plate 201 and the display module 301. In any embodiment, the optical sensor may be positioned on a rear surface of the display module 301 or positioned below (or beneath) the display module 301. The optical sensor may perform relevant functions in a state in which the position of the optical sensor is not visually distinguished (or exposed). In any embodiment, the optical sensor may be positioned to be aligned with a recess provided in the rear surface of the display module 301. The optical sensor may be disposed to overlap at least a part of a screen (or a display area) and perform a sensing function without being visually exposed. In this case, a partial area of the display module 301, which at least partially overlaps the optical sensor, may include a pixel structure and/or a wiring structure different from those in another area. For example, a partial area of the display module 301, which at least partially overlaps the optical sensor, may have a pixel density different from that in another area. In any embodiment, a plurality of pixels may not be disposed in the partial area of the display module 301 that at least partially overlaps the optical sensor. In any embodiment, the electronic device 200 may include a biosensor (e.g., a fingerprint sensor) positioned on the rear surface of the display module 301 or positioned below the display module 301. The biosensor may be implemented as an optical sensor, an electrostatic sensor, or an ultrasonic sensor. The position or number of biosensors may be variously implemented. The electronic device 200 may further include various other sensor modules, for example, at least one of a gesture sensor, a gyro sensor, an atmospheric pressure sensor, a magnetic sensor, an acceleration sensor, a grip sensor, a color sensor, an infrared (IR) sensor, a temperature sensor, or a humidity sensor.

For example, the front surface camera module 306 may be positioned in the electronic device 200 while corresponding to the front surface 210A of the electronic device 200. For example, the plurality of rear surface camera modules 3071, 3072, and 3073 may be positioned in the electronic device 200 while corresponding to the rear surface 210B of the electronic device 200. When viewed from above the rear surface 210B of the electronic device 200 (e.g., when viewed in the −z-axis direction), the plurality of rear surface camera modules 3071, 3072, and 3073 may be positioned to be closer to the second side surface portion 2032 than the first side surface portion 2031 and positioned to be closer to the third side surface portion 2033 than the fourth side surface portion 2034. In an embodiment, when viewed from above the rear surface 210B of the electronic device 200, the plurality of rear surface camera modules 3071, 3072, and 3073 may be arranged in a direction (e.g., the −y-axis direction) from the third side surface portion 2033 toward the fourth side surface portion 2034. The front surface camera module 306 and/or the rear surface camera module 3071, 3072, or 3073 may include one or more lenses, an image sensor, and/or an image signal processor. The position or number of camera modules may be variously implemented without being limited to the illustrated example.

According to an embodiment, the display module 301 may include an opening aligned with the front surface camera module 306. External light may reach the front surface camera module 306 through the openings of the front surface plate 201 and the display module 301. The opening of the display module 301, which is aligned with or overlaps the front surface camera module 306, may be provided in the form of a hole. In any embodiment, the opening of the display module 301, which is aligned with or overlaps the front surface camera module 306, may be provided in the form of a notch. In any embodiment, the front surface camera module 306 may be positioned on the rear surface of the display module 301 or positioned below (or beneath) the display module 301. The front surface camera module 306 may perform the relevant functions (e.g., a function of capturing an image) in the state in which the position of the front surface camera module 306 is not visually distinguished (or exposed). For example, the front surface camera module 306 may include a display rear surface camera (e.g., an under display camera (UDC)). In any embodiment, the front surface camera module 306 may be positioned to be aligned with the recess provided in the rear surface of the display module 301. The front surface camera module 306 may be disposed to overlap at least a part of the screen (or the display area) may obtain an image of an external subject without being visually exposed to the outside. In this case, a partial area of the display module 301, which at least partially overlaps the front surface camera module 306, may include a pixel structure and/or a wiring structure different from those in another area. For example, a partial area of the display module 301, which at least partially overlaps the front surface camera module 306, may have a pixel density different from that in another area. The pixel structure and/or the wiring structure, which are disposed in the partial area of the display module 301, which at least partially overlaps the front surface camera module 306, may reduce a loss of light between the outside and the front surface camera module 306. In any embodiment, no pixel may be disposed in the partial area of the display module 301 that at least partially overlaps the front surface camera module 306. In any embodiment, the electronic device 200 may further include a light-emitting module (e.g., a light source) positioned in the electronic device 200 while corresponding to the front surface 210A of the electronic device 200. For example, the light-emitting module may provide information on a state of the electronic device 200 in the form of light. In any embodiment, the light-emitting module may provide a light source that operates in conjunction with an operation of the front surface camera module 306. For example, the light-emitting module may include an LED, an IR LED, or a xenon lamp.

According to an embodiment, the second rear surface plate 2022 may be positioned while corresponding to the plurality of rear surface camera modules 3071, 3072, and 3073. The second rear surface plate 2022 may include a plurality of openings corresponding to the plurality of rear surface camera modules 3071, 3072, and 3073 in a one-to-one manner. The plurality of rear surface camera modules 3071, 3072, and 3073 may be positioned while penetrating the plurality of openings of the second rear surface plate 2022. In any embodiment, the second rear surface plate 2022 may provide substantially transparent light transmission areas that are substituted for the plurality of openings corresponding to the plurality of rear surface camera modules 3071, 3072, and 3073. In an embodiment, the plurality of rear surface camera modules 3071, 3072, and 3073 may have different attributes (e.g., angles of view) or functions and include a dual or triple camera, for example. The plurality of rear surface camera modules 3071, 3072, and 3073 may include a plurality of camera modules including lenses having different angles of view. The electronic device 200 may be implemented to change the angles of view of the camera modules used by the electronic device 200 on the basis of a user's selection. The plurality of rear surface camera modules 3071, 3072, and 3073 may include at least one of a wide-angle camera, a telephoto camera, a color camera, a monochrome camera, and an infrared (IR) camera (e.g., a TOF (time of flight) camera or a structured light camera). In any embodiment, the IR camera may operate as at least a part of the sensor module.

According to an embodiment, the first rear surface plate 2021 may include an opening corresponding to the light-emitting module 308. The light-emitting module 308 may be positioned while penetrating the opening of the first rear surface plate 2021. In any embodiment, the first rear surface plate 2021 may provide substantially transparent light transmission areas that are substituted for the opening corresponding to the light-emitting module 308. The light-emitting module 308 may include a light source (e.g., a flash) for the plurality of rear surface camera modules 3071, 3072, and 3073. For example, the light-emitting module 308 may include an LED or a xenon lamp.

For example, the input module 309 may include one or more key input devices. The one or more key input devices may be positioned in an opening provided in the side surface 210C of the electronic device 200 (e.g., the side surface 210C of the electronic device 200, e.g., the second side surface portion 2032 of the lateral member 203). In any embodiment, the electronic device 200 may not include some or all the key input devices, and the excluded key input device may be implemented as a soft key using the display module 301. The position or number of input modules 309 may be variously implemented. In any embodiment, the input module 309 may include at least one sensor module.

For example, the first connection terminal module (e.g., a first connector module or a first interface terminal module) 310 may include a first connector (or a first interface terminal) positioned in the electronic device 200, and a first connector hole provided in the side surface 210C of the electronic device 200 while corresponding to the first connector. The first connector hole may be provided in the side surface 210C of the electronic device 200, e.g., the fourth side surface portion 2034 of the lateral member 203. The electronic device 200 may transmit and/or receive power and/or data to and/or from an external electronic device electrically connected to the first connector. In an embodiment, the first connector may include a universal serial bus (USB) connector or a high-definition multimedia interface (HDMI) connector. In any embodiment, the electronic device 200 may further include other connection terminal modules including audio connectors (e.g., a headphone connector or an earset connector). The second connection terminal module (e.g., a second connector module or a second interface terminal module) 311 may serve to mount an external storage medium (e.g., an SIM card or a memory card) on the electronic device 200. For example, the second connection terminal module 311 may include a second connector (or a second interface terminal) positioned in the electronic device 200, and a second connector hole provided in the side surface 210C of the electronic device 200 while corresponding to the second connector. The second connector hole may be provided in the side surface 210C of the electronic device 200, e.g., the fourth side surface portion 2034 of the lateral member 203. The second connection terminal module 311 may include a cover positioned in (e.g., fitted into) the second connector hole and configured to define a part of the side surface 210C of the electronic device 200. In an embodiment, the second connection terminal module 311 may include a tray (or an adapter) (e.g., an SIM tray) configured to electrically or mechanically connect the external storage medium to the second connector. The external storage medium may be disposed on the tray and inserted into the second connector hole. The external storage medium may be electrically connected to the second connector. In any embodiment, the tray may be connected to the cover. The position or number of connection terminal modules may be variously implemented without being limited to the illustrated example.

According to an embodiment, the second antenna structure 5 may be provided in the form of a film (e.g., flexible printed circuit board) including a first surface directed toward the first rear surface plate 2021 and facing the first rear surface plate 2021, and a second surface positioned opposite to the first surface and directed toward the front surface plate 201. A processor (e.g., the processor 120 in FIG. 1) electrically connected to a wireless communication circuit (e.g., the wireless communication module 192 in FIG. 1) may perform a positioning function with respect to a signal source (e.g., a responder, a transmitter, or a Tx (transmitter) device) using the second antenna structure 5. The processor may perform positioning (e.g., AOA) for measuring an angle or positioning (ranging) for measuring a distance. In an embodiment, the processor may identify (or estimate) a distance between the electronic device 200 and the signal source using one or more antenna elements (or antenna radiators) (e.g., a first antenna element, a second antenna element, and/or a third antenna element) included in the second antenna structure 5. In an embodiment, the processor may identify or estimate a receiving angle of a signal (e.g., a direction of a signal) with respect to a configured axis of the electronic device 200 using at least one of a difference between arrival times of response messages to a request message, a difference in arrival distance between received signals, and a phase difference by means of the two or more antenna elements included in the second antenna structure 5. The wireless communication circuit may be configured to supply simultaneously an electromagnetic signal (or a radio signal or radiation current) to the two or more antenna elements included in the second antenna structure 5 for the positioning function with respect to the signal source. The two or more antenna elements may radiate substantially simultaneously electromagnetic waves. The electronic device 200 may support the positioning function using a broadband bandwidth (e.g., an ultra-wideband (UWB)). For example, UWB may refer to a technology that complies with the international standard, IEEE 802.15.4. UWB may perform communication which is a broadband bandwidth. In an embodiment, the processor may identify or estimate the position of the signal source (e.g., the responder, the transmitter, or the Tx device) with respect to the electronic device 200 (e.g., an initiator, a receiver, or an Rx (receiver) device) by a phase difference between signals received by the plurality of antenna elements included in the second antenna structure 5. The second antenna structure 5 may be implemented as a printed circuit board (e.g., a flexible printed circuit board (FPCB)). For example, the second antenna structure 5 may be a patch antenna including a plurality of patches (e.g., a first antenna element, a second antenna element, and a third antenna element).

The electronic device 200 may further include various elements in accordance with the provided form. All the elements cannot be enumerated because the element is variously deformed in accordance with the tendency of convergence of the electronic device 200. However, the electronic device 200 may further additionally include an element equal in level to the above-mentioned elements. In various embodiments, particular elements may be excluded from the elements or substituted with other elements in accordance with the provided form.

Figure 4:
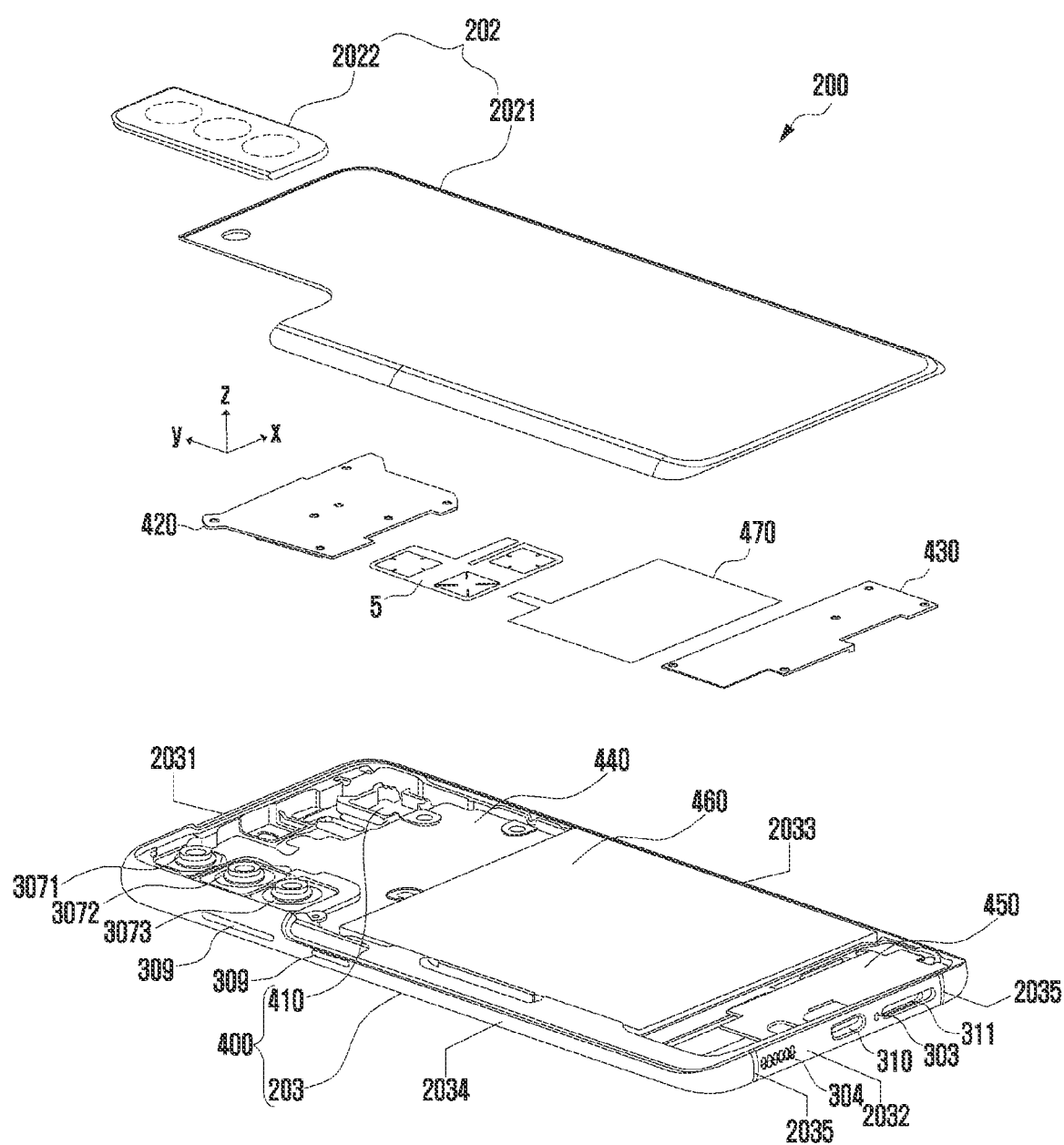
Figure 5:
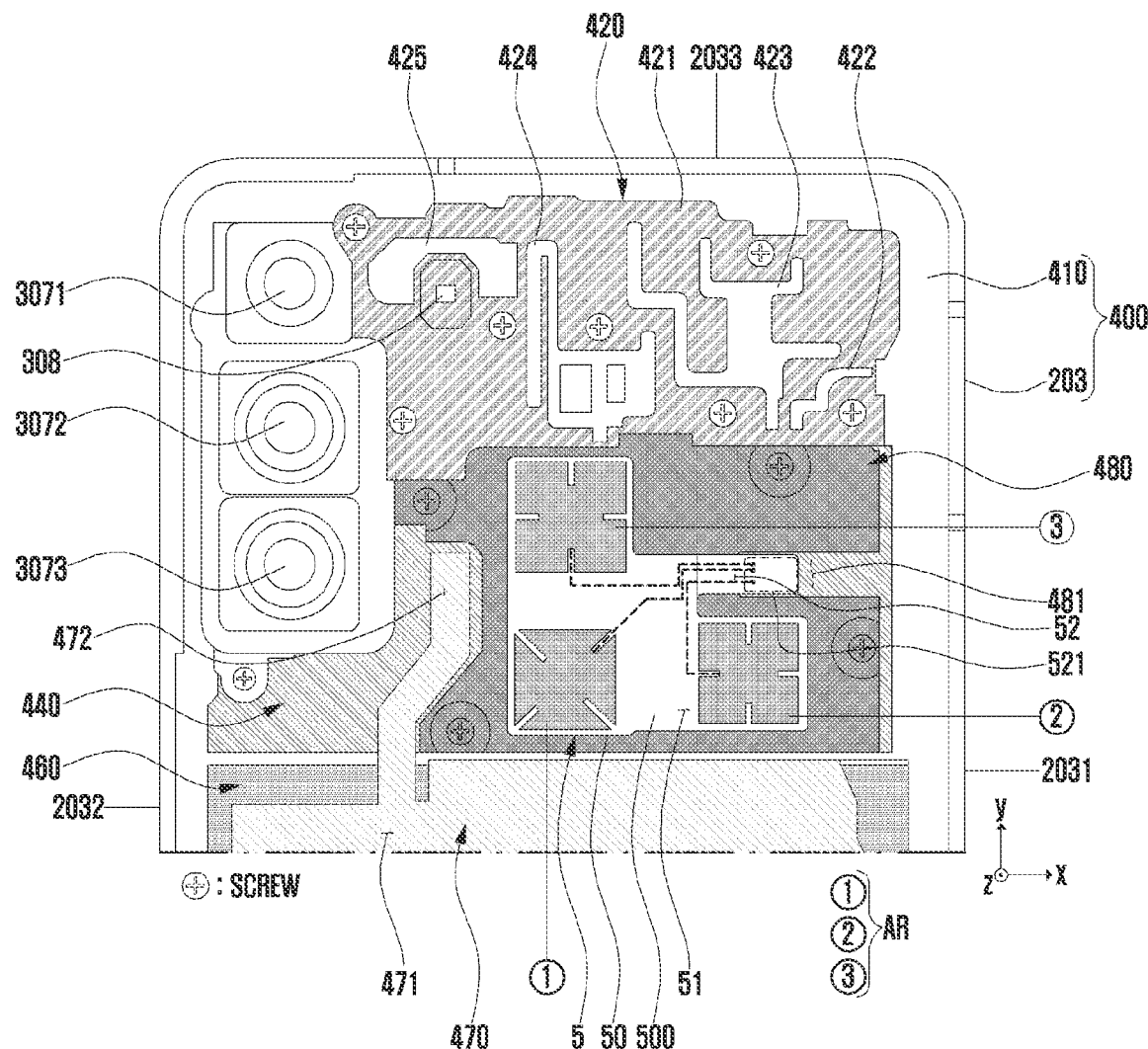
FIG. 5 is a diagram illustrating a part of the electronic device according to various embodiments.
Figure 6:
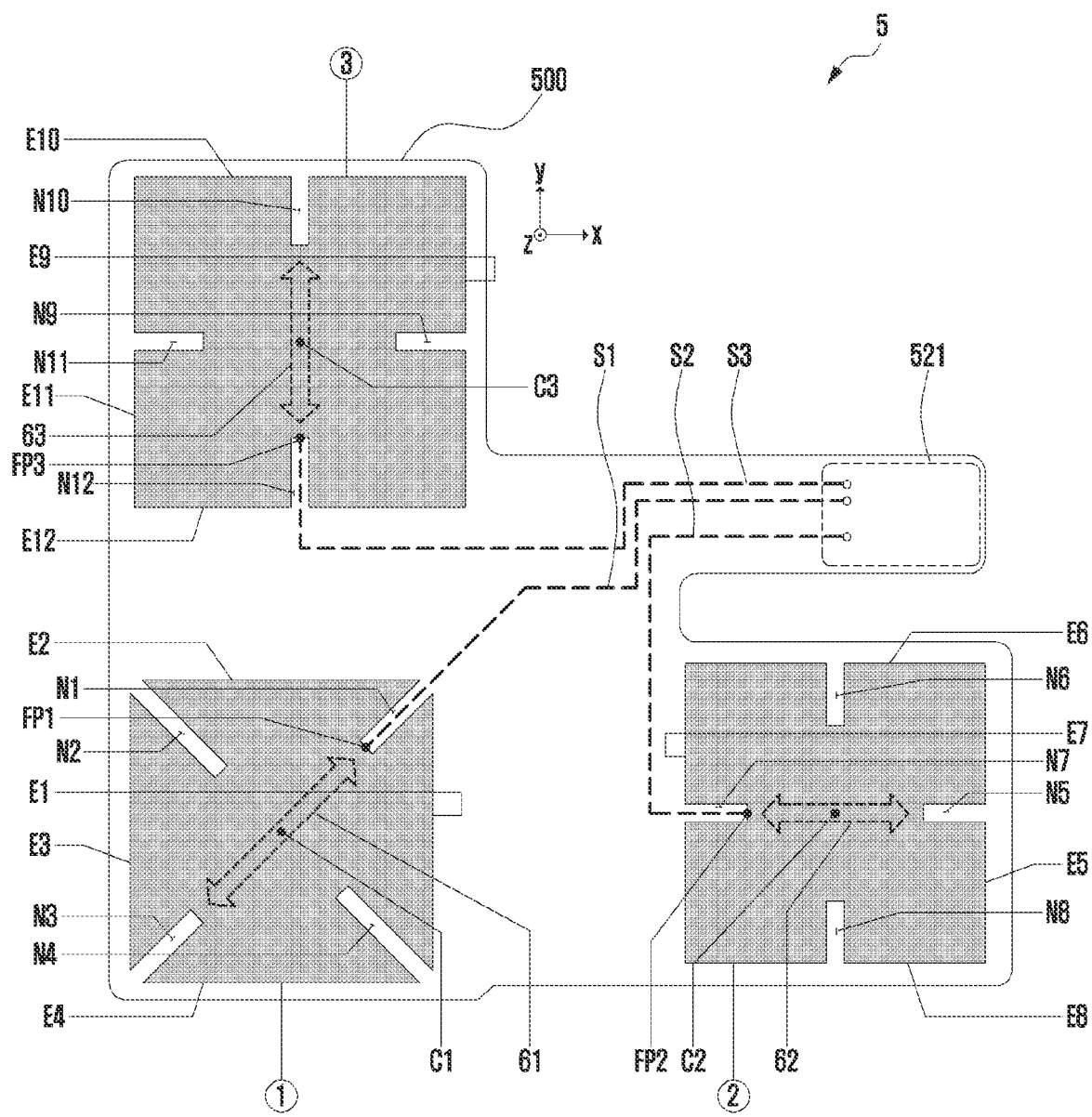
FIG. 6 is a diagram illustrating a second antenna structure according to various embodiments.

FIGS. 3 and 4 are exploded perspective views of the electronic device 200 according to various embodiments. FIG. 5 is a diagram illustrating a part of the electronic device 200 according to various embodiments. FIG. 6 is a diagram illustrating an example second antenna structure 5 according to various embodiments.

With reference to FIGS. 3, 4, 5, and 6, the electronic device 200 may include the front surface plate 201, the rear surface plate 202, the lateral member 203, a first support member 410, a second support member 420, a third support member 430, the display module 301, a first substrate assembly 440, a second substrate assembly 450, a battery 460, a first antenna structure 470, and/or the second antenna structure 5. In any embodiment, the electronic device 200 may exclude some of the elements or further include other elements.

According to an embodiment, the first support member 410 may be positioned in the electronic device 200 and connected to the lateral member 203, or the first support member 410 may be at least partially integrated with the lateral member 203. For example, the first support member 410 may be made of a metallic material and/or a nonmetallic material (e.g., polymer). The first support member 410 may be at least one conductive portion, and at least one non-conductive portion connected to the at least one conductive portion. The at least one conductive portion included in the first support member 410 may be connected to or integrated with at least a part of a side surface conductive structure of the electronic device 200 (e.g., a metal structure including a plurality of conductive portions of the lateral member 203). The at least one non-conductive portion included in the first support member 410 may be connected to or integrated with the plurality of insulation portions 2035 included in the lateral member 203. The structure including the first support member 410 and the lateral member 203 may be referred to as a 'front case' 400. The electronic components such as the display module 301, the first substrate assembly 440, the second substrate assembly 450, or the battery 460, or the various members related to the electronic components may be disposed on the front case 400 or the first support member 410 or supported by the front case 400 or the first support member 410. The front case 400 or the first support member 410 may be included in the electronic device 200 to withstand a load and contribute to durability or rigidity (e.g., torsional rigidity) of the electronic device 200. In any embodiment, the front case 400 or the first support member 410 may be referred to as various other terms such as a 'frame', a 'frame structure', or a 'framework'. The first support member 410 may be an internal structure positioned in an internal space of the electronic device 200. In any embodiment, the first support member 410 may be referred to as various other terms such as a 'bracket', a 'first support body (support)', or a 'first support structure'. In any embodiment, the first support member 410 may be interpreted as a part of the housing 210 (see FIG. 2).

For example, the display module 301 may be positioned between the first support member 410 and the front surface plate 201 and disposed on the first support member 410. The display module 301 may be coupled to the front surface plate 201 by means of an optical transparent adhesive member such as optical clear resin (OCA), optical clear resin (OCR), or super view resin (SVR). The first substrate assembly 440 and the second substrate assembly 450 may be positioned between the first support member 410 and the rear surface plate 202 and disposed on the first support member 410. The battery 460 may be positioned between the first support member 410 and the rear surface plate 202 and disposed on the first support member 410.

According to an embodiment, the first substrate assembly 440 may include a first printed circuit board 441 (e.g., a printed circuit board (PCB) or a printed circuit board assembly (PBA)). The first substrate assembly 440 may include various electronic components electrically connected to the first printed circuit board 441. The electronic components may be disposed on the first printed circuit board 441 or electrically connected to the first printed circuit board 441 through an electrical path such as a cable or a flexible printed circuit board (FPCB). For example, the electronic components may include a first microphone corresponding to the first microphone hole 302 (see FIG. 2), a second speaker corresponding to the second speaker hole 305 (see FIG. 2), a sensor module (e.g., a proximity sensor or an illuminance sensor), the front surface camera module 306 (see FIG. 2), the plurality of rear surface camera modules 3071, 3072, and 3073, the light-emitting module 308, or the input module 309.

According to an embodiment, when viewed from above the front surface plate 201 (e.g., when viewed in the +z-axis direction), the second substrate assembly 450 may be positioned to be spaced apart from the first substrate assembly 440 with the battery 460 interposed therebetween. The second substrate assembly 450 may include a second printed circuit board 451 electrically connected to the first printed circuit board 441 of the first substrate assembly 440. The second substrate assembly 450 may include various electronic components electrically connected to the second printed circuit board 451. The electronic components may be disposed on the second printed circuit board 451 or electrically connected to the second printed circuit board 451 through an electrical path such as a cable or an FPCB. For example, the electronic components may include a second microphone corresponding to the second microphone hole 303, a first speaker corresponding to the first speaker hole 304, a first connector included in the first connection terminal module 310, or a second connector included in the second connection terminal module 311.

According to various embodiments, the first substrate assembly 440 or the second substrate assembly 450 may include a primary PCB (or a main PCB), a secondary PCB (or a sub-PCB) disposed to at least partially overlap the primary PCB, and/or an interposer substrate disposed between the primary PCB and the secondary PCB.

The battery 460 refers to a device for supplying power to at least one element of the electronic device 200. Examples of the battery 460 may include a primary battery, which cannot be recharged, a secondary battery, which can be recharged, or a fuel cell.

According to an embodiment, at least one conductive portion included in the first support member 410 may serve to block electromagnetism from the display module 301, the first substrate assembly 440, the second substrate assembly 450, or various other electrical elements. At least one conductive portion included in the first support member 410 may be electrically connected to a flexible conductive member (or flexible conductor) positioned between the first support member 410 and the first printed circuit board 441 or electrically connected to a first ground plane (or a first ground layer) included in the first printed circuit board 441 through a conductive adhesive member (or a conductive adhesive material). At least one conductive portion included in the first support member 410 may be electrically connected to a flexible conductive member (or a flexible conductor) positioned between the first support member 410 and the second printed circuit board 451 or electrically connected to a second ground plane (or a second ground layer) included in the second printed circuit board 450 through a conductive adhesive member (or a conductive adhesive material). The first ground plane and the second ground plane may be electrically connected through an electrical connection member (e.g., a flexible printed circuit board (FPCB)) that electrically connects the first printed circuit board 441 and the second printed circuit board 451. For example, the flexible conductive member may include a conductive clip (e.g., a conductive structure including an elastic structure), a pogo pin, a spring, a conductive poron, conductive rubber, a conductive tape, or a conductive connector. The conductive structure including the first ground plane, the second ground plane, and at least one conductive portion included in the first support member 410 may be include a ground (or ground structure) of the electronic device 200.

According to an embodiment, the second support member (or the second support body or the second support structure) 420 may be positioned between the first support member 410 and the rear surface plate 202 and coupled to the first support member 410 and/or the first substrate assembly 440 using a fastening element such as a screw (or a bolt). At least a part of the first substrate assembly 440 may be positioned between the first support member 410 and the second support member 420, and the second support member 420 may cover and protect the first substrate assembly 440. The third support member (or the third support body or the third support structure) 430 may be positioned to be at least partially spaced apart from the second support member 420 with the battery 460 interposed therebetween when viewed from above the rear surface plate 202 (e.g., when viewed in the −z-axis direction). The third support member 430 may be positioned between the first support member 410 and the rear surface plate 202 and coupled to the first support member 410 and/or the second substrate assembly 450 using a fastening element such as a screw (or a bolt). At least a part of the second substrate assembly 450 may be positioned between the first support member 410 and the third support member 430, and the third support member 430 may cover and protect the second substrate assembly 450. In any embodiment, the second support member 420 and/or the third support member 430 may each be referred to as a 'rear case'. In any embodiment, the second support member 420 and/or the third support member 430 may be interpreted as a part of the housing 210 (see FIG. 2).

According to various embodiments, an integrated printed circuit board may be provided by being substituted for the first printed circuit board 441 and the second printed circuit board 451. For example, when viewed from above the rear surface plate 202 (e.g., when viewed in the −z-axis direction), the integrated printed circuit board may include: first and second parts spaced apart from each other with the battery 460 interposed therebetween; and a third part extending between the battery 460 and the lateral member 203 and configured to connect the first and second parts. The third part may be implemented to be substantially rigid. In any embodiment, the third part may be implemented to be substantially flexible. In any embodiment, an integrated support member including the second support member 420 and the third support member 430 may be implemented.

According to an embodiment, the second support member 420 (e.g., the rear case) may include a non-conductive member (or non-conductor) 421 made of a nonmetallic material (e.g., polymer) and/or a plurality of conductive patterns 422, 423, 424, and 425 disposed on the non-conductive member 421. For example, the conductive pattern 422, 423, 424, or 425 may be implemented by laser direct structuring (LDS). For example, the LDS may refer to a method of forming the conductive pattern by designing a pattern on the non-conductive member 421 using a laser and plating an upper portion of the pattern with an electrically conductive material such as copper or nickel. The plurality of conductive patterns 422, 423, 424, and 425 may each be electrically connected to a wireless communication circuit (e.g., the wireless communication module 192 in FIG. 1) included in the first substrate assembly 440 and operate as an antenna radiator. In an embodiment, at least one conductive portion included in the lateral member 203 may operate as an antenna radiator electrically connected to the wireless communication circuit. The wireless communication circuit may process a transmission signal or a reception signal in at least one selected or designated frequency band through at least one antenna radiator. For example, the selected or designated frequency band may include at least one of LB (low band) (about 600 MHz to about 1 GHz), MB (middle band) (about 1 GHz to about 2.3 GHz), HB (high band) (about 2.3 GHz to about 2.7 GHz), and UHB (ultra high band) (about 2.7 GHz to about 6 GHz). The designated frequency band may include various other frequency bands.

According to an embodiment, the first antenna structure 470 may be at least partially positioned between the battery 460 and the rear surface plate 202. The first antenna structure 470 may include at least one conductive pattern used as a loop-type radiator. For example, the at least one conductive pattern may include a flat pattern or a flat spiral conductive pattern (e.g., a flat coil or a pattern coil). For example, the first antenna structure 470 may include: a first area 471 disposed to at least partially overlap the battery 460 and including a spiral conductive pattern; and a second area 472 extending from the first area 471 and electrically connected to the first substrate assembly 440. At least one conductive pattern included in the first antenna structure 470 may be electrically connected to a wireless communication circuit (or a wireless communication module) included in the first substrate assembly 440. For example, at least one conductive pattern may be used for near field wireless communication such as near field communication (NFC). As another example, at least one conductive pattern may be used for magnetic secure transmission (MST) that transmits and/or receives a magnetic signal. In any embodiment, at least one conductive pattern included in the antenna structure 470 may be electrically connected to a power transmitting/receiving circuit included in the first substrate assembly 440. The power transmitting/receiving circuit may receive power in a wireless manner from an external electronic device using at least one conductive pattern or transmit power to the external electronic device in a wireless manner. The power transmitting/receiving circuit may include a power management module. For example, the power transmitting/receiving circuit may include a power management integrated circuit (PMIC) or a charger integrated circuit (a charger IC). The power transmitting/receiving circuit may charge the battery 460 using power received in a wireless manner using the conductive pattern.

According to an embodiment, the second antenna structure 5 may be at least partially positioned between the first substrate assembly 440 and the rear surface plate 202. As still another example, the second antenna structure 5 may at least partially positioned between the second support member 420 and the battery 460 when viewed from above the rear surface plate 202 (e.g., when viewed in the −z-axis direction). When viewed from above the rear surface plate 202, the second antenna structure 5 may not substantially overlap the second support member 420, the first antenna structure 470, the battery 460, the plurality of second camera modules 3071, 3072, and 3073, or the light-emitting module 308. When viewed from above the rear surface plate 202, the second antenna structure 5 may not substantially overlap the plurality of conductive patterns 422, 423, 424, and 425 of the second support member 420 or the conductive pattern of the first antenna structure 470.

According to an embodiment, the second antenna structure 5 may include a circuit board (or a substrate) 500 and a plurality of antenna elements (or a plurality of antenna radiators) ①, ②, and ③. The circuit board 500 may be an insulating material capable of disposing the conductive pattern (e.g., the pattern of the copper foil or the circuit) such as the plurality of antenna elements ①, ②, and ③. The plurality of antenna elements ①, ②, and ③ may each be a substantially flat plate may be disposed to be directed in the direction (e.g., the +z-axis direction) in which the rear surface 210B of the electronic device 200 (see FIG. 2) is directed. The second antenna structure 5 may include a printed circuit board (PCB) 50 having a shape in which a circuit (e.g., a conductive pattern) is positioned on the circuit board (e.g., the insulating substrate) 500. Examples of the printed circuit board 50 of the second antenna structure 5 may include a rigid printed circuit board (RPCB), a flexible printed circuit board (FPCB), or a rigid flexible printed circuit board (RFPCB).

According to an embodiment, the electronic device 200 may include a cover member (or a cover structure or a support structure) 480 positioned between the first substrate assembly 440 and the rear surface plate 202. The cover member 480 may include metal and/or polymer and be coupled to the first substrate assembly 440 and/or the first support member 410 using a bolt. When viewed from above the rear surface plate 202 (e.g., when viewed in the −z-axis direction), a part of the first substrate assembly 440 may overlap the second support member 420, and another part of the second substrate assembly 440 may overlap the cover member 480. The second support member 420 and the cover member 480 may be disposed so as not to cover the plurality of second camera modules 3071, 3072, and 3073, which uses external light having passed through the rear surface plate 320, and the light-emitting module 308 configured to output light passing through the rear surface plate 202. In an embodiment, the second antenna structure 5 may be disposed on the cover member 480. For example, an adhesive material made of polymer may be positioned between the second antenna structure 5 and the cover member 480. The printed circuit board 50 of the second antenna structure 5 may include a first part 51 including the plurality of antenna elements ①, ②, and ③, and a second part 52 extending from the first part 51 and electrically connected to the first substrate assembly 440. The first part 51 of the printed circuit board 50 may be disposed on the cover member 480. For example, the second part 52 of the printed circuit board 50 may be electrically connected to the first substrate assembly 440 through an opening (e.g., a notched opening) 481 of the cover member 480. For example, the second part 52 of the printed circuit board 50 may include a connector 521 electrically connected to a connector disposed on the first printed circuit board 441 of the first substrate assembly 440. In any embodiment, it is possible to provide an integrated member that is substituted for the second support member 420 and the cover member 480.

According to an embodiment, the printed circuit board 50 of the second antenna structure 5 may include a plurality of conductive layers including conductive patterns, and a plurality of non-conductive layers (e.g., insulating layers) alternately stacked on the plurality of conductive layers. Some conductive patterns of the plurality of conductive layers may be used as the plurality of antenna elements (or the antenna radiators) ①, ②, and ③ Some conductive patterns of the plurality of conductive layers may be used as an electrical path (e.g., a signal line) disposed between the antenna element ①, ②, or ③ and the connector 521 and configured to transmit an electromagnetic signal (or a radio signal (RF signal) or radiation current). Some conductive patterns of the plurality of conductive layers may be used as a ground plane. Some conductive patterns of the plurality of conductive layers may be used as an electrical path that electrically connects the ground plane and the connector 521. The printed circuit board 50 may include a plurality of conductive vias. The conductive via may be a conductive hole drilled to dispose a conductive connection wire for electrically connecting conductive patterns of different conductive layers. Examples of the conductive via may include a plated through hole (PTH), a laser via hole (LVH), a buried via hole (BVH) or a stacked via. For example, at least one conductive via may be a part of a signal line and electrically connect signal line patterns disposed on different layers. For example, at least one conductive via may electrically connect ground planes of different layers. A conductive structure including ground planes and at least one conductive via configured to electrically connect the ground planes may include a ground (or a ground structure) of the second antenna structure 5.

According to an embodiment, the electronic device 200 may communicate with the signal source (e.g., the responder, the transmitter, or the Tx device) using an antenna array AR including the plurality of antenna elements ①, ②, and ③. For example, the electronic device 200 may perform the positioning function (e.g., AOA) with respect to the signal source using the antenna array AR. In an embodiment, the antenna array AR may be disposed in an 'L' shape. Because the antenna array AR is disposed in an 'L' shape, a first antenna element ① and a second antenna element ② of the antenna array AR may be aligned and spaced apart from each other in a configured x-axis direction of the electronic device 200, and the first antenna element ① and a third antenna element ③ of the antenna array AR may be aligned and spaced apart from each other in a configured y-axis direction of the electronic device 200. The processor (e.g., the processor 120 in FIG. 1) may identify or estimate a first angle (e.g., a first signal receiving angle), at which a signal is received, with respect to a configured x-axis of the electronic device 200 using a time difference between signals received through the first antenna element ① and the second antenna element ② and a phase difference made by the time difference. For example, the configured x-axis of the electronic device 200 may be a direction extending in parallel with the third side surface portion 2033 and the fourth side surface portion 2034 of the lateral member 203. The processor may identify or estimate a second angle (e.g., a second signal receiving angle), at which a signal is received, with respect to the configured y-axis of the electronic device 200 using the time difference between the signals received through the first antenna element ① and the third antenna element ③ and the phase difference made by the time difference. For example, the configured y-axis of the electronic device 200 may be a direction extending in parallel with the first side surface portion 2031 and the second side surface portion 2032 of the lateral member 203. The processor may identify or estimate a direction of the signal source with respect to the electronic device 200 using the first and second angles. The electronic device 200 may identify or estimate a distance between the electronic device 200 and the signal source using the time difference between the signals received through the plurality of antenna elements ①, ②, and ③ and the phase difference made by the time difference. In any embodiment, in case that the first antenna element ① and the second antenna element ② are in a non-aligned state (a misaligned state) in the x-axis direction or the first antenna element ① and the third antenna element ③ are in a non-aligned state in the y-axis direction, the electronic device 200 may perform correction by applying a compensation (offset) value on the basis of a non-aligned distance between the antennas in order to reduce a recognition error related to positioning. In any embodiment, the number or position of antennas included in the antenna array AR may be variously implemented without being limited to the illustrated example. In any embodiment, the antenna array AR may be disposed in various shapes different from the illustrated shape.

According to various embodiments, the second antenna structure 5 may include a plurality of antenna arrays formed by a method at least partially similar to or substantially identical to a method by which the antenna array AR is formed. For example, the second antenna structure 5 may include a printed circuit board (e.g., an RPCB, a FPCB, or an RFPCB) including a first antenna array and a second antenna array. As another example, the second antenna structure 5 may include a printed circuit board (e.g., an RPCB, a FPCB, or an RFPCB) including a first antenna array, a second antenna array, and a third antenna array. The first antenna array and the second antenna array may be arranged in the x-axis direction, and the first antenna array and the third antenna array may be arranged in the y-axis direction. As another example, the second antenna structure 5 may include a printed circuit board (e.g., an RPCB, a FPCB, or an RFPCB) including more antenna arrays.

According to various embodiments, the second antenna structure 5 may further include another antenna array (not illustrated) configured to transmit and/or receive a signal with a frequency band at least partially different from that of the antenna array AR.

According to various embodiments, the electronic device 200 may include at least one antenna structure substantially and at least partially identical to the second antenna structure 5. In any embodiment, the second antenna structure 5 and at least one antenna structure may be implemented as an integrated printed circuit board (e.g., an RPCB, a FPCB, or an RFPCB). In any embodiment, in case that the second antenna structure 5 and at least one antenna structure are implemented as an integrated printed circuit board, a single connector may be provided to electrically connect the integrated printed circuit board to the first printed circuit board 441, or connectors may be provided so as to correspond to the second antenna structure 5 and at least one antenna structure, respectively.

According to an embodiment, the wireless communication circuit (e.g., the wireless communication module 192 in FIG. 1) may be configured to transmit and/or receive a signal with at least one selected or designated frequency band through the antenna element (e.g., the first antenna element ①, the second antenna element ②, or the third antenna element ③). For example, the wireless communication circuit may be configured to transmit and/or receive a first signal (or a first frequency signal) with a first frequency and a second signal (or a second frequency signal) with a second frequency different from the first frequency through the antenna element (e.g., the first antenna element ①, the second antenna element ②, or the third antenna element ③). For example, a frequency of the first signal may be about 6.5 GHz, and a frequency of the second signal may be about 8 GHz.

According to an embodiment, the second antenna structure 5 may include a first signal line (or a first electrical path) S1, a second signal line (or a second electrical path) S2, and a third signal line (or a third electrical path) S3. The first signal line S1 may electrically connect the first antenna element ① and the connector 521. The second signal line S2 may electrically connect the second antenna element ② and the connector 521. The third signal line S3 may electrically connect the third antenna element ③ and the connector 521. The first signal line S1 may be a part of a first transmission line included in the second antenna structure 5, and an electromagnetic signal (or, a radio signal or radiation current) (e.g., an UWB signal) may be transmitted through the first transmission line between the first antenna element ① and the wireless communication circuit (e.g., the wireless communication module 192 in FIG. 1 disposed on the first printed circuit board 441). When the wireless communication circuit provides (supplies) the electromagnetic signal to the first antenna element ① through the first transmission line, the electromagnetic signal provided (or supplied) from the wireless communication circuit may be transmitted (or radiated) to the outside of the electronic device 200 through the first antenna element ①. The first antenna element ① may receive the electromagnetic signal from the outside of the electronic device 200, and the received electromagnetic signal may be transmitted to the wireless communication circuit through the first transmission line. The second signal line S2 may be a part of a second transmission line included in the second antenna structure 5, and an electromagnetic signal may be transmitted through the second transmission line between the second antenna element ②and the wireless communication circuit. When the wireless communication circuit provides (or supplies) the electromagnetic signal to the second antenna element ② through the second transmission line, the electromagnetic signal provided (or supplied) from the wireless communication circuit may be transmitted (or radiated) to the outside of the electronic device 200 through the second antenna element ②. The second antenna element ② may receive the electromagnetic signal from the outside of the electronic device 200, and the electromagnetic signal may be transmitted to the wireless communication circuit through the second transmission line. The third signal line S3 may be a part of a third transmission line included in the second antenna structure 5, and an electromagnetic signal may be transmitted through the third transmission line between the third antenna element ③ and the wireless communication circuit. When the wireless communication circuit provides (or supplies) the electromagnetic signal to the third antenna element ③ through the third transmission line, the electromagnetic signal provided (or supplied) from the wireless communication circuit may be transmitted (or radiated) to the outside of the electronic device 200 through the third antenna element ③. The third antenna element ③ may receive the electromagnetic signal from the outside of the electronic device 200, and the received electromagnetic signal may be transmitted to the wireless communication circuit through the third transmission line.

According to an embodiment, the second antenna structure 5 may include a ground plane. The plurality of antenna elements ①, ②, and ③ may be included in a first layer of the printed circuit board 50, and the ground plane may be included in a second layer positioned closer to the front surface plate 201 than the first layer. For example, the plurality of antenna elements ①, ②, and ③ may define a patch antenna. The plurality of antenna elements ①, ②, and ③ may be patches, and the ground plane may operate as an antenna ground. When the wireless communication circuit (e.g., the wireless communication module 192 in FIG. 1) provides the electromagnetic signal (or the radio signal or the radiation current) to the plurality of antenna elements ①, ②, and ③, the second antenna structure 5 may operate as a patch antenna (or a resonator) that radiates the signal with the frequency band selected or designated as the plurality of antenna elements ①, ②, and ③ resonates with the ground plane. The plurality of antenna elements ①, ②, and ③ may each operate as an antenna radiator (or a radiation part) that transmits the electromagnetic signal, which is provided from the wireless communication circuit, to the outside or receives the electromagnetic signal from the outside. The ground plane may operate as an antenna ground (or an antenna ground area or a grounding part). The ground plane, which is used as the antenna ground, may contribute to ensuring antenna radiation performance (or communication performance or radio wave transmitting/receiving performance), ensuring coverage, and/or reducing electromagnetic interference (EMI) (or a loss of signal) in connection with the plurality of antenna elements ①, ②, and ③. The ground plane may apply an electromagnetic influence (e.g., an electromagnetic force or radiation of radio waves) that may be provided to ensure or improve performance in transmitting or receiving radio waves in the direction (e.g., the +z-axis direction) in which the radiation pattern (or the beam pattern) according to the plurality of antenna elements ①, ②, and ③ is directed toward the rear surface 210B of the electronic device 200 (see FIG. 2). The ground plane may contribute to providing a radiation pattern having directionality to a space in which the plurality of antenna elements ①, ②, and ③ is directed toward the rear surface 210B of the electronic device 200.

According to an embodiment, when the wireless communication circuit (e.g., the wireless communication module 192 in FIG. 1) provides (or supplies) the electromagnetic signal (or the radio signal or the radiation current) (e.g., the UWB signal) with at least one selected or designated frequency band to the first antenna element ① through the first signal line S1, a first linearly polarized wave (or a first straight polarized wave) (linear polarization) with at least one selected or designated frequency band may be radiated from the first antenna element ①. The first linearly polarized wave may be an electromagnetic wave that propagates while oscillating in a first polarization direction 61. The first linearly polarized wave may refer, for example, to a polarity direction of an electric field with respect to a propagation direction (or a transmission direction) of the electromagnetic wave radiated (or transmitted) from the first antenna element ①. The first polarization direction 61 is a direction in which the electric field oscillates (or a direction parallel to a vector of the electric field), and the first polarization direction 61 may be perpendicular to the propagation direction of the electromagnetic wave. In an embodiment, the propagation direction of the electromagnetic wave may be a direction (e.g., the +z-axis direction) in which an x-y plane of the first antenna element ① having a flat plate shape is directed. The first polarization direction 61 may not be parallel to the x-axis direction and the y-axis direction of the electronic device 200. The first polarization direction 61 may be an acute angle or an obtuse angle with respect to a positive direction (e.g., the +x-axis direction) of the x-axis of the electronic device 200. For example, the first polarization direction 61 may be an angle of about 45 degrees with respect to the +x-axis direction of the electronic device 200. In any embodiment, the first polarization direction 61 of the first linearly polarized wave may be an acute angle or an obtuse angle with respect to a negative direction (e.g., the −x-axis direction) of the x-axis of the electronic device 200. The first antenna element ① may include one first power feeding part (or a first power feeding point) FP1, which is a part from which the electromagnetic signal is supplied. The first power feeding part FP1 may be a position on the first antenna element ① at which the first signal line S1 is electrically connected to the first antenna element ①. When the wireless communication circuit disposed on the first printed circuit board 441 provides the radiation current to the first power feeding part FP1 of the first antenna element ①, the first linearly polarized wave may be radiated by a current path (or distribution of surface current) on the first antenna element ①.

According to an embodiment, the first antenna element ① may include a first rim E1, a second rim E2, a third rim E3, and/or a fourth rim E4. When viewed from above the rear surface plate 202 (e.g., when viewed in the −z-axis direction), the first rim E1 may be positioned to be spaced apart from the third rim E3 in the +x-axis direction and substantially parallel to the third rim E3. When viewed from above the rear surface plate 202, the second rim E2 may be positioned to be spaced apart from the fourth rim E4 in the +y-axis direction and substantially parallel to the fourth rim E4. The first rim E1 and the third rim E3 may extend in the +y-axis direction, and the second rim E2 and the fourth rim E4 may extend in the +x-axis direction. The first rim E1 and the third rim E3 may be substantially perpendicular to the second rim E2 and the fourth rim E4. In an embodiment, a first distance by which the first rim E1 is spaced apart from the third rim E3 in the +x-axis direction may be substantially equal to a second distance by which the second rim E2 is spaced apart from the fourth rim E4 in the +y-axis direction. As another example, the first distance and the second distance may be different from each other. In an embodiment, the first power feeding part FP1 may be positioned closer to a first edge at which the first rim E1 and the second rim E2 meet than a second edge at which the second rim E2 and the third rim E3 meet, a third edge at which the third rim E3 and the fourth rim E4 meet, and a fourth edge at which the first rim E1 and the fourth rim E4 meet. When the radiation current is provided to the first power feeding part FP1, the first linearly polarized wave, which has the first polarization direction 61 (or oscillates in the first polarization direction 61), may be radiated by the current path (or the distribution of surface current) on the first antenna element ①.

According to an embodiment, the first polarization direction 61 of the first linearly polarized wave radiated from the first antenna element ① may be substantially parallel to a direction (e.g., a diagonal direction) between the first edge at which the first rim E1 and the second rim E2 meet and the third edge at which the third rim E3 and the fourth rim E4 meet.

According to an embodiment, the first antenna element ① may include a plurality of notches (or slits) N1, N2, N3, and N4. The first notch N1 may be provided to correspond to the first edge at which the first rim E1 and the second rim E2 meet. The second notch N2 may be provided to correspond to the second edge at which the second rim E2 and the third rim E3 meet. The third notch N3 may be provided to correspond to the third edge at which the third rim E3 and the fourth rim E4 meet. The fourth notch N4 may be provided to correspond to the fourth edge at which the first rim E1 and the fourth rim E4 meet. The first notch N1 may extend in the diagonal direction from the first edge toward the third edge. The second notch N2 may extend in the diagonal direction from the second edge toward the fourth edge. The third notch N3 may extend in the diagonal direction from the third edge toward the first edge. The fourth notch N4 may extend in the diagonal direction from the fourth edge toward the second edge. In an embodiment, the plurality of notches N1, N2, N3, and N4 may be arranged at an angle of substantially 90 degrees based on a first center C1 of the first antenna element ①. In an embodiment, the first notch N1 and the third notch N3 may be provided substantially symmetrically with respect to the first center C1, and the second notch N2 and the fourth notch N4 may be provided substantially symmetrically with respect to the first center C1. The first center C1 may be a point on the first antenna element ① positioned at substantially the same distance from the first rim E1 and the third rim E3 and positioned at substantially the same distance from the second rim E2 and the fourth rim E4. The first center C1 may be positioned between the first notch N1 and the third notch N3 and between the second notch N2 and the fourth notch N4. In an embodiment, the first antenna element ① may resonate in a selected or designated dual band. For example, the first antenna element ① may have an electrical length (e.g., a length expressed by a ratio of a wavelength) of a ½ length (half-wavelength) of a wavelength of the electromagnetic signal which is transmitted or received by the signal source and has a first resonant frequency (e.g., about 6.5 GHz). For example, the first antenna element ① may have an electrical length of a ½ length of a wavelength of an electromagnetic signal which is transmitted or received by the signal source and has a second resonant frequency (e.g., about 8 GHz). A pair of two notches, which is arranged in the diagonal direction among the first notch N1, the second notch N2, the third notch N3, and the fourth notch N4, may contribute to allowing the first antenna element ① to have the first resonant frequency (e.g., about 6.5 GHz). The remaining pair of notches may contribute to allowing the first antenna element ① to have the second resonant frequency (e.g., about 8 GHz) different from the first resonant frequency. The wireless communication circuit (e.g., the wireless communication module 192 in FIG. 1) may transmit or receive a first electromagnetic signal included in a selected or designated first frequency band (or a first usage frequency band or a first operating frequency band) through the first antenna element ①. The wireless communication circuit may transmit or receive a second electromagnetic signal included in a selected or designated second frequency band (or a second usage frequency band or a second operating frequency band) different from the first frequency band through the first antenna element ①. In an embodiment, the first electromagnetic signal may have a frequency of about 6.5 GHz, and the second electromagnetic signal may have a frequency of about 8 GHz.

According to an embodiment, the first power feeding part FP1 of the first antenna element ① may be positioned between the first center C1 and the first notch N1. For example, the first power feeding part FP1 may be positioned closer to the first notch N1 than the first center C1. When the first power feeding part FP1 is positioned closer to the first notch N1 than the first center C1, the first antenna element ① may have impedance that may reduce a loss of power in the dual band.

According to an embodiment, the layer of the printed circuit board 50, which includes the first antenna element ①, may include a part of the first signal line S1 connected to the first power feeding part FP1 of the first antenna element ① (e.g., a transmission line of a micro-strip). In any embodiment, the first signal line S1 may be electrically connected to the first power feeding part FP1 of the first antenna element ① through a via. In any embodiment, the printed circuit board 50 may include a first power feeding element included in a different layer from the first antenna element ①, and the first power feeding element may be electrically connected to the first signal line S1. When viewed from above the rear surface 210B of the electronic device 200 (see FIG. 2) (e.g., when viewed in the −z-axis direction), the first antenna element ① may at least partially overlap the first power feeding element and be indirectly supplied with power by electromagnetic coupling with the first power feeding element.

According to various embodiments, the shape of the first antenna element ① or the position of the first power feeding part FP1 may be variously implemented in order to radiate the first linearly polarized wave while corresponding to at least one selected or designated frequency band without being limited to the illustrated example.

According to an embodiment, when the wireless communication circuit (e.g., the wireless communication module 192 in FIG. 1) provides (or supplies) the electromagnetic signal (or the radio signal or the radiation current) (e.g., the UWB signal) with at least one selected or designated frequency band to the second antenna element ② through the second signal line S2, a second linearly polarized wave (or a second straight polarized wave) with at least one selected or designated frequency band may be radiated from the second antenna element ②. The second linearly polarized wave may be an electromagnetic wave that propagates while oscillating in a second polarization direction 62. The second linearly polarized wave may refer, for example, to a polarity direction of an electric field with respect to a propagation direction (or a transmission direction) of the electromagnetic wave radiated (or transmitted) from the second antenna element ②. The second polarization direction 62 is a direction in which the electric field oscillates (or a direction parallel to a vector of the electric field), and the second polarization direction 62 may be perpendicular to the propagation direction of the electromagnetic wave. In an embodiment, the propagation direction of the electromagnetic wave may be a direction (e.g., the +z-axis direction) in which an x-y plane of the second antenna element ② having a flat plate shape is directed. The second polarization direction 62 may not be parallel to the first polarization direction 61 of the first linearly polarized wave. For example, the second polarization direction 62 may be the x-axis direction of the electronic device 200. The second antenna element ② may include one second power feeding part (or a second power feeding point) FP2, which is a part from which the electromagnetic signal is supplied. The second power feeding part FP2 may be a position on the second antenna element ② at which the second signal line S2 is electrically connected to the second antenna element ②. When the wireless communication circuit disposed on the first printed circuit board 441 provides the radiation current to the second power feeding part FP2 of the second antenna element ②, the second linearly polarized wave may be radiated by a current path (or distribution of surface current) on the second antenna element ②.

According to an embodiment, the second antenna element ② may include a fifth rim E5, a sixth rim E6, a seventh rim E7, and/or an eighth rim E8. When viewed from above the rear surface plate 202 (e.g., when viewed in the −z-axis direction), the fifth rim E5 may be positioned to be spaced apart from the seventh rim E7 in the +x-axis direction and substantially parallel to the seventh rim E7. When viewed from above the rear surface plate 202, the sixth rim E6 may be positioned to be spaced apart from the eighth rim E8 in the +y-axis direction and substantially parallel to the eighth rim E8. The fifth rim E5 and the seventh rim E7 may extend in the +y-axis direction, and the sixth rim E6 and the eighth rim E8 may extend in the +x-axis direction. The fifth rim E5 and the seventh rim E7 may be substantially parallel to the sixth rim E6 and the eighth rim E8. In an embodiment, a third distance by which the fifth rim E5 is spaced apart from the seventh rim E7 in the +x-axis direction may be substantially equal to a fourth distance by which the sixth rim E6 is spaced apart from the eighth rim E8 in the +y-axis direction. As another example, the third distance and the fourth distance may be different from each other. In an embodiment, the second power feeding part FP2 may be positioned closer to the seventh rim E7 than the fifth rim E5, the sixth rim E6, and the eighth rim E8. When the radiation current is provided to the second power feeding part FP2, the second linearly polarized wave, which has the second polarization direction 62 (or oscillates in the second polarization direction 62), may be radiated by the current path (or distribution of surface current) on the second antenna element ②.

According to an embodiment, the second antenna element ② may include a plurality of notches (or slits) N5, N6, N7, and N8. The plurality of notches N5, N6, N7, and N8 may include a fifth notch N5 provided at the fifth rim E5, a sixth notch N6 provided at the sixth rim E6, a seventh notch N7 provided at the seventh rim E7, and an eighth notch N8 provided at the eighth rim E8. The fifth notch N5 may be an opening recessed in the fifth rim E5 in a direction (e.g., the −x-axis direction) from the fifth rim E5 toward the seventh rim E7. The sixth notch N6 may be an opening recessed in the sixth rim E6 in a direction (e.g., the −y-axis direction) from the sixth rim E6 toward the eighth rim E8. The seventh notch N7 may be an opening recessed in the seventh rim E7 in a direction (e.g., the +x-axis direction) from the seventh rim E7 toward the fifth rim E5. The eighth notch N8 may be an opening recessed in the eighth rim E8 in a direction (e.g., the +y-axis direction) from the eighth rim E8 toward the sixth rim E6. In an embodiment, the plurality of notches N5, N6, N7, and N8 may be arranged at an angle of substantially 90 degrees based on a second center C2 of the second antenna element ②. In an embodiment, the fifth notch N5 and the seventh notch N7 may be provided substantially symmetrically with respect to the second center C2, and the sixth notch N6 and the eighth notch N8 may be provided substantially symmetrically with respect to the second center C2. The second center C2 may be a point on the second antenna element ② positioned at substantially the same distance from the fifth rim E5 and the seventh rim E7 and positioned at substantially the same distance from the sixth rim E6 and the eighth rim E8. The second center C2 may be positioned between the fifth notch N5 and the seventh notch N7 and between the sixth notch N6 and the eighth notch N8. In an embodiment, the second antenna element ② may resonate in a selected or designated dual band. For example, the second antenna element ② may have an electrical length (e.g., a length expressed by a ratio of a wavelength) of a ½ length (half-wavelength) of a wavelength of the electromagnetic signal which is transmitted or received by the signal source and has the first resonant frequency (e.g., about 6.5 GHz). For example, the second antenna element ② may have an electrical length of a ½ length of a wavelength of an electromagnetic signal which is transmitted or received by the signal source and has the second resonant frequency (e.g., about 8 GHz). A pair of two notches, which is provided substantially symmetrically with respect to the second center C2 among the fifth notch N5, the sixth notch N6, the seventh notch N7, and the eighth notch N8, may contribute to allowing the second antenna element ② to have the first resonant frequency (e.g., about 6.5 GHz), and the remaining pair of notches may contribute to allowing the second antenna element ② to have the second resonant frequency (e.g., about 8 GHz) different from the first resonant frequency. The wireless communication circuit (e.g., the wireless communication module 192 in FIG. 1) may transmit or receive the first electromagnetic signal (e.g., the signal having the frequency of about 6.5 GHz) included in the selected or designated first frequency band (or the first usage frequency band or the first operating frequency band) through the second antenna element ②. The wireless communication circuit may transmit or receive the second electromagnetic signal (e.g., the signal having the frequency of about 8 GHz) included in the selected or designated second frequency band (or the second usage frequency band or the second operating frequency band) different from the first frequency band through the second antenna element ②.

According to an embodiment, the second power feeding part FP2 of the second antenna element ② may be positioned between the second center C2 and the seventh notch N7. For example, the second power feeding part FP2 may be positioned closer to the seventh notch N7 than the second center C2. When the second power feeding part FP2 is positioned closer to the seventh notch N7 than the second center C2, the second antenna element ② may have impedance that may reduce a loss of power in the dual band.

According to an embodiment, the layer of the printed circuit board 50, which includes the second antenna element ②), may include a part of the second signal line S2 connected to the second power feeding part FP2 of the second antenna element ② (e.g., a transmission line of a microstrip). In any embodiment, the second signal line S2 may be electrically connected to the second power feeding part FP2 of the second antenna element ② through a via. In any embodiment, the printed circuit board 50 may include a second power feeding element included in a different layer from the second antenna element ②, and the second power feeding element may be electrically connected to the second signal line S2. When viewed from above the rear surface 210B of the electronic device 200 (see FIG. 2) (e.g., when viewed in the −z-axis direction), the second antenna element ② may at least partially overlap the second power feeding element and be indirectly supplied with power by electromagnetic coupling with the second power feeding element.

According to various embodiments, the shape of the second antenna element ② or the position of the second power feeding part FP2 may be variously implemented in order to radiate the second linearly polarized wave while corresponding to at least one selected or designated frequency band without being limited to the illustrated example.

According to an embodiment, when the wireless communication circuit (e.g., the wireless communication module 192 in FIG. 1) provides (or supplies) the electromagnetic signal (or the radio signal or the radiation current) (e.g., the UWB signal) with at least one selected or designated frequency band to the third antenna element ③ through the third signal line S3, a third linearly polarized wave (or a third straight polarized wave) with at least one selected or designated frequency band may be radiated from the third antenna element ③. The third linearly polarized wave may be an electromagnetic wave that propagates while oscillating in a third polarization direction 63. The third linearly polarized wave may refer, for example, to a polarity direction of an electric field with respect to a propagation direction (or a transmission direction) of the electromagnetic wave radiated (or transmitted) from the third antenna element ③. The third polarization direction 63 is a direction in which the electric field oscillates (or a direction parallel to a vector of the electric field), and the third polarization direction 63 may be perpendicular to the propagation direction of the electromagnetic wave. In an embodiment, the propagation direction of the electromagnetic wave may be a direction (e.g., the +z-axis direction) in which an x-y plane of the third antenna element ③ having a flat plate shape is directed. The third polarization direction 63 may be substantially perpendicular to the polarization direction 62 of the second linearly polarized wave. For example, the polarization direction 63 of the third linearly polarized wave may be the y-axis direction of the electronic device 200. The third antenna element ③ may include one third power feeding part (or a third power feeding point) FP3, which is a part from which the electromagnetic signal is supplied. The third power feeding part FP3 may be a position on the third antenna element ③ at which the third signal line S3 is electrically connected to the third antenna element ③. When the wireless communication circuit disposed on the first printed circuit board 441 provides the radiation current to the third power feeding part FP3 of the third antenna element ③, the third linearly polarized wave may be radiated by a current path (or distribution of surface current) on the third antenna element ③.

According to an embodiment, the third antenna element ③ may include a ninth rim E9, a tenth rim E10, an eleventh rim E11, and/or a twelfth rim E12. When viewed from above the rear surface plate 202 (e.g., when viewed in the −z-axis direction), the ninth rim E9 may be positioned to be spaced apart from the eleventh rim E11 in the +x-axis direction and substantially parallel to the eleventh rim E11. When viewed from above the rear surface plate 202, the tenth rim E10 may be positioned to be spaced apart from the twelfth rim E12 in the +y-axis direction and substantially parallel to the twelfth rim E12. The ninth rim E9 and the eleventh rim E11 may extend in the +y-axis direction, and the tenth rim E10 and the twelfth rim E12 may extend in the +x-axis direction. The ninth rim E9 and the eleventh rim E11 may be substantially perpendicular to the tenth rim E10 and the twelfth rim E12. In an embodiment, a fifth distance by which the ninth rim E9 is spaced apart from the eleventh rim E11 in the +x-axis direction may be substantially equal to a sixth distance by which the tenth rim E10 is spaced apart from the twelfth rim E12 in the +y-axis direction. As another example, the fifth distance and the sixth distance may be different from each other. In an embodiment, the third power feeding part FP3 may be positioned closer to the twelfth rim E12 than the ninth rim E9, the tenth rim E10, and the eleventh rim E11. When the radiation current is provided to the second power feeding part FP2, the third linearly polarized wave, which has the third polarization direction 63 (or oscillates in the third polarization direction 63), may be radiated by the current path (or distribution of surface current) on the third antenna element ③.

According to an embodiment, the third antenna element ③ may include a plurality of notches (or slits) N9, N10, N11, and N12. The plurality of notches N9, N10, N11, and N12 may include a ninth notch N9 provided at the ninth rim E9, a tenth notch N10 provided at the tenth rim E10, an eleventh notch N11 provided at the eleventh rim E11, and a twelfth notch N12 provided at the twelfth rim E12. The ninth notch N9 may be an opening recessed in the ninth rim E9 in a direction (e.g., the −x-axis direction) from the ninth rim E9 toward the eleventh rim E11. The tenth notch N10 may be an opening recessed in the tenth rim E10 in a direction (e.g., the −y-axis direction) from the tenth rim E10 toward the twelfth rim E12. The eleventh notch N11 may be an opening recessed in the eleventh rim E11 in a direction (e.g., the +x-axis direction) from the eleventh rim E11 toward the ninth rim E9. The twelfth notch N12 may be an opening recessed in the twelfth rim E12 in a direction (e.g., the +y-axis direction) from the twelfth rim E12 toward the tenth rim E10. In an embodiment, the plurality of notches N9, N10, N11, and N12 may be arranged at an angle of substantially 90 degrees based on a third center C3 of the third antenna element ③. In an embodiment, the ninth notch N9 and the eleventh notch N11 may be provided substantially symmetrically with respect to the third center C3, and the tenth notch N10 and the twelfth notch N12 may be provided substantially symmetrically with respect to the third center C3. The third center C3 may be a point on the third antenna element ③ positioned at substantially the same distance from the ninth rim E9 and the eleventh rim E11 and positioned at substantially the same distance from the tenth rim E10 and the twelfth rim E12. The third center C3 may be positioned between the ninth notch N9 and the eleventh notch N11 and between the tenth notch N10 and the twelfth notch N12. In an embodiment, the third antenna element ③ may resonate in a selected or designated dual band. For example, the third antenna element ③ may have an electrical length (e.g., a length expressed by a ratio of a wavelength) of a ½ length (half-wavelength) of a wavelength of the electromagnetic signal which is transmitted or received by the signal source and has the first resonant frequency (e.g., about 6.5 GHz). For example, the third antenna element ③ may have an electrical length of a ½ length of a wavelength of an electromagnetic signal which is transmitted or received by the signal source and has the second resonant frequency (e.g., about 8 GHz). A pair of two notches, which is provided substantially symmetrically with respect to the third center C3 among the ninth notch N9, the tenth notch N10, the eleventh notch N11, and the twelfth notch N12, may contribute to allowing the third antenna element ③ to have the first resonant frequency (e.g., about 6.5 GHz), and the remaining pair of notches may contribute to allowing the third antenna element ③ to have the second resonant frequency (e.g., about 8 GHz) different from the first resonant frequency. The wireless communication circuit (e.g., the wireless communication module 192 in FIG. 1) may transmit or receive the first electromagnetic signal (e.g., the signal having the frequency of about 6.5 GHz) included in the selected or designated first frequency band (or the first usage frequency band or the first operating frequency band) through the third antenna element ③. The wireless communication circuit may transmit or receive the second electromagnetic signal (e.g., the signal having the frequency of about 8 GHz) included in the selected or designated second frequency band (or the second usage frequency band or the second operating frequency band) different from the first frequency band through the third antenna element ③.

According to an embodiment, the third power feeding part FP3 of the third antenna element ③ may be positioned between the third center C3 and the twelfth notch N12. For example, the third power feeding part FP3 may be positioned closer to the twelfth notch N12 than the third center C3. When the third power feeding part FP3 is positioned closer to the twelfth notch N12 than the third center C3, the third antenna element ③ may have impedance that may reduce a loss of power in the dual band.

According to an embodiment, the layer of the printed circuit board 50, which includes the third antenna element ③, may include a part of the third signal line S3 connected to the third power feeding part FP3 of the third antenna element ③ (e.g., a transmission line of a micro-strip). In any embodiment, the third signal line S3 may be electrically connected to the third power feeding part FP3 of the third antenna element ③ through a via. In any embodiment, the printed circuit board 50 may include a third power feeding element included in a different layer from the third antenna element ③, and the third power feeding element may be electrically connected to the third signal line S3. When viewed from above the rear surface 210B of the electronic device 200 (see FIG. 2) (e.g., when viewed in the −z-axis direction), the third antenna element ③ may at least partially overlap the third power feeding element and be indirectly supplied with power by electromagnetic coupling with the third power feeding element.

According to various embodiments, the shape of the third antenna element ③ or the position of the third power feeding part FP3 may be variously implemented in order to radiate the third linearly polarized wave while corresponding to at least one selected or designated frequency band without being limited to the illustrated example.

According to various embodiments, the first antenna element ①, the second antenna element ②, or the third antenna element ③ may be implemented to resonate substantially at one frequency (e.g., the first usage frequency (e.g., about 6.5 GHz) or the second usage frequency (e.g., about 8 GHz)). In this case, the antenna element (e.g., the first antenna element ①, the second antenna element ②, or the third antenna element ③) may be provided in the form including no notch.

According to various embodiments, a shape of at least one antenna element, and/or a position or number of a feeding part (e.g., a feeding point) relative to the at least one antenna element may be variously implemented without being limited to the illustrated example. For example, a plurality of feeding parts relative to at least one antenna element may be provided. The wireless communication circuit (e.g., the wireless communication module 192 in FIG. 1) or the processor (e.g., the processor 120) may select at least one of the plurality of the feeding parts according to various conditions (e.g., communication performance, postures of the electronic device, etc.). The wireless communication circuit may supply an electromagnetic signal (or a radio signal or radiation current) to the at least one antenna element. A polarization direction of an electromagnetic wave radiated from the least one antenna element may depends to the selection of the at least one feeding part relative to the least one antenna element. By the selection of the at least one feeding part relative to the least one antenna element, combinations of a plurality of polarized waves having various polarization directions may be provided without being limited to the illustrated example.

Although not illustrated, the second antenna structure 5 may be positioned in the inner space of the housing 210 such that the first surface of the second antenna structure 5 faces the front plate 201. For example, the second antenna structure 5 or the first part 51 of the second antenna structure 5 may be positioned on the rear surface of the display module 301 or below or beneath the display module 301 such that the first surface of the second antenna structure 5 faces the display module 301. In some embodiments, the second antenna structure 5 or the first part 51 of the second antenna structure 5 may be aligned and positioned in a recess formed on the rear surface of the display module 301. The display module 301 may include a conductive layer (e.g., a copper layer) configured to face the first support member 410. The conductive layer may be configured to perform a function of electromagnetic shielding and/or heat dissipation. A recess formed on the rear surface of the display module 301 may be a groove having a shape in which an area of the conductive layer of the display module 301, which corresponds to the second antenna structure 5 (or the first part 51 of the second antenna structure 5) or the antenna array AR, is removed. The second antenna structure 5 may be configured to receive a signal from the outside, which passes through the front plate 201 and the display module 301. The signal from the second antenna structure 5 may be configured to transmit to the outside through the front plate 201 and the display module 301. In an embodiment, an air gap may be positioned between the second antenna structure 5 (or the first part 51 of the second antenna structure 5) and the display module 301 to secure antenna radiation performance of the second antenna structure 5. A partial area of the display module 301, which at least partially overlaps the second antenna structure 5 (or the first part 51 of the second antenna structure 5) or the antenna array AR may include a different pixel structure and/or wiring structure compared to other areas. For example, a partial area of the display module 301, which at least partially overlaps the second antenna structure 5 (or the first part 51 of the second antenna structure 5) or the antenna array AR, may have a different pixel density compared to other areas. A pixel structure and/or a wiring structure formed in a partial area of the display module 301, which at least partially overlaps the second antenna structure 5 (or the first part 51 of the second antenna structure 5) or the antenna array AR may be configured to reduce loss of a signal, between the outside and the second antenna structure 5.

Although not illustrated, the antenna array AR may be embedded in the display module 301. For example, the antenna AR may be implemented as an antenna-on-display (AoD) which is optically transparent. The antenna array AR may be configured to receive a signal from the outside, which passes through the front plate 201. The signal from the antenna array AR may be configured to transmit to the outside through the front plate 201.

Although the electronic device 200 including the second antenna structure antenna 5 has an appearance of a bar type or a plate-type electronic device, the electronic device 200 is not limited thereto. For example, the electronic device 2 including the second antenna structure 5 may be implemented as a foldable type electronic device, a slidable electronic device, a stretchable electronic device, and/or a rollable electronic device.

Figure 7:
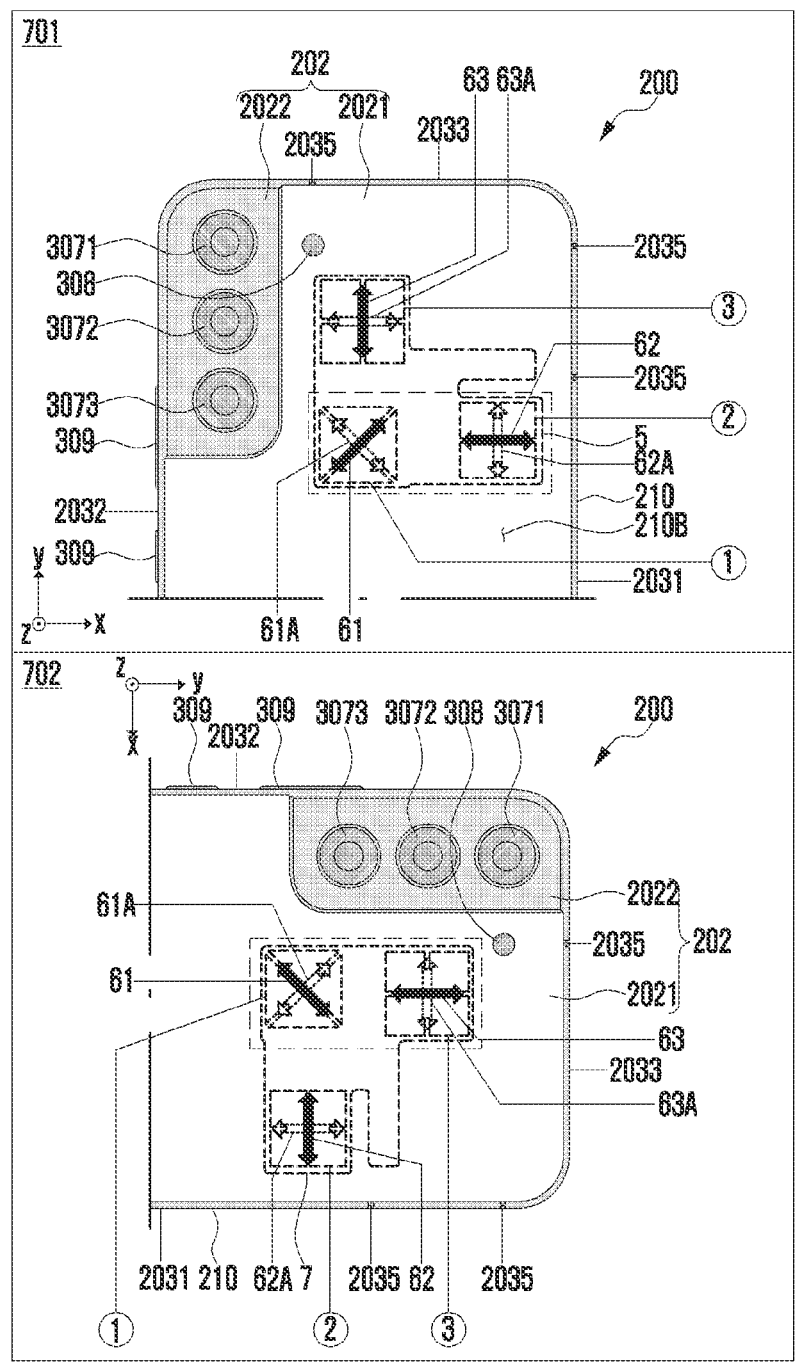
FIG. 7 is a diagram illustrating a part of the electronic device according to various embodiments.

FIG. 7 is a diagram illustrating a part of the electronic device 200 according to various embodiments.

With reference to FIG. 7, the electronic device 200 may be disposed in a vertical posture (e.g., portrait orientation) (see reference numeral '701') or a horizontal posture (e.g., landscape orientation) (see reference numeral '702'). In an embodiment, the electronic device 200 may perform a positioning function using a time difference between signals received through the first antenna element ① and the second antenna element ② in the vertical posture and using a phase difference made by the time difference. In an embodiment, the electronic device 200 may perform the positioning function using a time difference between signals received through the first antenna element ① and the third antenna element ③ in the horizontal posture and using a phase difference made by the time difference. The second antenna structure 5 according to an embodiment may reduce an influence of the posture of the electronic device 200 that affects radio wave transmitting/receiving performance (or communication performance). The second antenna structure 5 according to an embodiment may reduce a difference between the radio wave transmitting/receiving performance in the vertical posture of the electronic device 200 and the radio wave transmitting/receiving performance in the horizontal posture of the electronic device 200. For example, in the vertical or horizontal posture of the electronic device 200, the linearly polarized wave radiated from the first antenna element ① and the second antenna element ② may provide a polarization direction in which the electromagnetic wave radiated from the signal source may be smoothly received. Hereinafter, for assisting in understanding the reception of radio waves according to the postures of the electronic device 200, the signal source is referred to as radiating a horizontally polarized wave (e.g., a polarized wave in which an electric field oscillates in the horizontal direction).

According to an embodiment, the first linearly polarized wave radiated from the first antenna element ① may include a first polarization component corresponding to the second polarization direction 62 of the second linearly polarized wave radiated from the second antenna element ②. The first linearly polarized wave may include a composite wave made by synthesizing the first polarization component and a second polarization component. The first polarization component may oscillate substantially in the second polarization direction 62. The first linearly polarized wave radiated from the first antenna element ① may include the second polarization component corresponding to the third polarization direction 63 of the third linearly polarized wave radiated from the third antenna element ③. The second polarization component may oscillate substantially in the third polarization direction 63.

According to an embodiment, when the positioning function is performed using the first antenna element ① and the second antenna element ② in the vertical posture of the electronic device 200, the first antenna element ① and the second antenna element ② may receive the horizontally polarized wave from the signal source because of a directionality of the electromagnetic wave (e.g., a direction in which an electric field oscillates, a polarity direction of an electric field, or a direction of an electric field). The electronic device 200 may perform the positioning with respect to the signal source (e.g., positioning for measuring an angle and/or positioning for measuring a distance) on the basis of the time difference and the phase difference between the signal received through the first antenna element ① and the signal received through the second antenna element ② in the vertical posture of the electronic device 200. The polarization direction of the first polarization component radiated from the first antenna element ① may be provided so that the horizontally polarized wave radiated from the signal source may be smoothly received so that the first antenna element ① may have radio wave receiving efficiency capable of ensuring accuracy and reliability (or quality) of the positioning function in the vertical posture of the electronic device 200. The second polarization direction 62 of the second linearly polarized wave radiated from the second antenna element ② may be provided so that the horizontally polarized wave radiated from the signal source may be smoothly received so that the second antenna element ② may have radio wave receiving efficiency capable of ensuring accuracy and reliability of the positioning function in the vertical posture of the electronic device 200. For example, the radio wave receiving efficiency may be substantially maximized in case that the polarization direction of the first polarization component radiated from the first antenna element ① and the second polarization direction 62 of the second linearly polarized wave radiated from the second antenna element ② are parallel to the polarization direction of the horizontally polarized wave radiated from the signal source in the vertical posture of the electronic device 200.

According to an embodiment, when the positioning function is performed using the first antenna element ① and the third antenna element ③ in the horizontal posture of the electronic device 200, the first antenna element ① and the third antenna element ③ may receive the horizontally polarized wave from the signal source because of a directionality of the electromagnetic wave (e.g., a direction in which an electric field oscillates, a polarity direction of an electric field, or a direction of an electric field). The electronic device 200 may perform the positioning with respect to the signal source (e.g., positioning for measuring an angle and/or positioning for measuring a distance) on the basis of the time difference and the phase difference between the signal received through the first antenna element ① and the signal received through the third antenna element ③ in the horizontal posture of the electronic device 200. The polarization direction of the second polarization component radiated from the first antenna element ① may be provided so that the horizontally polarized wave radiated from the signal source may be smoothly received so that the first antenna element ① may have radio wave receiving efficiency capable of ensuring accuracy and reliability of the positioning function in the horizontal posture of the electronic device 200. The third polarization direction 63 of the third linearly polarized wave radiated from the third antenna element ③ may be provided so that the horizontally polarized wave radiated from the signal source may be smoothly received so that the third antenna element ③ may have radio wave receiving efficiency capable of ensuring accuracy and reliability of the positioning function in the horizontal posture of the electronic device 200. For example, the radio wave receiving efficiency may be substantially maximized in case that the polarization direction of the second polarization component radiated from the first antenna element ① and the third polarization direction 63 of the third linearly polarized wave radiated from the third antenna element ③ are parallel to the polarization direction of the horizontally polarized wave radiated from the signal source in the horizontal posture of the electronic device 200.

According to various embodiments, when the position of the first power feeding part FP1 (see FIG. 6) is changed, the first linearly polarized wave radiated by the first antenna element ① may be configured to have a direction indicated by reference numeral '61' and the first polarization direction different from the second polarization direction 62 and the third polarization direction 63. For example, the first linearly polarized wave radiated by the first antenna element ① may be configured to have a first polarization direction 61A perpendicular to the direction indicated by reference numeral '61'. As described above, the first linearly polarized wave has the polarization component, which is parallel to the second polarization direction 62 of the second linearly polarized wave radiated by the second antenna element ②, and the polarization component that is parallel to the third polarization direction 63 of the third linearly polarized wave radiated by the third antenna element ③. Therefore, it is possible to ensure accuracy and quality of positioning even though a direction or posture in which the electronic device 200 is directed varies.

According to various embodiments, the second linearly polarized wave radiated by the second antenna element ② may be configured to have a direction indicated by reference numeral '62' and the second polarization direction different from the first polarization direction 61. The third linearly polarized wave radiated by the third antenna element ③ may be configured to have a direction indicated by reference numeral '63' and the third polarization direction different from the first polarization direction 61. The second polarization direction and the third polarization direction may be configured to be different from each other. For example, the second linearly polarized wave radiated by the second antenna element ② may be configured to have a second polarization direction 62A perpendicular to the direction indicated by reference numeral '62'. The third linearly polarized wave radiated by the third antenna element ③ may be configured to have the third polarization direction 63A perpendicular to the direction indicated by reference numeral '63'. As described above, the first linearly polarized wave has the polarization component, which is parallel to the second polarization direction 62A of the second linearly polarized wave radiated by the second antenna element ②, and the polarization component that is parallel to the third polarization direction 63A of the third linearly polarized wave radiated by the third antenna element ③. Therefore, it is possible to ensure accuracy and quality of positioning even though a direction or posture in which the electronic device 200 is directed varies.

According to various embodiments, in the antenna array including the two antenna elements arranged in the horizontal direction, the horizontally polarized wave (e.g., the polarized wave in which the electric field oscillates in the horizontal direction) may substantially affect assurance or improvement of radio wave receiving efficiency. In the antenna array including the two antenna elements arranged in the vertical direction, the vertically polarized wave (e.g., the polarized wave in which the electric field oscillates in the vertical direction) may substantially affect assurance or improvement of radio wave receiving efficiency.

Figure 8:
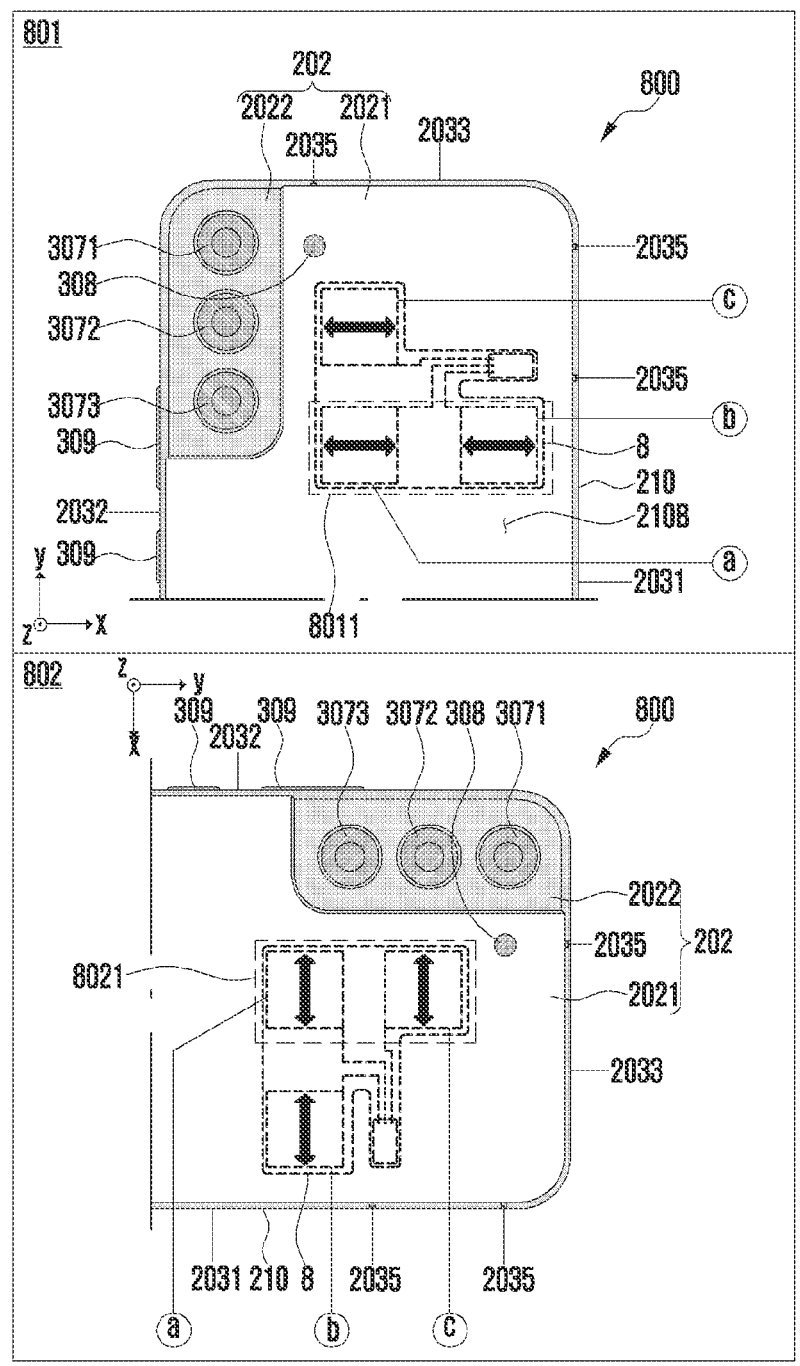
FIG. 8 is a diagram illustrating a part of an electronic device according to a comparative example.
Figure 9:
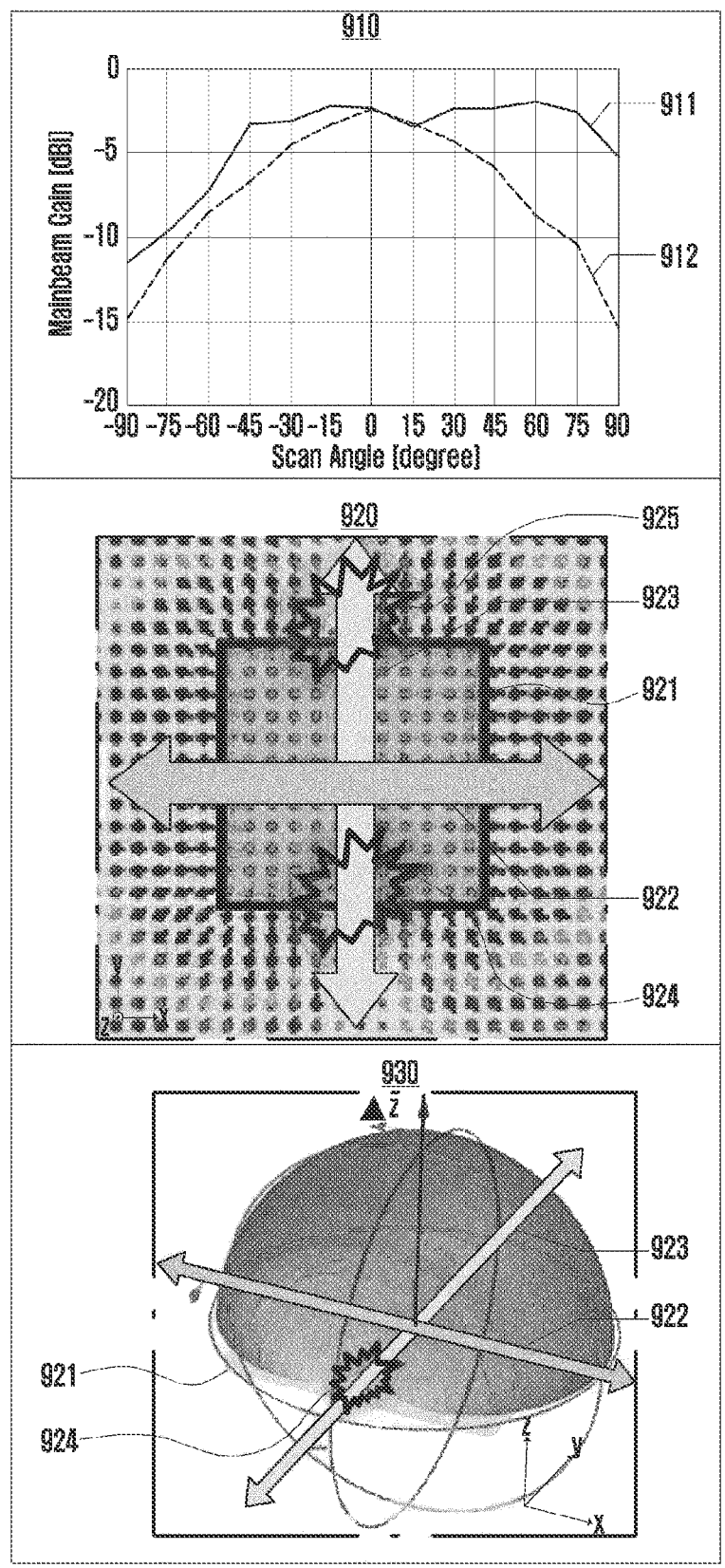
FIG. 9 is a graph illustrating radiation characteristics of a second antenna structure included in the electronic device according to the comparative example, a diagram illustrating an electric field distribution of the second antenna structure, and a diagram illustrating a radiation pattern of the second antenna structure according to various embodiments.
Figure 10:
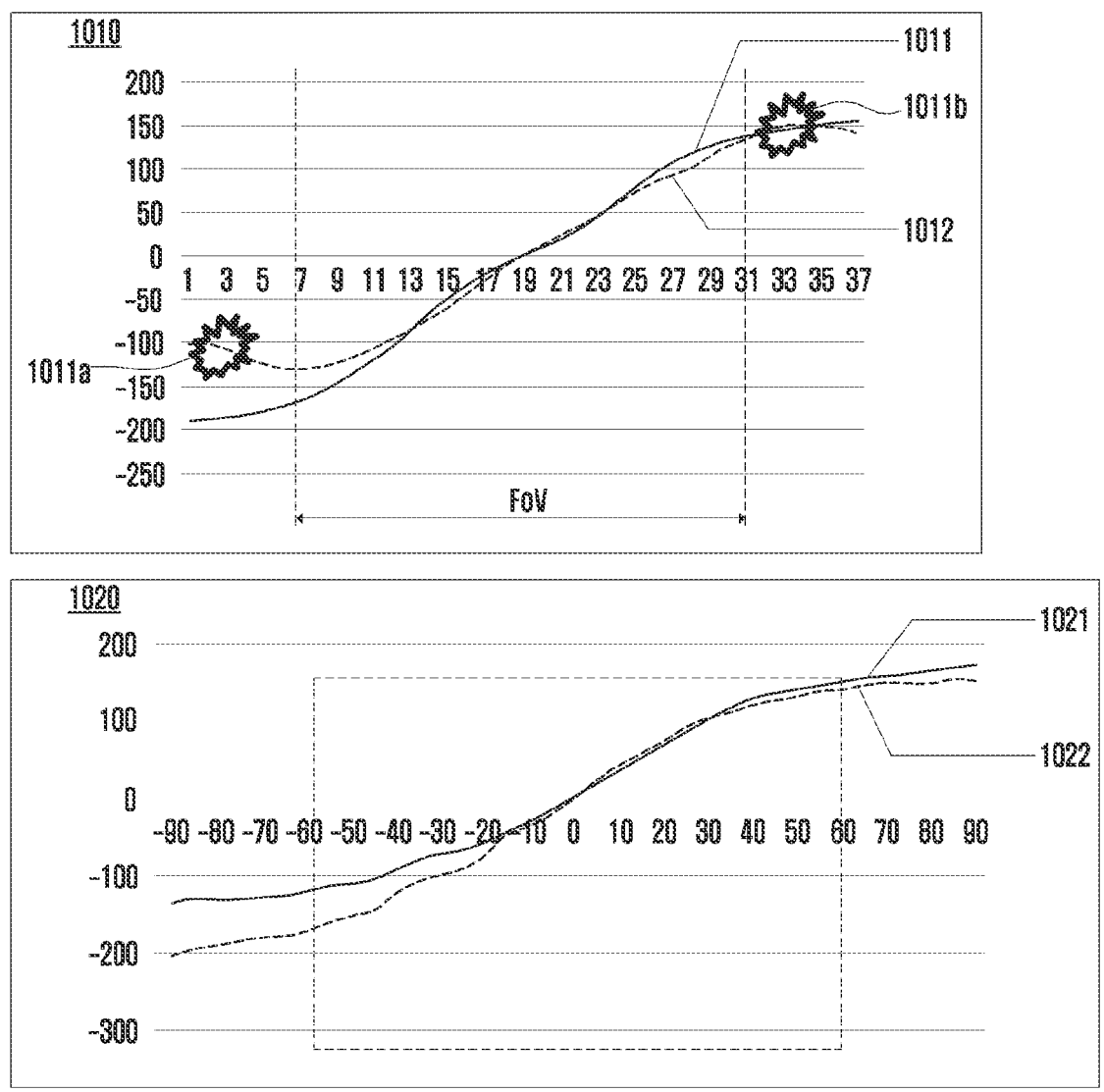
FIG. 10 is a graph illustrating PDoA characteristics related to the electronic device according to the comparative example, and a graph illustrating PDoA characteristics related to the electronic device according to various embodiments.

FIG. 8 is a diagram illustrating a part of an electronic device 800 according to a comparative example. FIG. 9 is a graph illustrating radiation characteristics of a second antenna structure 8 included in the electronic device 800 according to the comparative example, a diagram illustrating an electric field distribution of the second antenna structure 8, and a diagram illustrating a radiation pattern of the second antenna structure 8. FIG. 10 is a graph illustrating PDoA (phase difference of arrival) characteristics related to the electronic device 800 according to the comparative example, and a graph illustrating PDoA characteristics related to the electronic device 200 according to various embodiments.

With reference to FIG. 8, the electronic device 800 of the comparative example may include the second antenna structure 8 that is substituted for the second antenna structure 5 according to an embodiment. Hereinafter, the comparative example is provided just to be compared with an embodiment of the disclosure but does not have the preceding status with respect to various embodiments of the disclosure. For example, a first antenna element ⓐ, a second antenna element ⓑ, and a third antenna element ⓒ included in the second antenna structure 8 of the comparative example may radiate linearly polarized waves having a polarization direction substantially parallel to the x-axis direction of the electronic device 800.

According to an embodiment, when a positioning function is performed using an array 8011 including the first antenna element ⓐ and the second antenna element ⓑ in a vertical posture (see reference numeral '801') of the electronic device 800, the first antenna element ⓐ and the second antenna element ⓑ may receive the horizontally polarized wave from the signal source because of a directionality of the electromagnetic wave (e.g., a direction in which an electric field oscillates, a polarity direction of an electric field, or a direction of an electric field). In the vertical posture of the electronic device 800, the first antenna element ⓐ and the second antenna element ⓑ included in the array 8011 may be positioned substantially in the polarization direction of the horizontally polarized wave from the signal source. In the vertical posture of the electronic device 800, the polarization direction of the first linearly polarized wave radiated from the first antenna element ⓐ and the polarization direction of the second linearly polarized wave radiated from the second antenna element ⓑ may be substantially parallel to the polarization direction of the horizontally polarized wave from the signal source. The electronic device 200 may perform the positioning with respect to the signal source (e.g., positioning for measuring an angle and/or positioning for measuring a distance) on the basis of the time difference and the phase difference between the signal received through the first antenna element ⓐ and the signal received from the second antenna element ⓑ in the vertical posture of the electronic device 800. The polarization direction of the linearly polarized wave radiated from the first antenna element ⓐ and the polarization direction of the linearly polarized wave radiated from the second antenna element ⓑ may be provided so that the horizontally polarized wave radiated from the signal source may be smoothly received so that the first antenna element ⓐ and the second antenna element ⓑ may have radio wave receiving efficiency capable of ensuring accuracy and reliability of the positioning function in the vertical posture of the electronic device 800.

According to an embodiment, when a positioning function is performed using an array 8021 including the first antenna element ⓐ and the third antenna element ⓒ in a horizontal posture (see reference numeral '802') of the electronic device 800, it may be difficult for the first antenna element ⓐ and the third antenna element ⓑ to smoothly receive the horizontally polarized wave from the signal source because of a directionality of the electromagnetic wave (e.g., a direction in which an electric field oscillates, a polarity direction of an electric field, or a direction of an electric field). In the horizontal posture of the electronic device 800, the first antenna element ⓐ and the third antenna element ⓒ included in the array 8021 may be positioned substantially in the polarization direction of the horizontally polarized wave from the signal source. In the horizontal posture of the electronic device 800, the polarization direction of the first linearly polarized wave radiated from the first antenna element ⓐ and the polarization direction of the third linearly polarized wave radiated from the third antenna element ⓒ may not be parallel to the polarization direction of the horizontally polarized wave from the signal source. In the horizontal posture of the electronic device 800, the polarization direction of the linearly polarized wave radiated from the first antenna element ⓐ and the polarization direction of the linearly polarized wave radiated from the third antenna element ⓒ cannot smoothly receive the horizontally polarized wave radiated from the signal source. For example, in the horizontal posture of the electronic device 200, the polarization direction of the linearly polarized wave radiated from the first antenna element ⓐ and the polarization direction of the linearly polarized wave radiated from the third antenna element ⓒ may be substantially perpendicular to the polarization direction of the horizontally polarized wave radiated from the signal source. In this case, the radio wave receiving efficiency may be substantially minimized. In the horizontal posture of the electronic device 800, it is difficult to ensure radio wave receiving efficiency of the first antenna element ⓐ and radio wave receiving efficiency of the third antenna element ⓒ, such that it is difficult to ensure accuracy and reliability of the positioning function using the first antenna element ⓐ and the third antenna element ⓒ.

With reference to FIG. 9, reference numeral '910' indicates a graph showing radiation characteristics according to a beam scanning angle of an antenna element 921 (e.g., the first antenna element ⓐ, the second antenna element ⓑ, or the third antenna element ⓒ) included in the second antenna structure 8 according to the comparative example Reference numeral '920' indicates an electric field distribution of a part of the second antenna structure 8 according to the comparative example that includes the antenna element 921. Reference numeral '930' indicates a radiation pattern (or a beam pattern) of the antenna element 921 included in the second antenna structure 8 according to the comparative example. The linearly polarized wave radiated from the antenna element 921 may have the polarization direction (e.g., a direction in which an electric field oscillates, a polarity direction of an electric field, or a direction of an electric field) 922 corresponding to the x-axis direction. Therefore, it is possible to provide a radiation pattern having a directionality with respect to a space in which an x-y plane of an antenna element 821. The radiation pattern provided by the antenna element 921 may include a first radiation area (or a first radiation pattern) corresponding to the polarization direction 922 (e.g., an x-z plane as an E-plane), and a second radiation area (or a second radiation pattern) corresponding to a direction (e.g., a y-z plane as an H-plane) perpendicular to the polarization direction 922. Reference numeral '911' indicates a graph showing a main beam gain (or a main lobe gain) according to a beam scanning angle related to the first radiation area corresponding to the polarization direction 922. For example, in the example in FIG. 8, the graph indicated by reference numeral '911' may correspond to a case in which the array 8011 including the first antenna element ⓐ and the second antenna element ⓑ is used in the vertical posture of the electronic device 800. Reference numeral '912' indicates a graph showing a main beam gain according to a beam scanning angle related to the second radiation area corresponding to a direction 923 perpendicular to the polarization direction 922. For example, in the example in FIG. 8, the graph indicated by reference numeral '912' may correspond to a case in which the array 8021 including the first antenna element ⓐ and the third antenna element ⓒ is used in the horizontal posture of the electronic device 800. The first radiation area corresponding to the polarization direction 922 may include null areas 924 and 925 in which the gain relatively decreases in the direction perpendicular to the polarization direction 922 in comparison with the second radiation area corresponding to the direction perpendicular to the polarization direction 922. The null areas 924 and 925 are ineffective areas in which it is difficult to substantially transmit (or radiate) or receive (or detect) the electromagnetic wave. For example, the null areas 924 and 925 may be portions where intensity of the electric field is substantially 0 in the electric field distribution. When the positioning function is performed using the first antenna element ⓐ and the third antenna element ⓒ in the horizontal posture of the electronic device 800, it may be difficult to smoothly receive the horizontally polarized wave from the signal source through the first antenna element ⓐ and the third antenna element ⓒ because of the null areas 924 and 925 in the direction perpendicular to the polarization direction 922.

The second antenna structure 5 included in the electronic device 200 according to an embodiment may reduce an influence of the posture of the electronic device 200 that affects the radio wave receiving efficiency in comparison with the second antenna structure 8 included in the electronic device 800 according to the comparative example. The second antenna structure 5 according to an embodiment may reduce a difference between the radio wave receiving efficiency in the vertical posture of the electronic device 200 and the radio wave receiving efficiency in the horizontal posture of the electronic device 200 in comparison with the second antenna structure 8 according to the comparative example, which makes it possible to reduce an influence of the posture of the electronic device 200 that affects accuracy and reliability of the positioning function.

With reference to FIGS. 8 and 10, reference numeral '1010' indicates a graph showing PDoA characteristics of the electronic device 800 according to the comparative example. Reference numeral '1011' indicates a graph showing PDoA characteristics between the signals received from the signal source through the first antenna element ⓐ and the second antenna element ⓑ while the electronic device 800 in the vertical posture rotates in a designated angle range about a center axis parallel to the y-axis direction. The designated angle range is a rotation range that allows the electronic device ensures reliability related to data received from the signal source. For example, the designated angle range may be about −60 degrees to about +60 degrees. Reference numeral '1012' indicates a graph showing PDoA characteristics between the signals received from the signal source through the first antenna element ⓐ and the third antenna element ⓒ while the electronic device 800 in the horizontal posture rotates in the designated angle range about the center axis parallel to the x-axis direction. Reference numeral '1020' indicates a graph showing PDoA characteristics of the electronic device 200 according to an embodiment. Reference numeral '1021' indicates a graph showing PDoA characteristics between the signals received from the signal source through the first antenna element ① and the second antenna element ② while the electronic device 200 in the vertical posture rotates in a designated angle range about a center axis parallel to the y-axis direction. Reference numeral '1022' indicates a graph showing PDoA characteristics between the signals received from the signal source through the first antenna element ① and the third antenna element ③ when the horizontally polarized wave is received from the signal source through the second antenna structure 5 while the electronic device 200 in the horizontal posture rotates in the designated angle range about center axis parallel to the x-axis direction.

In case that the electronic device 800 according to the comparative example performs the positioning function using the first antenna element ⓐ and the third antenna element ⓒ in the horizontal posture, it may be difficult to ensure accuracy and reliability of the positioning function because of the null areas 924 and 925 included in the second radiation area corresponding to the direction perpendicular to the polarization direction 922 in comparison with the case in which the positioning function is performed using the first antenna element ⓐ and the second antenna element ⓑ in the vertical posture. The PDoA characteristics between the signals received through the first antenna element ⓐ and the third antenna element ⓒ in the horizontal posture of the electronic device 800 according to the comparative example may include a reversal phenomenon in which linearity of the PdoA deteriorates or the PdoA does not follow the linearity as a measurement angle increases (see reference numeral '1011a' and '1011b') in comparison with the PDoA characteristics between the signals received through the first antenna element ⓐ and the second antenna element ⓑ in the vertical posture of the electronic device 800 according to the comparative example. For example, the reversal phenomenon in which linearity of the PdoA deteriorates or the PdoA does not follow the linearity may cause an error in which the signal source is identified or estimated as being present in the angle range (e.g., a field of view (FoV)) for measuring the AOA even though the signal source deviates from the angle range.

The second antenna structure 5 according to an embodiment may reduce a decrease in gain in the horizontal posture of the electronic device 200 in comparison with the second antenna structure 8 according to the comparative example. The second antenna structure 5 according to an embodiment may reduce a difference between the radio wave receiving efficiency in the vertical posture of the electronic device 200 and the radio wave receiving efficiency in the horizontal posture of the electronic device 200 in comparison with the second antenna structure 8 according to the comparative example, which makes it possible to reduce an influence of the posture of the electronic device 200 that affects accuracy and reliability of the positioning function.

Figure 11:
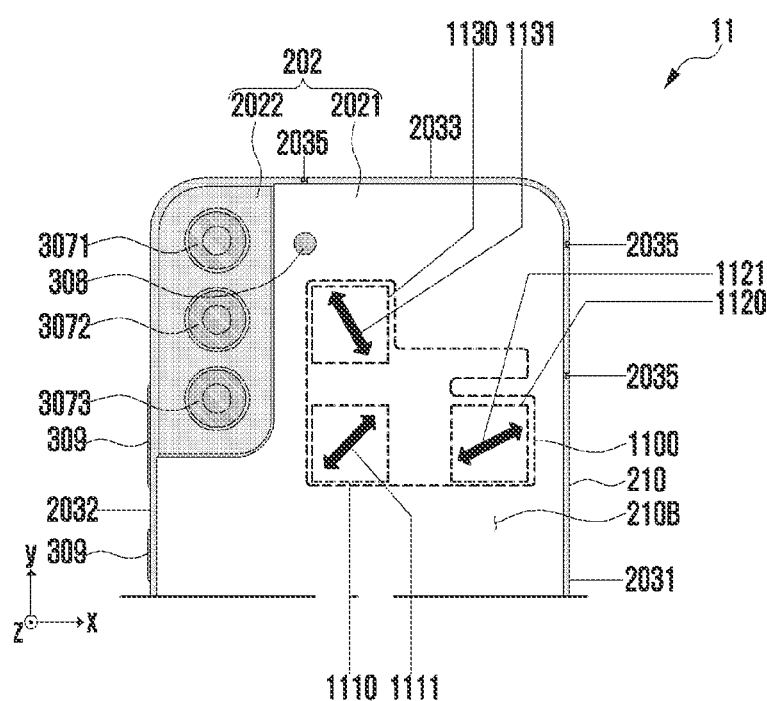
FIG. 11 is a diagram illustrating a part of the electronic device according to various embodiments.

FIG. 11 is a diagram illustrating a part of an electronic device 11 according to various embodiments.

With reference to FIG. 11, the electronic device 11 may include a second antenna structure 1100 that is substituted for the second antenna structure 5 in FIG. 6. The second antenna structure 1100 may include a first antenna element 1110, a second antenna element 1120, and a third antenna element 1130. The electronic device 11 may perform the positioning function with respect to the signal source using the time difference and the phase difference between the signal received from the first antenna element 1110 and the signal received from the second antenna element 1120 in the vertical posture. The electronic device 11 may perform the positioning function with respect to the signal source using the time difference and the phase difference between the signal received from the first antenna element 1110 and the signal received from the third antenna element 1130 in the horizontal posture. When the power is supplied, the first antenna element 1110 may radiate the first linearly polarized wave, which has a first polarization direction 1111 (or oscillates in the first polarization direction 1111), in the +z-axis direction of the electronic device 200 (e.g., the propagation direction of the electromagnetic wave). When the power is supplied, the second antenna element 1120 may radiate the second linearly polarized wave, which has a second polarization direction 1121 (or oscillates the second polarization direction 1121), in the +z-axis direction of the electronic device 200 (e.g., the propagation direction of the electromagnetic wave). When the power is supplied, the third antenna element 1130 may radiate the third linearly polarized wave, which has a third polarization direction 1131 (or oscillates in the third polarization direction 1131), in the +z-axis direction of the electronic device 200 (e.g., the propagation direction of the electromagnetic wave).

According to an embodiment, the first polarization direction 1111, the second polarization direction 1121, and the third polarization direction 1131 may be different from one another. The first polarization direction 1111, the second polarization direction 1121, and the third polarization direction 1131 may not be parallel to the x-axis direction and the y-axis direction of the electronic device 11. For example, the first polarization direction 1111 and the second polarization direction 1121 may be an acute or obtuse angle with respect to the +x-axis direction of the electronic device 11 (e.g., a positive direction of the x-axis). An angle between the first polarization direction 1111 and the +x-axis direction may be different from an angle between the second polarization direction 1121 and the +x-axis direction. For example, the third polarization direction 1131 may be an acute or obtuse angle with respect to the −x-axis direction of the electronic device 11 (e.g., a negative direction of the x-axis). An angle between the third polarization direction 1131 and the −x-axis direction of the electronic device 11 may be equal to or different from an angle between the first polarization direction 1111 and the −x-axis direction or an angle between the second polarization direction 1121 and the −x-axis direction.

The second antenna structure 1100 according to an embodiment may reduce a difference between the radio wave receiving efficiency in the vertical posture of the electronic device 11 and the radio wave receiving efficiency in the horizontal posture of the electronic device 11, which makes it possible to reduce an influence of the posture of the electronic device 11 that affects accuracy and reliability of the positioning function. The first linearly polarized wave radiated from the first antenna element 1110 and having the first polarization direction 1111 may include an x-axis polarization component having a polarization direction parallel to the x-axis direction of the electronic device 11, and a y-axis polarization component having a polarization direction parallel to the y-axis direction of the electronic device 11. The second linearly polarized wave radiated from the second antenna element 1120 and having the second polarization direction 1121 may include an x-axis polarization component having a polarization direction parallel to the x-axis direction of the electronic device 11, and a y-axis polarization component having a polarization direction parallel to the y-axis direction of the electronic device 11. The third linearly polarized wave radiated from the third antenna element 1130 and having the third polarization direction 1131 may include an x-axis polarization component having a polarization direction parallel to the x-axis direction of the electronic device 11, and a y-axis polarization component having a polarization direction parallel to the y-axis direction of the electronic device 11. For example, when the positioning function is performed using the first antenna element 1110 and the second antenna element 1120 in the vertical posture of the electronic device 11, the x-axis polarization component radiated from the first antenna element 1110 may allow the first antenna element 1110 to smoothly receive the horizontally polarized wave radiated from the signal source, and the x-axis polarization component radiated from the second antenna element 1120 may allow the second antenna element 1120 to smoothly receive the horizontally polarized wave radiated from the signal source. For example, when the positioning function is performed using the first antenna element 1110 and the third antenna element 1130 in the horizontal posture of the electronic device 11, the y-axis polarization component radiated from the first antenna element 1110 may allow the first antenna element 1110 to smoothly receive the horizontally polarized wave radiated from the signal source, and the y-axis polarization component radiated from the third antenna element 1130 may allow the third antenna element 1130 to smoothly receive the horizontally polarized wave radiated from the signal source.

Figure 12:
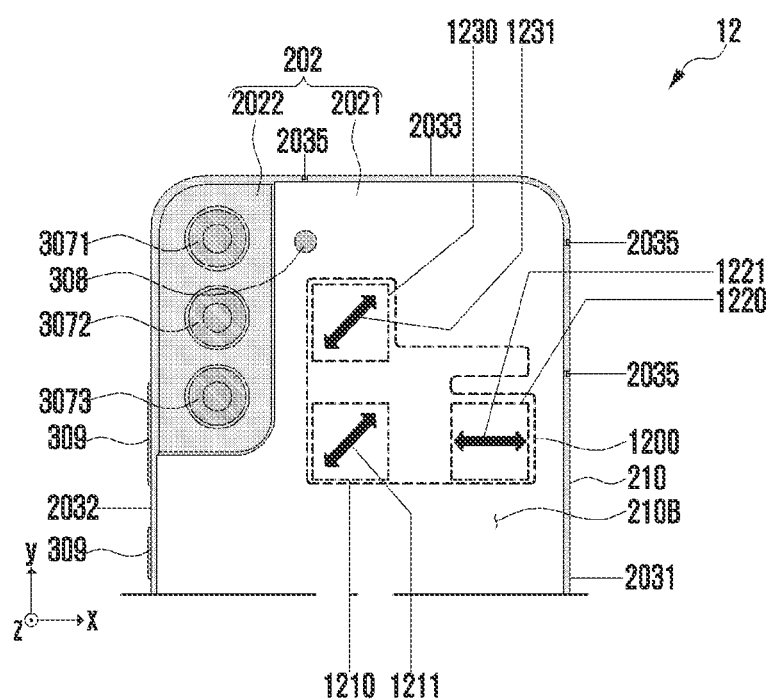
FIG. 12 is a diagram illustrating a part of the electronic device according to various embodiments.

FIG. 12 is a diagram illustrating a part of an electronic device 12 according to various embodiments.

With reference to FIG. 12, the electronic device 12 may include a second antenna structure 1200 that is substituted for the second antenna structure 5 in FIG. 6. The second antenna structure 1200 may include a first antenna element 1210, a second antenna element 1220, and a third antenna element 1230. The electronic device 12 may perform the positioning function with respect to the signal source using the time difference and the phase difference between the signal received from the first antenna element 1210 and the signal received from the second antenna element 1220 in the vertical posture. The electronic device 12 may perform the positioning function with respect to the signal source using the time difference and the phase difference between the signal received from the first antenna element 1210 and the signal received from the third antenna element 1230 in the horizontal posture. When the power is supplied, the first antenna element 1210 may radiate the first linearly polarized wave, which has a first polarization direction 1211, in the +z-axis direction of the electronic device 12 (e.g., the propagation direction of the electromagnetic wave). When the power is supplied, the second antenna element 1220 may radiate the second linearly polarized wave, which has a second polarization direction 1221, in the +z-axis direction of the electronic device 12 (e.g., the propagation direction of the electromagnetic wave). When the power is supplied, the third antenna element 1230 may radiate the third linearly polarized wave, which has a third polarization direction 1231, in the +z-axis direction of the electronic device 12 (e.g., the propagation direction of the electromagnetic wave).

According to an embodiment, any one of the first polarization direction 1211, the second polarization direction 1221, and the third polarization direction 1231 may be different from the remaining directions. For example, the first polarization direction 1211 and the third polarization direction 1231 may be an acute or obtuse angle with respect to the x-axis direction or the y-axis direction of the electronic device 12 or substantially parallel to the x-axis direction or the y-axis direction of the electronic device 12. For example, the second polarization direction 1221 may be substantially parallel to the x-axis direction of the electronic device 12.

The second antenna structure 1200 according to an embodiment may reduce a difference between the radio wave receiving efficiency in the vertical posture of the electronic device 12 and the radio wave receiving efficiency in the horizontal posture of the electronic device 12, which makes it possible to reduce an influence of the posture of the electronic device 12 that affects accuracy and reliability of the positioning function. The first linearly polarized wave radiated from the first antenna element 1210 may include an x-axis polarization component having a polarization direction parallel to the x-axis direction of the electronic device 12, and a y-axis polarization component having a polarization direction parallel to the y-axis direction of the electronic device 12. The third linearly polarized wave radiated from the third antenna element 1230 may include an x-axis polarization component having a polarization direction parallel to the x-axis direction of the electronic device 12, and a y-axis polarization component having a polarization direction parallel to the y-axis direction of the electronic device 12. For example, when the positioning function is performed using the first antenna element 1210 and the second antenna element 1220 in the vertical posture of the electronic device 12, the x-axis polarization component radiated from the first antenna element 1210 may allow the first antenna element 1210 to smoothly receive the horizontally polarized wave radiated from the signal source, and the second linearly polarized wave radiated from the second antenna element 1220 may allow the second antenna element 1220 to smoothly receive the horizontally polarized wave radiated from the signal source. For example, when the positioning function is performed using the first antenna element 1210 and the third antenna element 1230 in the horizontal posture of the electronic device 12, the y-axis polarization component radiated from the first antenna element 1210 may allow the first antenna element 1210 to smoothly receive the horizontally polarized wave radiated from the signal source, and the y-axis polarization component radiated from the third antenna element 1230 may allow the third antenna element 1230 to smoothly receive the horizontally polarized wave radiated from the signal source.

Figure 13:
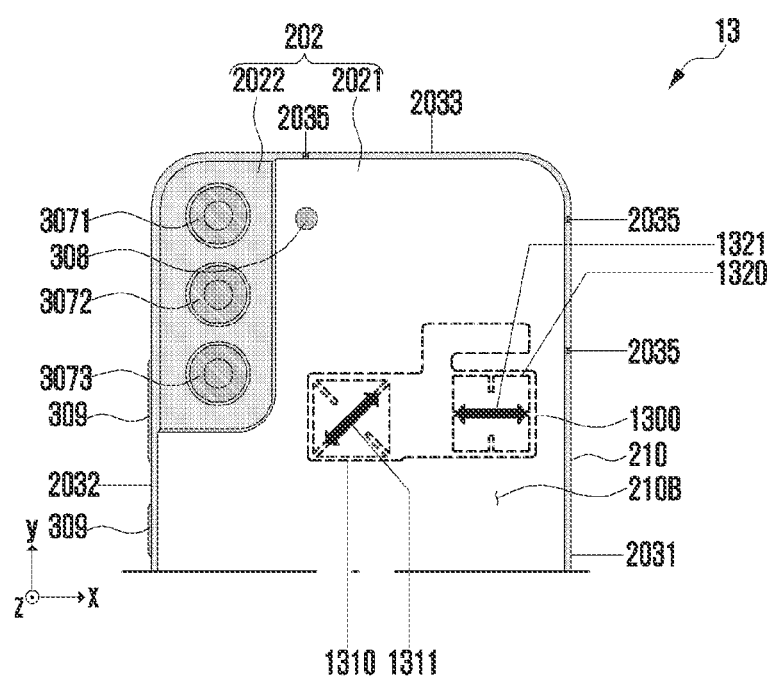
FIG. 13 is a diagram illustrating a part of the electronic device according to various embodiments.

FIG. 13 is a diagram illustrating a part of an electronic device 13 according to various embodiments.

With reference to FIG. 13, the electronic device 13 may include a second antenna structure 1300 that is substituted for the second antenna structure 5 in FIG. 6. The second antenna structure 1300 may include the first antenna element 1310 and the second antenna element 1320. When the power is supplied, the first antenna element 1310 may radiate the first linearly polarized wave, which has a first polarization direction 1311 (or oscillates in the first polarization direction 1311), in the +z-axis direction of the electronic device 13 (e.g., the propagation direction of the electromagnetic wave). When the power is supplied, the second antenna element 1320 may radiate the second linearly polarized wave, which has a second polarization direction 1321 (or oscillates the second polarization direction 1321), in the +z-axis direction of the electronic device 13 (e.g., the propagation direction of the electromagnetic wave).

According to an embodiment, the first polarization direction 1310 and the second polarization direction 1320 may be different from each other. For example, the first polarization direction 1310 may be an angle of about 45 degrees with respect to the x-axis direction of the electronic device 13, and the second polarization direction 1320 may be substantially parallel to the x-axis direction of the electronic device 13.

According to an embodiment, the second antenna structure 1300 may be capable of improving communication performance (or radio wave transmitting/receiving performance) and accuracy and reliability of the positioning function compared to a comparative example antenna structure comprising one or more patches, one or more metal antenna radiators (e.g., at least one conductive portion of the lateral member 203 in FIG. 2), or a combination thereof. Compared to the comparative example antenna structure, the second antenna structure 1300 may be capable of ensuring accuracy and quality in performing positioning with respect to a signal source even though polarized wave characteristics of a signal transmitted from the signal source vary, directions in which the electronic device is directed vary, or postures of the electronic device vary.

According to an embodiment, the first antenna element 1310 and the second antenna element 1320 may be used for polarization diversity for reducing fading. Because the second antenna element 1320 provides the second linearly polarized wave having the polarization direction parallel to the x-axis direction of the electronic device 13, it may be difficult to substantially receive the vertically polarized wave (e.g., the polarized wave in which the electric field oscillates in the vertical direction) from the signal source through the second antenna element 1320 in the vertical posture of the electronic device 13. Because the first linearly polarized wave radiated from the first antenna 1310 includes the x-axis polarization component parallel to the x-axis direction of the electronic device 13 and the y-axis polarization component parallel to the y-axis direction of the electronic device 13, the vertically polarized wave may be received from the signal source through the first antenna element 1310 in the vertical posture of the electronic device 13.

Figure 14:
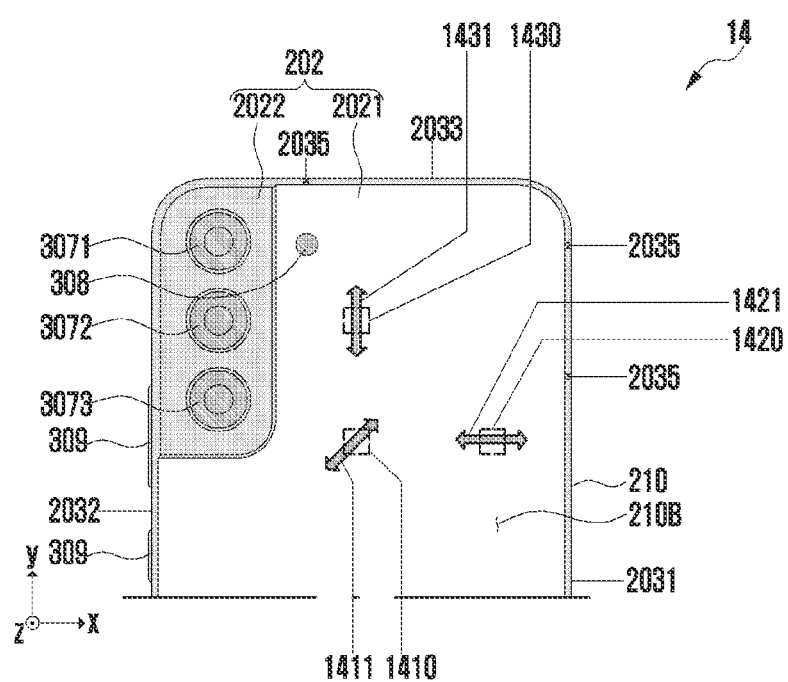
FIG. 14 is a diagram illustrating a part of the electronic device according to various embodiments.

FIG. 14 is a diagram illustrating a part of an electronic device 14 according to various embodiments.

With reference to FIG. 14, the electronic device 14 may be substituted for the second antenna structure 5 in FIG. 6 and include a first antenna element 1410, a second antenna element 1420, and a third antenna element 1430. In an embodiment, the first antenna element 1410, the second antenna element 1420, or the third antenna element 1430 may be a chip-shaped antenna element disposed on the first printed circuit board 441 (see FIG. 3). In any embodiment, the first antenna element 1410, the second antenna element 1420, or the third antenna element 1430 may be a conductive pattern disposed on the second support member 420 (see FIG. 3 or 4). For example, the first antenna element 1410, the second antenna element 1420, or the third antenna element 1430 may be a conductive pattern disposed on the non-conductive member 421 (see FIG. 5) of the second support member 420 through the LDS. When the power is supplied, the first antenna element 1410 may radiate the first linearly polarized wave, which has a first polarization direction 1411 (or oscillates in the first polarization direction 1411), in the +z-axis direction of the electronic device 14 (e.g., the propagation direction of the electromagnetic wave). When the power is supplied, the second antenna element 1420 may radiate the second linearly polarized wave, which has a second polarization direction 1421 (or oscillates the second polarization direction 1421), in the +z-axis direction of the electronic device 14 (e.g., the propagation direction of the electromagnetic wave). When the power is supplied, the third antenna element 1430 may radiate the third linearly polarized wave, which has a third polarization direction 1431 (or oscillates in the third polarization direction 1431), in the +z-axis direction of the electronic device 14 (e.g., the propagation direction of the electromagnetic wave).

According to an embodiment, it is possible to reduce a difference between the radio wave receiving efficiency in the vertical posture of the electronic device 14 and the radio wave receiving efficiency in the horizontal posture of the electronic device 14, which makes it possible to reduce an influence of the posture of the electronic device 14 that affects accuracy and reliability of the positioning function. The second polarization direction 1421 may be parallel to the x-axis direction of the electronic device 14, and the third polarization direction 1431 may be parallel to the y-axis direction of the electronic device 14. The first polarization direction 1411 may be different from the second polarization direction 1421 and the third polarization direction 1431. The first linearly polarized wave radiated from the first antenna element 1410 may include an x-axis polarization component having a polarization direction parallel to the x-axis direction (or the second polarization direction 1421) of the electronic device 14, and a y-axis polarization component having a polarization direction parallel to the y-axis direction (or the third polarization direction 1431) of the electronic device 14. For example, when the positioning function is performed using the first antenna element 1410 and the second antenna element 1420 in the vertical posture of the electronic device 14, the x-axis polarization component radiated from the first antenna element 1410 may allow the first antenna element 1410 to smoothly receive the horizontally polarized wave radiated from the signal source, and the second linearly polarized wave radiated from the second antenna element 1420 may allow the second antenna element 1420 to smoothly receive the horizontally polarized wave radiated from the signal source. For example, when the positioning function is performed using the first antenna element 1410 and the third antenna element 1430 in the horizontal posture of the electronic device 14, the y-axis polarization component radiated from the first antenna element 1410 may allow the first antenna element 1410 to smoothly receive the horizontally polarized wave radiated from the signal source, and the third linearly polarized wave radiated from the third antenna element 1430 may allow the third antenna element 1430 to smoothly receive the horizontally polarized wave radiated from the signal source.

Figure 15:
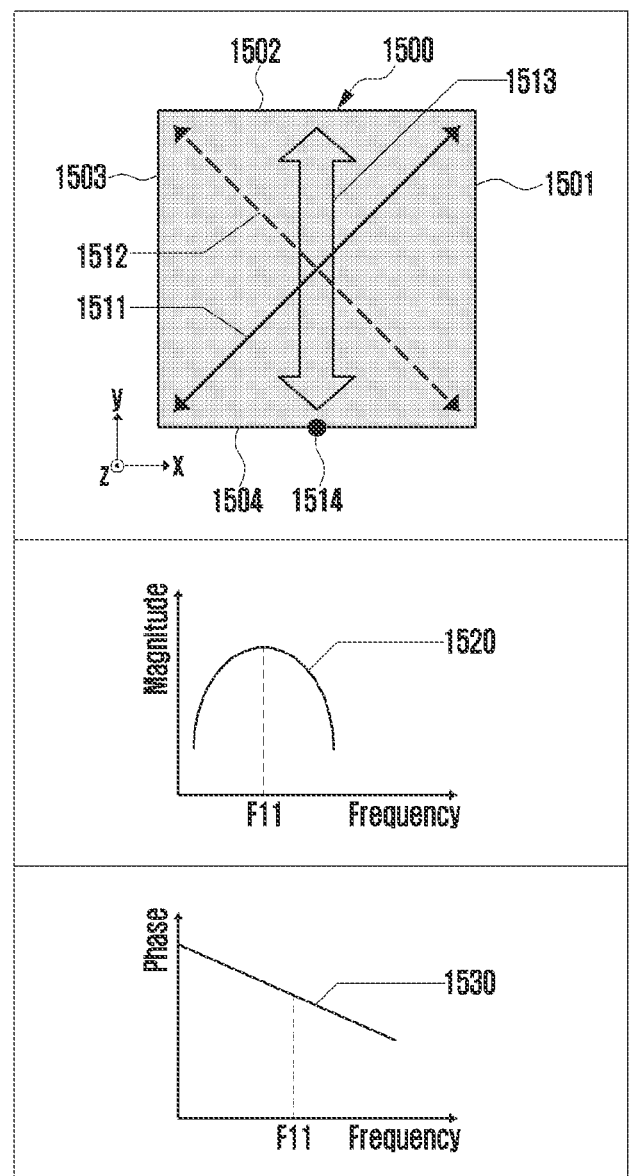
FIG. 15 is a diagram illustrating an antenna element configured to provide linearly polarized waves according to various embodiment, and graphs illustrating radiation characteristics and phase characteristics of the antenna element according to various embodiments.
Figure 16:
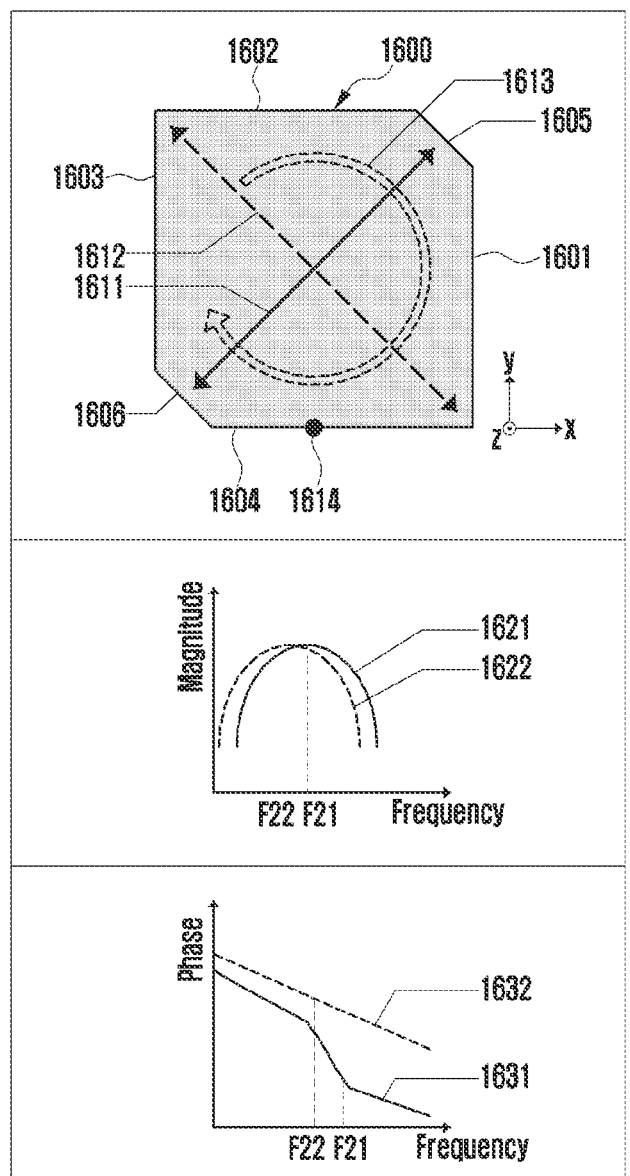
FIG. 16 is a diagram illustrating an antenna element configured to provide circularly polarized waves according to various embodiments, and graphs illustrating radiation characteristics and phase characteristics of the antenna element according to various embodiments.

FIG. 15 is a diagram illustrating an antenna element 1500 configured to provide linearly polarized waves according to various embodiments, and graphs illustrating radiation characteristics and phase characteristics of the antenna element 1500 according to various embodiments. FIG. 16 is a diagram illustrating an antenna element 1600 configured to provide circularly polarized waves (circular polarization) according to various embodiments, and graphs illustrating radiation characteristics and phase characteristics of the antenna element 1600 according to various embodiments.

With reference to FIG. 15, the antenna element 1500, which provides the linearly polarized wave, may be any one of one or more patches included in the patch antenna (e.g., the second antenna structure 5) included in the electronic device 200 in FIG. 2. The antenna element 1500 may be a flat plate substantially parallel to the x-y plane of the electronic device 200. In an embodiment, the antenna element 1500 may be a square patch including a first rim 1501, a second rim 1502, a third rim 1503, and a fourth rim 1504. The first rim 1501 and the third rim 1503 may be substantially parallel to the y-axis direction of the electronic device 200, and the second rim 1502 and the fourth rim 1504 may be substantially parallel to the x-axis direction of the electronic device 200.

According to an embodiment, the antenna element 1500 may include a power feeding part (or power feeding point) 1514 positioned on the fourth rim 1504 or positioned adjacent to the fourth rim 1504. The power feeding part 1514 may be positioned to correspond to a center of the fourth rim 1504. When the wireless communication circuit (e.g., the wireless communication module 192 in FIG. 1) provides the radiation current through the power feeding part 1514, the linearly polarized wave having the polarization direction substantially parallel to the y-axis direction of the electronic device 200 may be radiated by the symmetry (or a symmetric shape) of the antenna element 1500 of the square patch and the current path (or the distribution of surface current) on the antenna element 1500.

According to an embodiment, when the radiation current is provided to the power feeding part 1514, the linearly polarized wave, which is made by synthesizing the first polarization component (or the first diagonal polarization component) and the second polarization component (or the second diagonal polarization component), which have the polarization directions perpendicular to each other, may be radiated. For example, the first polarization component may have a first polarization direction 1511 parallel to the diagonal direction that may be an angle of 45 degrees with respect to the +x-axis direction (e.g., the positive direction of the x-axis) of the electronic device 200. The second polarization component may have a second polarization direction 1512 perpendicular to the first polarization direction 1511. Because of the symmetry of the antenna element 1500 of the square patch, a length (or a resonance length) of an electrical path corresponding to the first polarization direction 1511 on the antenna element 1500 may be substantially equal to a length of an electrical path corresponding to the second polarization direction 1512. Reference numeral '1520' indicates a graph showing resonance characteristics of the first polarization component, which oscillates in the first polarization direction 1511, and resonance characteristics of the second polarization component that oscillates in the second polarization direction 1512. Reference numeral '1530' indicates a graph showing phase characteristics of the first polarization component, which oscillates in the first polarization direction 1511, and phase characteristics of the second polarization component that oscillates in the second polarization direction 1512. The first polarization component and the second polarization component may have the same resonant frequency F11 (or the same resonance characteristics) and the same phase. The first polarization component and the second polarization component may have substantially the same amplitude. The composite wave made by synthesizing the first polarization component and the second polarization component may have a fixed amplitude in which the phases are coincident and provide the linearly polarized wave that has a polarization direction 1513 (e.g., a polarization direction parallel to the y-axis direction of the electronic device 200) having an angle of 45 degrees with respect to the first polarization direction 1511 and the second polarization direction 1512 (or oscillates in the polarization direction 1513).

The antenna element 1600 according to the embodiment in FIG. 16 is a power feeding part provided at the same position as that of the antenna element 1500 according to the embodiment in FIG. 15. The antenna element 1600 may have a shape capable of radiating the circularly polarized wave 1613 when the power is supplied. For example, the antenna element 1600 may be any one of one or more patches included in the patch antenna (e.g., the second antenna structure 5) included in the electronic device 200 in FIG. 2. The antenna element 1600 may be a flat plate substantially parallel to the x-y plane of the electronic device 200. In an embodiment, the antenna element 1600 may include a first rim 1601, a second rim 1602, a third rim 1603, a fourth rim 1604, a first truncated corner 1605, and/or a second truncated corner 1606. The antenna element 1600 in FIG. 16 may further include the first truncated corner 1605 and the second truncated corner 1606 in comparison with the antenna element 1500 in FIG. 15. The first rim 1601 and the third rim 1603 may extend straight in the y-axis direction of the electronic device 200, and the first rim 1601 may be positioned to be spaced apart from the third rim 1603 in the +x-axis direction of the electronic device 200. The second rim 1602 and the fourth rim 1604 may extend straight in the x-axis direction of the electronic device 200, and the second rim 1602 may be positioned to be spaced apart from the fourth rim 1604 in the +y-axis direction of the electronic device 200. In an embodiment, a distance by which the first rim 1601 is spaced apart from the third rim 1603 in the +x-axis direction of the electronic device 200 may be substantially equal to a distance by which the second rim 1602 is spaced apart from the fourth rim 1604 in the +y-axis direction of the electronic device 200. The first truncated corner 1605 may be a rim in the form of an oblique line that connects the first rim 1601 and the second rim 1602. The second truncated corner 1606 may be a rim in the form of an oblique line that connects the third rim 1603 and the fourth rim 1604. In an embodiment, the first truncated corner 1605 and the second truncated corner 1606 may be provided to be substantially symmetric with respect to a center of the antenna element 1600. The center of the antenna element 1600 may be a point on the antenna element 1600 positioned at substantially the same distance from the first rim 1601 and the third rim 1603 and positioned at substantially the same distance from the second rim 1602 and the fourth rim 1604. The first truncated corner 1605 may be an angle of about 135 degrees with respect to the first rim 1601 and the second rim 1602, and the second truncated corner 1606 may be an angle of about 135 degrees with respect to the third rim 1603 and the fourth rim 1604. The first truncated corner 1605 and the second truncated corner 1606, which are provided at two corners positioned at opposite sides in the diagonal direction, may allow the antenna element 1600 to radiate the substantially circularly polarized wave 1613. In various embodiments, the first truncated corner 1605 and the second truncated corner 1605 may have angles different from those in the illustrated example. When the wireless communication circuit (e.g., the wireless communication module 192 in FIG. 1) provides the radiation current through a power feeding part 1614, the circularly polarized wave may be radiated by the current path (or the distribution of surface current) on the antenna element 1600.

According to an embodiment, when the radiation current is provided to the power feeding part 1614, the circularly polarized wave 1613, which is made by synthesizing the first polarization component (or the first diagonal polarization component) and the second polarization component (or the second diagonal polarization component), may be radiated. For example, the first polarization component may have a first polarization direction 1611 parallel to the diagonal direction that at an angle of 45 degrees with respect to the +x-axis direction (e.g., the positive direction of the x-axis) of the electronic device 200. The second polarization component may have a second polarization direction 1612 perpendicular to the first polarization direction 1611. Reference numeral '1621' indicates a graph showing resonance characteristics of the first polarization component that oscillates in the first polarization direction 1611. Reference numeral '1622' indicates a graph showing resonance characteristics of the second polarization component that oscillates in the second polarization direction 1612. Reference numeral '1631' indicates a graph showing phase characteristics of the first polarization component that oscillates in the first polarization direction 1611. Reference numeral '1632' indicates a graph showing phase characteristics of the second polarization component that oscillates in the second polarization direction 1612. A length of an electrical path corresponding to the first polarization direction 1611 on the antenna element 1600 may be shorter than a length of an electrical path corresponding to the second polarization direction 1612 because of the first truncated corner 1605 and the second truncated corner 1606. Therefore, a resonant frequency F21 of the first polarization component may be higher than a resonant frequency F22 of the second polarization component, and there is a phase difference between the first polarization component and the second polarization component. The first polarization component and the second polarization component may have substantially the same amplitude. When a phase difference between the first polarization component and the second polarization component is substantially 90 degrees, the synthesis of the first polarization component and the second polarization component may provide the composite wave having characteristics of the circularly polarized wave in which an axial ratio is substantially close to 1.

Figure 17:
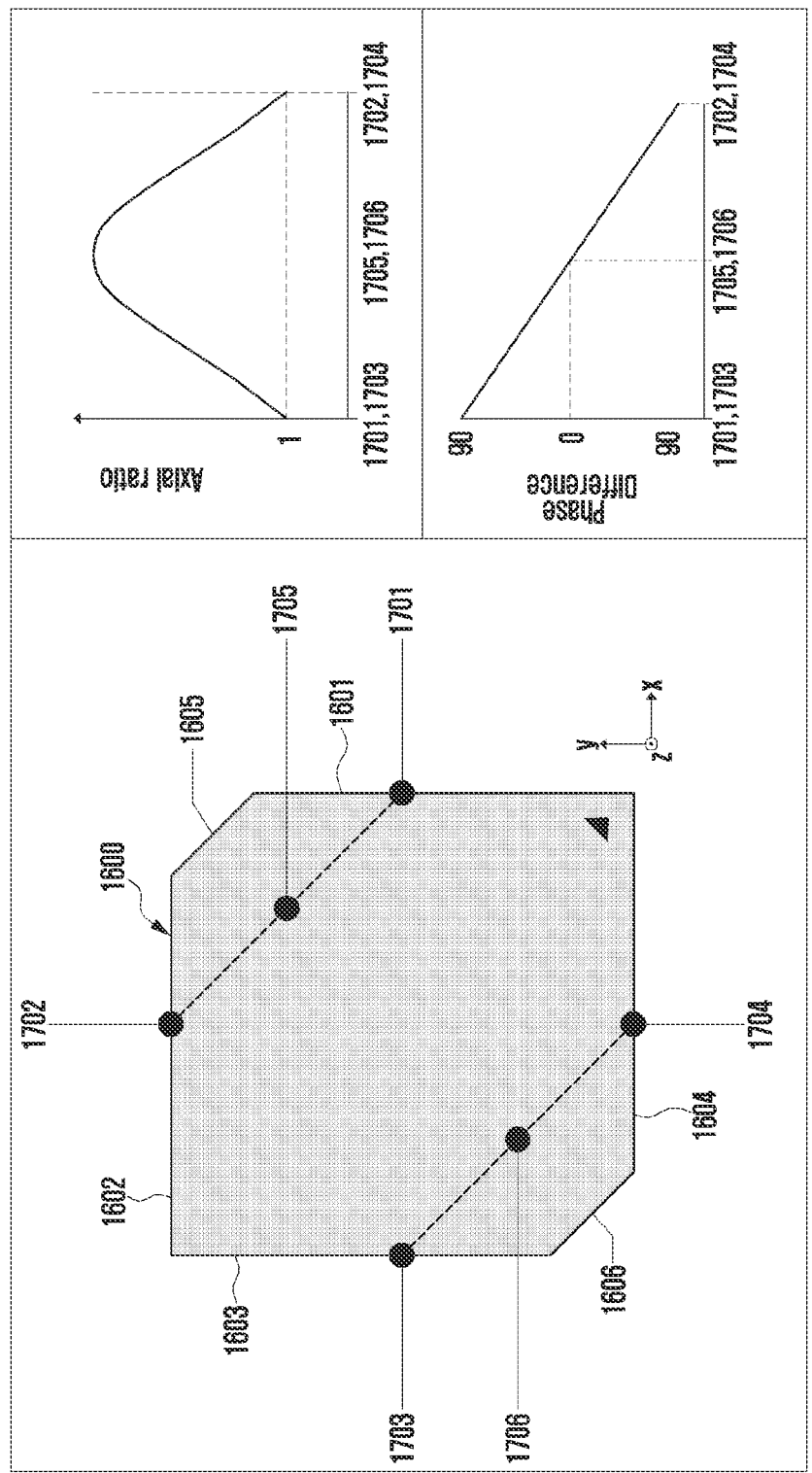
FIG. 17 includes graphs illustrating axial ratio characteristics and phase difference characteristics related to a first polarization component and a second polarization component according to the antenna element according to the embodiment in FIG. 16 and a position of a power feeding part with respect to the antenna element according to various embodiments.

FIG. 17 includes graphs illustrating axial ratio characteristics and phase difference characteristics related to a first polarization component and a second polarization component according to the antenna element 1700 according to the embodiment in FIG. 16 and a position of a power feeding part with respect to the antenna element 1700 according to various embodiments.

With reference to FIG. 17, in an embodiment, the power feeding part may be provided at a first position 1701 on the first rim 1601 or adjacent to the first rim 1601. The first position 1701 may be present at substantially the same distance from the second rim 1602 and the fourth rim 1604. The two polarization components having the polarization directions perpendicular to each other (e.g., the first polarization component having the first polarization direction 1611 and the second polarization component having the second polarization direction 1612 in FIG. 16) may have substantially the same amplitude. When the phase difference between the two polarization components perpendicular to each other is substantially 90 degrees, the synthesis of the two polarization components may provide the composite wave having LHCP (right-handed circular polarization) characteristics in which the axial ratio is substantially close to 1.

According to an embodiment, the power feeding part may be provided at a second position 1702 on the second rim 1602 or adjacent to the second rim 1602. The second position 1702 may be present at substantially the same distance from the first rim 1601 and the third rim 1603. The two polarization components having the polarization directions perpendicular to each other (e.g., the first polarization component having the first polarization direction 1611 and the second polarization component having the second polarization direction 1612 in FIG. 16) may have substantially the same amplitude. When the phase difference between the two polarization components perpendicular to each other is substantially 90 degrees, the synthesis of the two polarization components may provide the composite wave having RHCP (right-handed circular polarization) characteristics in which the axial ratio is substantially close to 1.

According to an embodiment, the power feeding part may be provided at a third position 1703 on the third rim 1603 or adjacent to the third rim 1603. The third position 1703 may be present at substantially the same distance from the second rim 1602 and the fourth rim 1604. The two polarization components having the polarization directions perpendicular to each other (e.g., the first polarization component having the first polarization direction 1611 and the second polarization component having the second polarization direction 1612 in FIG. 16) may have substantially the same amplitude. When the phase difference between the two polarization components perpendicular to each other is substantially 90 degrees, the synthesis of the two polarization components may provide the composite wave having LHCP characteristics in which the axial ratio is substantially close to 1.

According to an embodiment, the power feeding part may be provided at a fourth position 1704 on the fourth rim 1604 or adjacent to the fourth rim 1604. The fourth position 1704 may be present at substantially the same distance from the first rim 1601 and the third rim 1603. The two polarization components having the polarization directions perpendicular to each other (e.g., the first polarization component having the first polarization direction 1611 and the second polarization component having the second polarization direction 1612 in FIG. 16) may have substantially the same amplitude. When the phase difference between the two polarization components perpendicular to each other is substantially 90 degrees, the synthesis of the two polarization components may provide the composite wave having RHCP characteristics in which the axial ratio is substantially close to 1.

According to an embodiment, the power feeding part may be provided at a center 1705 of a straight line that connects the first position 1701 and the second position 1702. When the phase difference between the two polarization components having the polarization directions perpendicular to each other is substantially 0 degrees, the synthesis of the two polarization components may provide a composite wave having linearly polarized wave characteristics in which an axial ratio is substantially close to an infinite quantity.

According to an embodiment, the power feeding part may be provided at a center 1706 of a straight line that connects the third position 1703 and the fourth position 1704. When the phase difference between the two polarization components having the polarization directions perpendicular to each other is substantially 0 degrees, the synthesis of the two polarization components may provide a composite wave having linearly polarized wave characteristics in which an axial ratio is substantially close to an infinite quantity.

With reference to FIGS. 15, 16, and 17, the synthesis of the two linear polarization components having the polarization directions perpendicular to each other may provide characteristics of the linearly polarized wave or characteristics of the circularly polarized wave depending on the shape of the antenna element and the position of the power feeding part.

Figure 18:
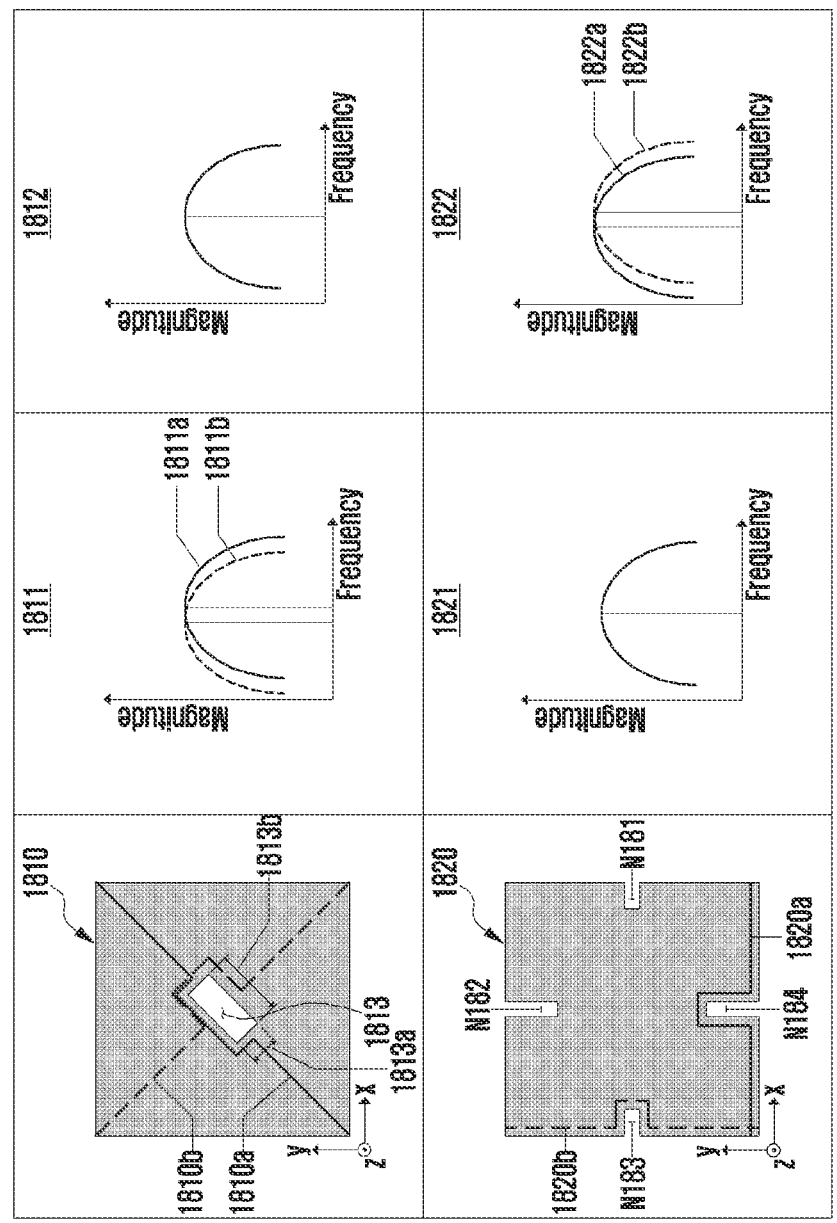
FIG. 18 includes diagrams illustrating antenna elements according to various embodiments, and graphs illustrating resonance characteristics of the antenna elements according to various embodiments.

FIG. 18 are diagrams illustrating example antenna elements according to various embodiments, and graphs illustrating resonance characteristics of the antenna elements according to various embodiments.

According to an embodiment, the two linearly polarized waves perpendicular to each other (or the linear polarization components) for providing the circularly polarized wave may be at least determined on the basis of the shape of the antenna element. With reference to FIG. 18, reference numeral '1810' is an antenna element including a rectangular opening (or a rectangular slit) 1813 provided to correspond to the center of the square patch. The rectangular opening 1813 may include a first width 1813b extending in a first diagonal direction, and a second width 1813a extending in a second diagonal direction. The rectangular opening 1813 may be positioned to correspond to a center of the antenna element 1810. The electrical path or the length (or the resonance length) of the electrical path on the antenna element 1810 may vary depending on the shape of the rectangular opening 1813. Therefore, the characteristics related to the polarized wave (e.g., the resonant frequency, the polarization direction, the axial ratio characteristics, or the phase difference characteristics) may be determined. For example, the characteristics related to the polarized wave provided by the antenna element 1810 may vary depending on ratios between a length of the first width 1813b, a length of the second width 1813a, a length of the first width 1813b, and a length of the second width 1813a. In an embodiment, based on a first diagonal polarization direction and a second diagonal polarization direction perpendicular to the first diagonal polarization direction, the polarized wave radiated from the antenna element 1810 may include a first diagonal polarization component (or the first linearly polarized wave or the first linear polarization component) having the first diagonal polarization direction, and a second diagonal polarization component (or a second linearly polarized wave or a second linear polarization component) having the second diagonal polarization direction. Reference numeral '1811' indicates a graph showing resonance characteristics 1811a of the first diagonal polarization component and resonance characteristics 1811b of the second diagonal polarization component. The first diagonal polarization component may have a resonant frequency corresponding to a length (or a resonance length) of an electrical path 1810a corresponding to the first diagonal polarization direction. The second diagonal polarization component may have a resonant frequency corresponding to a length of an electrical path 1810b corresponding to the second diagonal polarization direction. The first diagonal polarization direction is a diagonal direction between two edges positioned at opposite sides of the antenna element 1810. For example, the first diagonal polarization direction may be an angle of 45 degrees with respect to the x-axis and the y-axis of the electronic device 200. The second diagonal polarization direction is a diagonal direction between the two edges positioned at opposite sides of the antenna element 1810 and may be perpendicular to the first diagonal polarization direction. A length of the electrical path 1810a corresponding to the first diagonal polarization direction may be different from a length of the electrical path 1810b corresponding to the second diagonal polarization direction. Therefore, the first diagonal polarization component and the second diagonal polarization component may have different resonance characteristics (or resonant frequencies). The first and second diagonal polarization components having different resonance characteristics may have a phase difference of 90 degrees without having the same phase. The synthesis of the first diagonal polarization component and the second diagonal polarization component may provide the circularly polarized wave.

According to an embodiment, based on the vertical polarization direction perpendicular to the horizontal polarization direction and the horizontal polarization direction, the polarized wave radiated from the antenna element 1810 may include a horizontal polarization component having the horizontal polarization direction, and a vertical polarization component having the vertical polarization direction. Reference numeral '1812' indicates a graph showing resonance characteristics of the horizontal polarization component and resonance characteristics of the vertical polarization component. The horizontal polarization component may have a resonant frequency corresponding to a length (or a resonance length) of an electrical path corresponding to the horizontal polarization direction parallel to the x-axis direction. The vertical polarization component may have a resonant frequency corresponding to a length of an electrical path corresponding to the vertical polarization direction parallel to the y-axis direction. The length of the electrical path corresponding to the horizontal polarization direction may be substantially equal to the length of the electrical path corresponding to the vertical polarization direction. Therefore, the horizontal polarization component and the vertical polarization component may have substantially the same resonance characteristics (or resonant frequencies). The horizontal polarization component and the vertical polarization component may have substantially the same intensity (e.g., radiation intensity, radiation strength, or electric field intensity) in a selected or designated frequency band (or a frequency band in which the circularly polarized wave is generated) corresponding to the circularly polarized wave. In an embodiment, one of the horizontal polarization component and the vertical polarization component may be a dominant linearly polarized wave having relatively higher intensity than the other polarization component in a frequency band at least partially different from or wider than the selected or designated frequency band corresponding to the circularly polarized wave. The dominant polarization component of the horizontally and vertical polarization components may have a more improved gain in a relatively wide band than the other polarization component. In an embodiment, UWB may include a circular polarization (CP) working band (or a first frequency band) using the circularly polarized wave, and a linear polarization (LP) working band (or a second frequency band) using the linearly polarized wave. The dominant linearly polarized wave may be used to perform the positioning function or transmit or receive a signal in the LP frequency band. For example, the LP frequency band using the linearly polarized wave may be advantageous in ensuring accuracy and reliability when the positioning function is performed with respect to the signal source positioned at a long distance in comparison with the CP frequency band using the circularly polarized wave. Because the first diagonal polarization component (or the first linearly polarized wave or the first linear polarization component) and the second diagonal polarization component (or the second linearly polarized wave or the second linear polarization component) for the circularly polarized wave have different resonance characteristics, it may be interpreted that the dominant linearly polarized wave of the circularly polarized wave is not substantially present.

According to an embodiment, reference numeral '1820' indicates an antenna element of a square patch including notches N181, N182, N183, and N184 provided in the rims. On the basis of the shapes of the notches N181, N182, N183, and N184, the electrical path or the length (or the resonance length) of the electrical path on the antenna element 1810 may vary, and as a result, the characteristics (e.g., the resonant frequency, the polarization direction, the axial ratio characteristics, or the phase difference characteristics) related to the polarized wave provided by the antenna element 1820 may be determined. In an embodiment, based on the vertical polarization direction perpendicular to the horizontal polarization direction and the horizontal polarization direction, the polarized wave radiated from the antenna element 1810 may include a horizontal polarization component having the horizontal polarization direction, and a vertical polarization component having the vertical polarization direction. Reference numeral '1822' indicates a graph showing resonance characteristics of the horizontal polarization component and resonance characteristics of the vertical polarization component. The horizontal polarization component may have a resonant frequency corresponding to a length of an electrical path 1820a corresponding to the horizontal polarization direction parallel to the x-axis direction. The vertical polarization component may have a resonant frequency corresponding to a length (or a resonance length) of an electrical path 1820b corresponding to the vertical polarization direction parallel to the y-axis direction. The length of the electrical path corresponding to the horizontal polarization direction may be different from the length of the electrical path corresponding to the vertical polarization direction. Therefore, the horizontal polarization component and the vertical polarization component may have substantially different resonance characteristics (or resonant frequencies). The horizontal and vertical polarization components having different resonance characteristics may have a phase difference of 90 degrees without having the same phase. The synthesis of the vertical polarization component and the horizontal polarization component may provide the circularly polarized wave.

According to an embodiment, based on a first diagonal polarization direction and a second diagonal polarization direction perpendicular to the first diagonal polarization direction, the polarized wave radiated from the antenna element 1820 may include a first diagonal polarization component (or the first linearly polarized wave or the first linear polarization component) having the first diagonal polarization direction, and a second diagonal polarization component (or a second linearly polarized wave or a second linear polarization component) having the second diagonal polarization direction. Reference numeral '1821' indicates a graph showing resonance characteristics of the first diagonal polarization component and resonance characteristics of the second diagonal polarization component. The first diagonal polarization component may have a resonant frequency corresponding to a length (or a resonance length) of an electrical path corresponding to the first diagonal polarization direction. The second diagonal polarization component may have a resonant frequency corresponding to a length of an electrical path corresponding to the second diagonal polarization direction. The first diagonal polarization direction is a diagonal direction between two edges positioned at opposite sides of the antenna element 1820. For example, the first diagonal polarization direction may be an angle of 45 degrees with respect to the x-axis and the y-axis of the electronic device 200. The second diagonal polarization direction is a diagonal direction between the two edges positioned at opposite sides of the antenna element 1820 and may be perpendicular to the first diagonal polarization direction. The length of the electrical path corresponding to the first diagonal polarization direction may be substantially equal to the length of the electrical path corresponding to the second diagonal polarization direction. Therefore, the first diagonal polarization component and the second diagonal polarization component may have substantially the same resonance characteristics (or resonant frequencies). The first diagonal polarization component and the second diagonal polarization component may have substantially the same intensity (e.g., radiation intensity, radiation strength, or electric field intensity) in a selected or designated frequency band (or a frequency band in which the circularly polarized wave is generated) corresponding to the circularly polarized wave. In an embodiment, one of the first diagonal polarization component and the second diagonal polarization component may be a dominant linearly polarized wave having relatively higher intensity than the other diagonal polarization component in a frequency band different from the selected or designated frequency band corresponding to the circularly polarized wave. The dominant diagonal polarization component of the first and second diagonal polarization components may have a more improved gain in a relatively wide band than the other diagonal polarization component. Because the horizontal and vertical polarization components for the circularly polarized wave have different resonance characteristics, it may be interpreted that the dominant linearly polarized wave of the circularly polarized waves is not substantially present.

FIG. 19 includes a table 1930 illustrating radiation characteristics related to the antenna element 1810 according to the antenna element 1810 in FIG. 18 according to various embodiments and a power feeding position of the antenna element 1810, and a graph 1940 illustrating gains for respective polarized waves when power is supplied to a first position 1901 or a third position 1903 according to various embodiments.

With reference to FIG. 19, the power feeding part may be provided at the first position 1901 on a first rim 1801 or adjacent to the first rim 1801, a second position 1902 on a second rim 1802 or adjacent to the second rim 1802, third position 1903 on a third rim 1803 or adjacent to the third rim 1803, or a fourth position 1904 on a fourth rim 1804 or adjacent to the fourth rim 1804. The first position 1901 or the third position 1903 may be present at substantially the same distance from the second rim 1802 and the fourth rim 1804. The second position 1902 or the fourth position 1904 may be present at substantially the same distance from the first rim 1801 and the third rim 1803. When the radiation current is provided to the power feeding part, the first diagonal polarization component, which oscillates in a first polarization direction 1910 parallel to the first diagonal direction, and the second diagonal polarization component, which oscillates in a second polarization direction 1920 parallel to the second diagonal direction, may have different resonance characteristics. For example, the first diagonal polarization component, which oscillates in the first polarization direction 1910, may have a lower resonant frequency than the second diagonal polarization component that oscillates in the second polarization direction 1920.

According to an embodiment, reference numeral '1941' indicates a graph showing a gain related to the LHCP in case that the power feeding part is provided at the first position 1901 or the third position 1903. Reference numeral '1942' indicates a graph showing a gain related to the RHCP in case that the power feeding part is provided at the first position 1901 or the third position 1903. Reference numeral '1951' indicates a graph showing a gain related to the horizontal polarization component (e.g., the polarized wave that oscillates in the polarization direction parallel to the x-axis of the electronic device 200) in case that the power feeding part is provided at the first position 1901 or the third position 1903. Reference numeral '1952' indicates a graph showing a gain related to the vertical polarization component (e.g., the polarized wave that oscillates in the polarization direction parallel to the y-axis of the electronic device 200) in case that the power feeding part is provided at the first position 1901 or the third position 1903. Reference numeral '1961' indicates a graph showing a gain related to the first diagonal polarization component (e.g., the polarized wave that oscillates in the polarization direction at an angle of 45 degrees with respect to the x-axis and the y-axis of the electronic device 200) in case that the power feeding part is provided at the first position 1901 or the third position 1903. Reference numeral '1962' indicates a graph showing a gain related to the second diagonal polarization component that oscillates in the polarization direction perpendicular to the polarization direction of the first diagonal polarization component in case that the power feeding part is provided at the first position 1901 or the third position 1903. In case that the power feeding part is provided at the first position 1901 or the third position 1903, the synthesis of the first diagonal polarization component and the second diagonal polarization component may provide the circularly polarized wave having LHCP characteristics. In case that the power feeding part is provided at the first position 1801 or the third position 1803, the horizontal polarization component may be provided as a dominant linearly polarized wave.

According to an embodiment, in case that the power feeding part is provided at the second position 1902 or the fourth position 1904, the synthesis of the first diagonal polarization component and the second diagonal polarization component may provide the circularly polarized wave having RHCP characteristics. In case that the power feeding part is provided at the second position 1902 or the fourth position 1904, the vertical polarization component (e.g., the polarized wave that oscillates in the polarization direction parallel to the y-axis of the electronic device 200) may be provided as a dominant linearly polarized wave.

According to various embodiments, the polarization direction of the dominant linearly polarized wave may be variously implemented in accordance with the power feeding position of the antenna element 1810 without being limited to the illustrated example.

According to various embodiments, the characteristics of the polarized wave radiated from the antenna element may be variously on the basis of the resonance characteristics and the phase characteristics provided by the two linear polarization components having the polarization directions perpendicular to each other depending on the shape of the antenna element and the power feeding position without being limited to the illustrated example.

Figure 20:
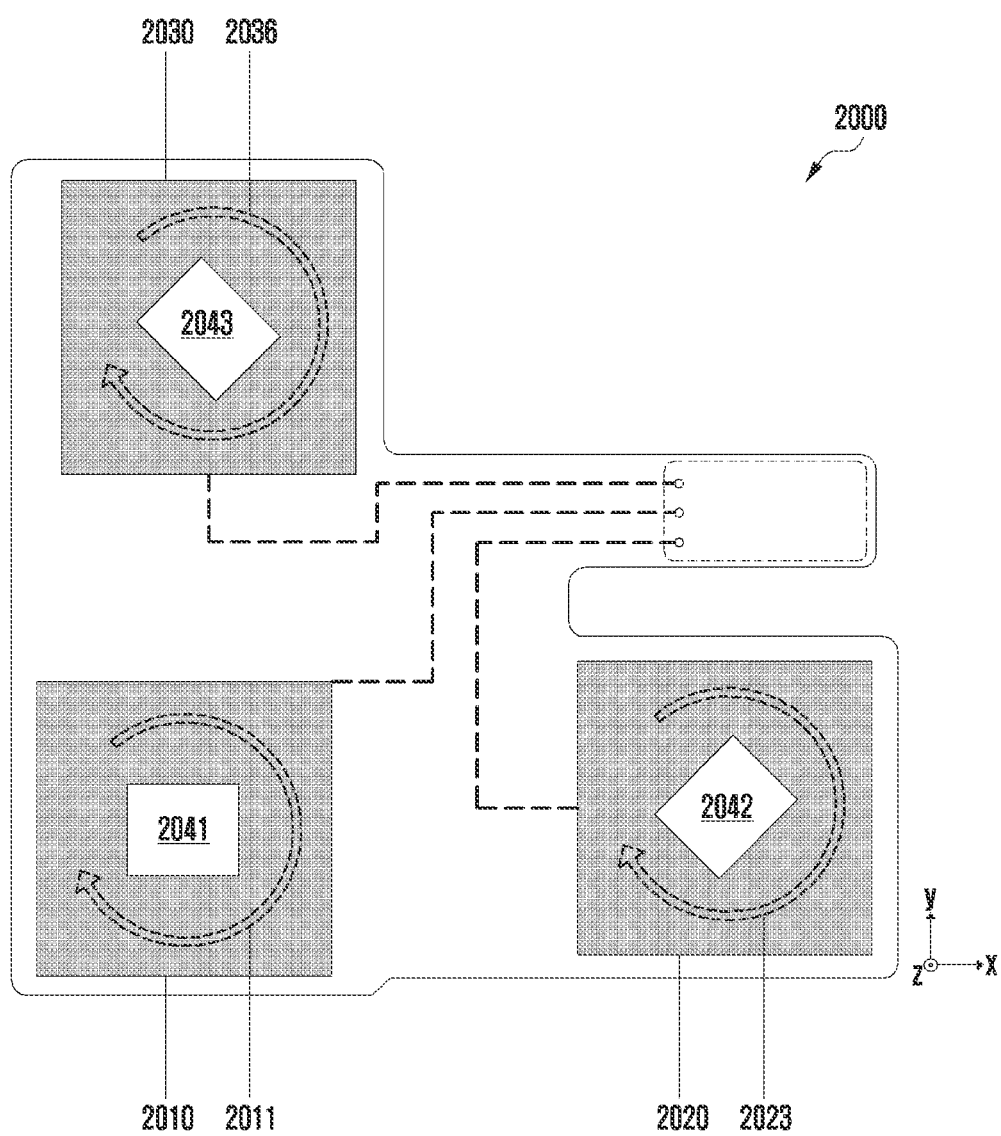
FIG. 20 is a diagram illustrating an example second antenna structure according to various embodiments.

FIG. 20 is a diagram illustrating an example second antenna structure 2000 according to various embodiments.

With reference to FIG. 20, in an embodiment, the second antenna structure 2000 may include a first antenna element 2010, a second antenna element 2020, and a third antenna element 2030. When the power is supplied, the first antenna element 2010 may radiate a circularly polarized wave 2011. The shape and the power feeding position of the first antenna element 2010 may be provided to radiate the circularly polarized wave 2011. When the power is supplied, the second antenna element 2020 may radiate a circularly polarized wave 2023. The shape and the power feeding position of the second antenna element 2020 may be provided to radiate the circularly polarized wave 2023. When the power is supplied, the third antenna element 2030 may radiate a circularly polarized wave 2036. The shape and the power feeding position of the third antenna element 2030 may be provided to radiate the circularly polarized wave 2036. The first antenna element 2010 may have a shape including an opening (or slit) 2041 positioned to correspond to a center of the first antenna element 2010. However, the first antenna element 2010 may have various other shapes without being limited to the above-mentioned shape. The second antenna element 2020 may have a shape including an opening (or slit) 2042 positioned to correspond to a center of the second antenna element 2020. However, the second antenna element 2020 may have various other shapes without being limited to the above-mentioned shape. The third antenna element 2030 may have a shape including an opening (or slit) 2043 positioned to correspond to a center of the third antenna element 2030. However, the third antenna element 2030 may have various other shapes without being limited to the above-mentioned shape. In various embodiments, the circularly polarized wave may be configured to be radiated on the basis of the shape of the antenna element and the power feeding position on the antenna element. In an embodiment, the electronic device including the second antenna structure 2000 may perform the positioning function by receiving, from the signal source, the linearly polarized wave or the circularly polarized wave with the selected or designated frequency band (e.g., the CP working band of the UWB) through the first antenna element 2010 and the second antenna element 2020 in the vertical posture. The electronic device may perform the positioning function by receiving, from the signal source, the linearly polarized wave or the circularly polarized wave with the selected or designated frequency band (e.g., the CP working band of the UWB) through the first antenna element 2010 and the third antenna element 2030 in the vertical posture.

According to an embodiment, when the power is supplied, the first antenna element 2010 may radiate a first dominant linearly polarized wave having relatively high electric field intensity or gain in a frequency band (e.g., the LP working band of the UWB) at least partially different from or wider than the selected or designated frequency band corresponding to the circularly polarized wave 2011. When the power is supplied, the second antenna element 2020 may radiate a second dominant linearly polarized wave having relatively high electric field intensity or gain in a frequency band (e.g., the LP working band of the UWB) at least partially different from or wider than the selected or designated frequency band corresponding to the circularly polarized wave 2023. When the power is supplied, the third antenna element 2030 may radiate a third dominant linearly polarized wave having relatively high electric field intensity or gain in a frequency band (e.g., the LP working band of the UWB) at least partially different from or wider than the selected or designated frequency band corresponding to the circularly polarized wave 2036.

According to an embodiment, at least two of the polarization direction of the first dominant linearly polarized wave, the polarization direction of the second dominant linearly polarized wave, and the polarization direction of the third dominant linearly polarized wave may be substantially identical to one another. For example, among the first dominant linearly polarized wave, the second dominant linearly polarized wave, and the third dominant linearly polarized wave, at least two or more linearly polarized waves having the same polarization direction may be used to perform the positioning function or transmit or receive a signal in the LP working band between the CP working band using the circularly polarized wave of the UWB and the LP working band using the linearly polarized wave.

Figure 21:
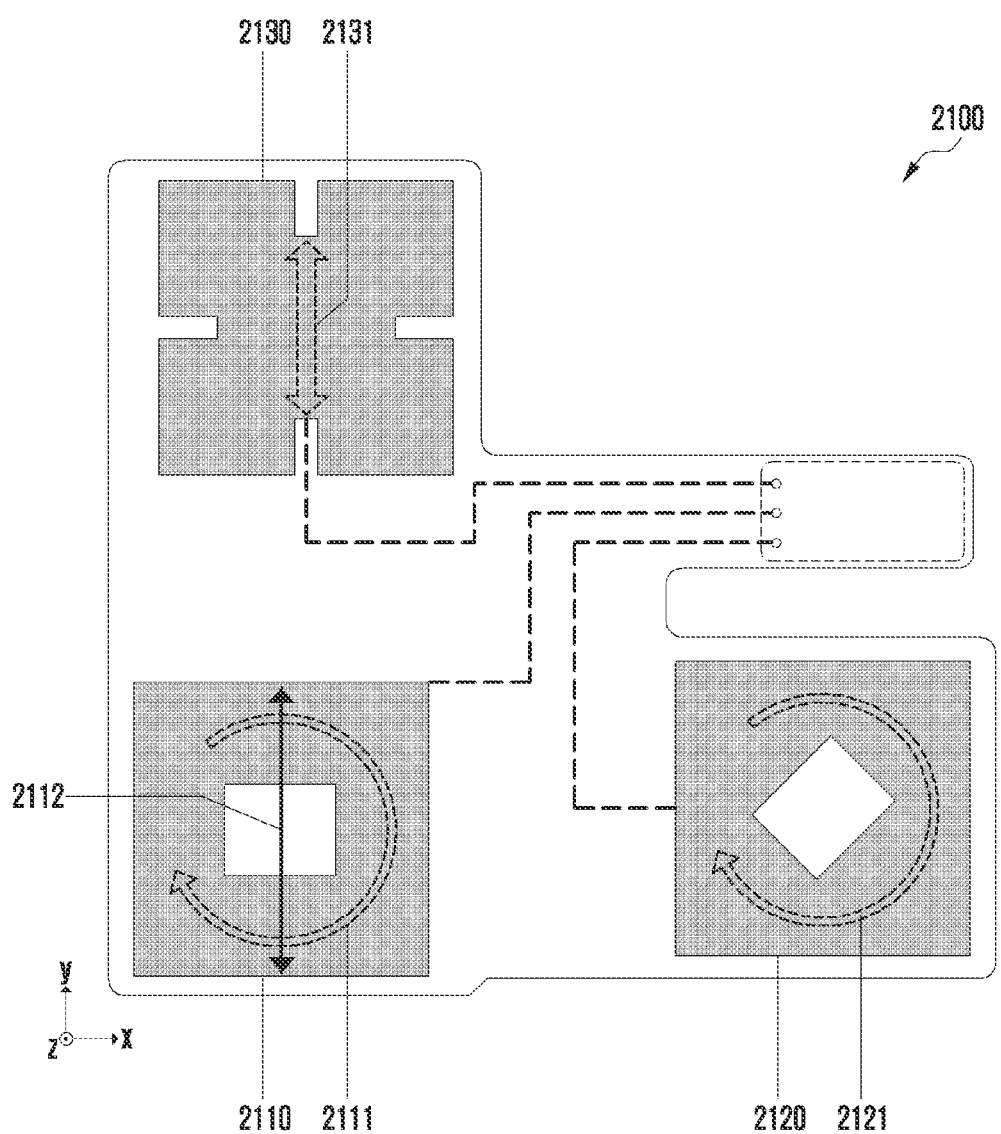
FIG. 21 is a diagram illustrating an example second antenna structure according to various embodiments.

FIG. 21 is a diagram illustrating an example second antenna structure 2100 according to various embodiments.

With reference to FIG. 21, in an embodiment, the second antenna structure 2100 may include a first antenna element 2110, a second antenna element 2120, and a third antenna element 2130. When the power is supplied, the first antenna element 2110 may radiate a circularly polarized wave 2111. The shape and the power feeding position of the first antenna element 2110 may be provided to radiate the circularly polarized wave 2111. When the power is supplied, the second antenna element 2120 may radiate a circularly polarized wave 2121. The shape and the power feeding position of the second antenna element 2120 may be provided to radiate the circularly polarized wave 2121. When the power is supplied, the third antenna element 2130 may radiate a linearly polarized wave. The shape and the power feeding position of the third antenna element 2130 may be provided to radiate the linearly polarized wave. In an embodiment, the electronic device including the second antenna structure 2100 may perform the positioning function by receiving, from the signal source, the linearly polarized wave or the circularly polarized wave with the selected or designated frequency band (e.g., the CP working band of the UWB) through the first antenna element 2110 and the second antenna element 2120 in the vertical posture. The electronic device may perform the positioning function by receiving, from the signal source, the linearly polarized wave with the selected or designated frequency band (e.g., the LP working band of the UWB) through the first antenna element 2110 and the third antenna element 2130 in the vertical posture.

According to an embodiment, when the power is supplied, the first antenna element 2110 may radiate a dominant linearly polarized wave having relatively high electric field intensity or gain in a frequency band (e.g., the LP working band of the UWB) at least partially different from or wider than the selected or designated frequency band corresponding to the circularly polarized wave 2111. A polarization direction 2112 of the dominant linearly polarized wave radiated from the first antenna element 2110 may be substantially parallel to a polarization direction 2131 of the linearly polarized wave radiated from the third antenna element 2130. In an embodiment, the polarization directions 2112 and 2131 may be substantially parallel to the y-axis direction of the electronic device. Because the polarization directions 2112 and 2131 are parallel to each other, it is possible to ensure accuracy and reliability of the positioning function using the first antenna element 2110 and the third antenna element 2130.

Figure 22:
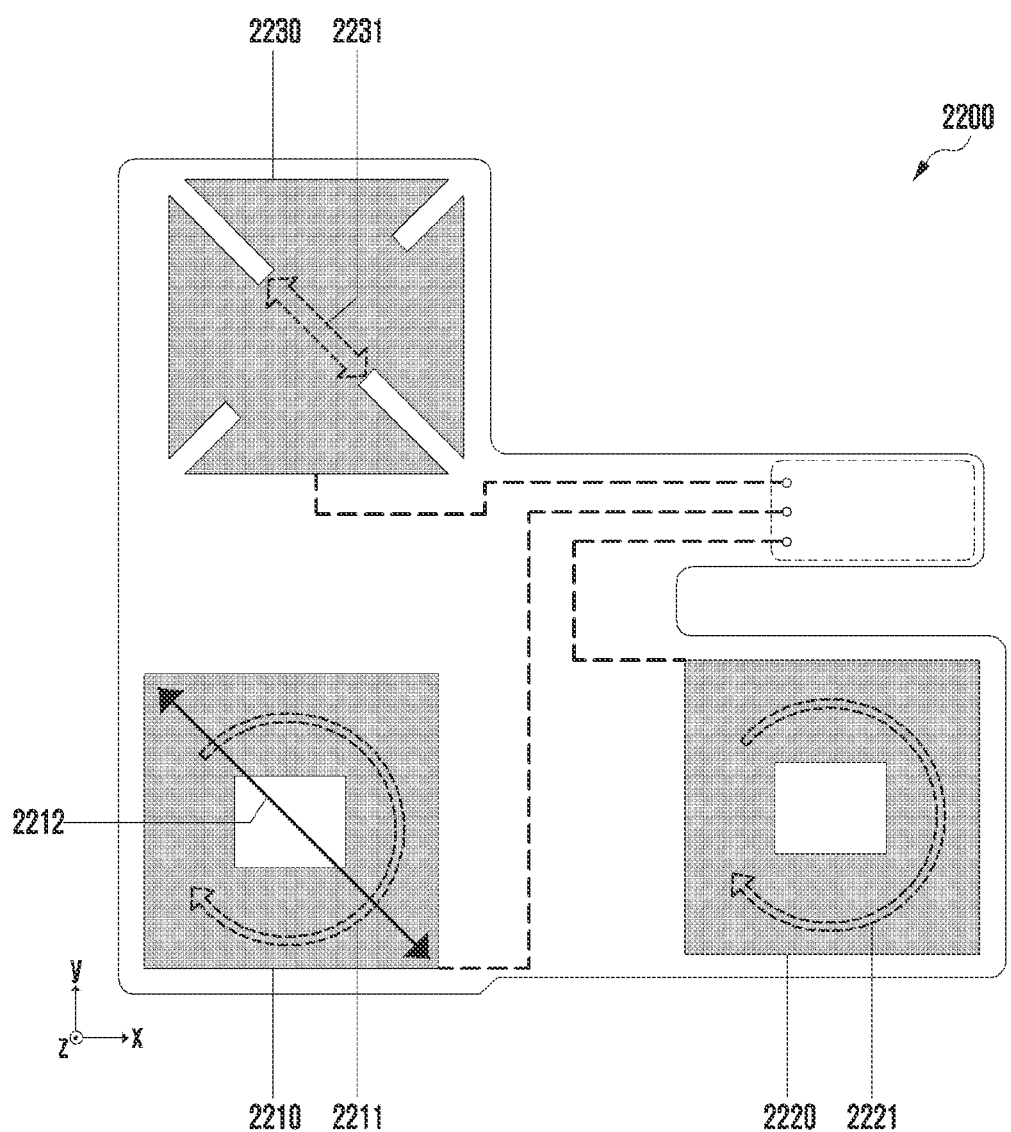
FIG. 22 is a diagram illustrating an example second antenna structure according to various embodiments.

FIG. 22 is a diagram illustrating an example second antenna structure 2200 according to various embodiments.

With reference to FIG. 22, in an embodiment, the second antenna structure 2200 may include a first antenna element 2210, a second antenna element 2220, and a third antenna element 2230. When the power is supplied, the first antenna element 2210 may radiate a circularly polarized wave 2211. The shape and the power feeding position of the first antenna element 2210 may be provided to radiate the circularly polarized wave 2211. When the power is supplied, the second antenna element 2220 may radiate a circularly polarized wave 2221. The shape and the power feeding position of the second antenna element 2220 may be provided to radiate the circularly polarized wave 2221. When the power is supplied, the third antenna element 2230 may radiate a linearly polarized wave. The shape and the power feeding position of the third antenna element 2230 may be provided to radiate the linearly polarized wave. In an embodiment, the electronic device including the second antenna structure 2200 may perform the positioning function by receiving, from the signal source, the linearly polarized wave or the circularly polarized wave with the selected or designated frequency band (e.g., the CP working band of the UWB) through the first antenna element 2210 and the second antenna element 2220 in the vertical posture. The electronic device may perform the positioning function by receiving, from the signal source, the linearly polarized wave with the selected or designated frequency band (e.g., the LP working band of the UWB) through the first antenna element 2210 and the third antenna element 2230 in the vertical posture.

According to an embodiment, when the power is supplied, the first antenna element 2210 may radiate a dominant linearly polarized wave having relatively high electric field intensity or gain in a frequency band (e.g., the LP working band of the UWB) at least partially different from or wider than the selected or designated frequency band corresponding to the circularly polarized wave 2211. A polarization direction 2212 of the dominant linearly polarized wave radiated from the first antenna element 2210 may be substantially parallel to a polarization direction 2231 of the linearly polarized wave radiated from the third antenna element 2230. In an embodiment, the polarization directions 2212 and 2231 may not be parallel to the x-axis direction and the y-axis direction of the electronic device. Because the polarization directions 2212 and 2231 are parallel to each other, it is possible to ensure accuracy and reliability of the positioning function using the first antenna element 2210 and the third antenna element 2230.

According to an example embodiment of the disclosure, the electronic device (e.g., the electronic device 200 in FIG. 2) may include a housing (e.g., the housing 210 in FIG. 2). The electronic device may include an antenna array (e.g., the antenna array AR in FIG. 5) including a plurality of antenna elements (e.g., the first antenna element ①, the second antenna element ②, and the third antenna element ③ in FIG. 5) positioned in the internal space of the housing. The electronic device may include a wireless communication circuit (e.g., the wireless communication module 192 in FIG. 1) configured to perform communication with an outside of the electronic device through the antenna array. Among the plurality of antenna elements, the first antenna element may radiate a first polarized wave. Among the plurality of antenna elements, the second antenna element may radiate a second polarized wave in which an electric field oscillates in a direction at least partially different from the direction of the first polarized wave.

According to an example embodiment of the disclosure, the first polarized wave may be a first linearly polarized wave in which the electric field oscillates in the first polarization direction. The second polarized wave may be a second linearly polarized wave in which the electric field oscillates in the second polarization direction at an acute or obtuse angle with respect to the first polarization direction.

According to an example embodiment of the disclosure, one of the first and second polarized waves may be the linearly polarized wave, and the other polarized wave may be the circularly polarized wave.

According to an example embodiment of the disclosure, the first polarized wave may include a circularly polarized wave included in the first frequency band, and a dominant first linearly polarized wave having relatively high electric field intensity in the second frequency band at least partially different from or wider than the first frequency band. The second polarized wave may be a second linearly polarized wave. The first linearly polarized wave and the second linearly polarized wave may have the same polarization direction in which the electric field oscillates.

According to an example embodiment of the disclosure, the first polarized wave may include a first circularly polarized wave included in the first frequency band, and a dominant first linearly polarized wave having relatively high electric field intensity in the second frequency band at least partially different from or wider than the first frequency band. The second polarized wave may include a second circularly polarized wave included in the first frequency band, and a dominant second linearly polarized wave having relatively high electric field intensity in the second frequency band. The first linearly polarized wave and the second linearly polarized wave may have the same polarization direction in which the electric field oscillates.

According to an example embodiment of the disclosure, the first polarized wave may be a first linearly polarized wave in which the electric field oscillates in the first polarization direction. The second polarized wave may be a second linearly polarized wave in which the electric field oscillates in the second polarization direction at an acute or obtuse angle with respect to the first polarization direction. Among the plurality of antenna elements, the third antenna element may radiate a third linearly polarized wave in which an electric field oscillates in the third polarization direction. The third polarization direction may be an acute or obtuse angle with respect to the first polarization direction and be different from the second polarization direction.

According to an example embodiment of the disclosure, the second polarization direction and the third polarization direction may be perpendicular to each other.

According to an example embodiment of the disclosure, the second polarization direction and the third polarization direction may be an acute or obtuse angle.

According to an example embodiment of the disclosure, the antenna array may be disposed on a plane positioned in the internal space of the housing. The first antenna element and the second antenna element may be aligned in a direction of a first axis of a plane. The first antenna element and the third antenna element may be aligned in a direction of a second axis perpendicular to the first axis.

According to an example embodiment of the disclosure, one or more elements of the plurality of antenna elements may include first and third rims extending while being spaced apart from each other, and second and fourth rims extending in parallel with each other while being spaced apart from each other by a distance between the first and third rims, the second and fourth rims being perpendicular to the first and third rims.

According to an example embodiment of the disclosure, any antenna element of the plurality of antenna elements may include a first notch provided at the first rim, a second notch provided at the second rim, a third notch provided at the third rim, and a fourth notch provided at the fourth rim. The first notch, the second notch, the third notch, and the fourth notch may be arranged at an angle of 90 degrees based on the center of the antenna element. The first notch and the third notch may be provided symmetrically with respect to the center of the antenna element. The second notch and the fourth notch may be provided symmetrically with respect to the center of the antenna element.

According to an example embodiment of the disclosure, any antenna element among the plurality of antenna elements may include a first notch provided at a first edge at which the first rim and the second rim meet, a second notch provided at a second edge at which the second rim and the third rim meet, a third notch provided at a third edge at which the third rim and the fourth rim meet, and a fourth notch provided at a fourth edge at which the first rim and the fourth rim meet. The first notch, the second notch, the third notch, and the fourth notch may be arranged at an angle of 90 degrees based on the center of the antenna element. The first notch and the third notch may be provided symmetrically with respect to the center of the antenna element. The second notch and the fourth notch may be provided symmetrically with respect to the center of the antenna element.

According to an example embodiment of the disclosure, any antenna element among the plurality of antenna elements may further include a first truncated corner provided at an edge at which the first rim and the second rim meet, and a second truncated corner provided at an edge at which the third rim and the fourth rim meet. The first truncated corner and the second truncated corner may be provided symmetrically with respect to the center of the antenna element.

According to an example embodiment of the disclosure, any antenna element among the plurality of antenna elements may further include an opening provided to correspond to the center of the antenna element.

According to an example embodiment of the disclosure, the first polarized wave and the second polarized wave may be included in the ultra-wideband (UWB).

According to an example embodiment of the disclosure, the electronic device may further include a processor electrically connected to the wireless communication circuit. The processor may be configured to perform positioning function with respect to the signal source based pm the signals received from the signal source through the plurality of antenna elements.

According to an example embodiment of the disclosure, the electronic device may further include a printed circuit board including a first surface directed in a first direction, and a second surface directed in a second direction opposite to the first direction. The plurality of antenna elements may be disposed in the printed circuit board and provided on the first surface or provided closer to the first surface than the second surface.

According to an example embodiment of the disclosure, the plurality of antenna elements may include a conductive pattern disposed on a non-conductor positioned in the internal space of the housing.

According to an example embodiment of the disclosure, the plurality of antenna elements may include a chip-shaped antenna element disposed on the printed circuit board positioned in the internal space of the housing.

According to an example embodiment of the disclosure, the electronic device may further include a display module positioned in the internal space of the housing. The housing may provide a front surface of the electronic device, a rear surface of the electronic device, and a side surface of the electronic device. The display module may be visible through the front surface. The antenna array may be positioned between the display module and the rear surface and disposed on one surface parallel to the rear surface.

According to an example embodiment of the disclosure, an electronic device include antenna array (e.g., the antenna array AR in FIG. 5), a wireless communication circuit (e.g., the wireless communication circuit 192 in FIG. 1), and a processor (e.g., the processor in FIG. 1). The antenna array may include a plurality of antenna elements (e.g., the first antenna element ①, the second antenna element ②, and the third antenna element ③ in FIG. 5). The wireless communication circuit may be configured to perform communication with a signal source outside of the electronic device through the antenna array in an UWB. The processor may be electrically connected to the wireless communication circuit. The wireless communication circuit may be configured to simultaneously radiate a first linearly polarized wave through a first antenna element (e.g., the first antenna element ① in FIG. 6) among the plurality of antenna elements and a second linearly polarized wave through a second antenna element (e.g., the second antenna element ② in FIG. 6) among the plurality of antenna elements. An electric field of the first linearly polarized wave may oscillate in a first direction (e.g., the first polarization direction 61 in FIG. 6). An electric field of the second linearly polarized wave may oscillate in a second direction (e.g., the second polarization direction 62 in FIG. 6) at an acute angle with respect to the first direction. The processor may be configured to perform a positioning function with respect to the signal source based on a difference between arrival times of signals received from the signal source through the first and second antenna elements.

According to an example embodiment of the disclosure, the wireless communication circuit may be configured to radiate a third linearly polarized wave through a third antenna element (e.g., the third antenna element ③ in FIG. 6) among the plurality of antenna elements simultaneously with the first and second linearly polarized waves. An electric field of the third linearly polarized wave may oscillate in a third direction (e.g., the third polarization direction 63 in FIG. 6) different to the first direction or the second direction. The processor may be configured to perform the positioning function with respect to the signal source based further on a difference between arrival times of signals received from the signal source through the first and third antenna elements (e.g., the first and second antenna elements ① and ③ in FIG. 6).

According to an example embodiment of the disclosure, the second direction (e.g., the second polarization direction 62 in FIG. 6) and the third direction (e.g., the third polarization direction 63 in FIG. 6) may be perpendicular to each other.

According to an example embodiment of the disclosure, the first direction (e.g., the first polarization direction 1211 in FIG. 12) may be parallel to the third direction (e.g., the third polarization direction 1231 in FIG. 12).

According to an example embodiment of the disclosure, the antenna array may be disposed on a plane positioned inside of the electronic device. The first antenna element (e.g., the first antenna element ① in FIG. 6) and the second antenna element (e.g., the second antenna element ② in FIG. 6) may be aligned in a direction of a first axis of the plane. The first antenna element and the third antenna element (e.g., the third antenna element ③ in FIG. 6) may be aligned in a direction of a second axis perpendicular to the first axis.

According to an example embodiment of the disclosure, the plurality of antenna elements (e.g., the first antenna element ①, the second antenna element ②, and the third antenna element ③ in FIG. 6) may include a plurality of patches disposed on a printed circuit board (e.g., the printed circuit board 50 in FIG. 5) positioned inside of the electronic device.

According to an example embodiment of the disclosure, the plurality of antenna elements may include a plurality of conductive patterns disposed on a non-conductor positioned inside of the electronic device.

According to an example embodiment of the disclosure, the plurality of antenna elements may include a plurality of chip-shaped antenna elements (e.g., the first antenna element 1410, the second antenna element 1420, and the third antenna element in FIG. 14) disposed on a printed circuit board positioned inside of the electronic device.

According to an example embodiment of the disclosure, the electronic device may include a housing (e.g., the housing 210 in FIG. 2) forming at least a portion of a front surface of the electronic device, at least a portion of a rear surface of the electronic device, and at least a portion of a side surface of the electronic device. The antenna array may be configured to radiate through electromagnetic waves through the front surface.

According to an example embodiment of the disclosure, the electronic device may include a housing (e.g., the housing 210 in FIG. 2) forming at least a portion of a front surface of the electronic device, at least a portion of a rear surface of the electronic device, and at least a portion of a side surface of the electronic device. The antenna array may be configured to radiate through electromagnetic waves through the rear surface.

According to an example embodiment of the disclosure, at least antenna element of the plurality of antenna elements may include first and third rims (e.g., the first and third rims E1 and E3 in FIG. 6) extending in parallel with each other while being spaced apart from each other. The at least antenna element of the plurality of antenna elements may include second and fourth rims (e.g., the second and fourth rims E2 and E4 in FIG. 6) extending in parallel with each other while being spaced apart from each other by a distance between the first and third rims. The second and fourth rims may be perpendicular to the first and third rims.

According to an example embodiment of the disclosure, the at least one antenna element may include a first notch (e.g., the fifth notch N5 in FIG. 6) provided at the first rim (e.g., the fifth rim E5 in FIG. 6), a second notch (e.g., the sixth notch N6 in FIG. 6) provided at the second rim (e.g., the sixed rim E6 in FIG. 6), a third notch (e.g., the seventh notch N7 in FIG. 6) provided at the third rim (e.g., the seventh rim E7 in FIG. 6), and a fourth notch (e.g., the eighth notch N8 in FIG. 6) provided at the fourth rim (e.g., the eighth rim E8 in FIG. 6). The first notch, the second notch, the third notch, and the fourth notch may be arranged at an angle of 90 degrees with respect to a center (e.g., the second center C2 in FIG. 6) of the at least one antenna element. The first notch and the third notch may be provided symmetrically with respect to the center of the at least one antenna element. The second notch and the fourth notch may be provided symmetrically with respect to the center of the at least one antenna element.

According to an example embodiment of the disclosure, the at least one antenna element may include a first notch (e.g., the first notch N1 in FIG. 6) provided at a first edge at which the first rim (e.g., the first rim E1 in FIG. 6) and the second rim (e.g., the second rim E2 in FIG. 6) meet. The at least one antenna element may include a second notch (e.g., the second notch N2 in FIG. 6) provided at a second edge at which the second rim and the third rim (e.g., the third rim E3 in FIG. 6) meet. The at least one antenna element may include a third notch (e.g., the third notch N3 in FIG. 6) provided at a third edge at which the third rim and the fourth rim (e.g., the fourth rim E4 in FIG. 6) meet. The at least one antenna element may include a fourth notch (e.g., the fourth notch N4 in FIG. 6) provided at a fourth edge at which the first rim and the fourth rim meet. The first notch, the second notch, the third notch, and the fourth notch may be arranged by an angle of 90 degrees with respect to a center (e.g., the first center C1 in FIG. 6) of the at least one antenna element. The first notch and the third notch may be provided symmetrically with respect to the center of the at least one antenna element. The second notch and the fourth notch may be provided symmetrically with respect to the center of the at least one antenna element.

According to an example embodiment of the disclosure, an electronic device may include an antenna array, a wireless communication circuit (e.g., the wireless communication module 192 in FIG. 1), and a processor (e.g., the processor in FIG. 1). The antenna array may include a plurality of antenna elements. The wireless communication circuit may be configured to perform communication with a signal source outside of the electronic device through the antenna array in the UWB. The processor may be electrically connected to the wireless communication circuit. The wireless communication circuit may be configured to simultaneously radiate a first circularly polarized wave (e.g., the circularly polarized wave 2111 in FIG. 21) and a first linearly polarized wave through a first antenna element (e.g., the first antenna element 2110 in FIG. 21) among the plurality of antenna and a second linearly polarized wave through a second antenna element (e.g., the third antenna element 2130 in FIG. 21) among the plurality of antenna elements. The first circularly polarized may be included in a first frequency band of the UWB. The first linearly polarized wave and the second linearly polarized wave may be included in a second frequency band of the UWB at least partially different from or wider than first frequency band. The first linearly polarized wave may have more dominant electric field in the second frequency band than the first circularly polarized wave (e.g., the circularly polarized wave 2111). The first linearly polarized wave and the second linearly polarized wave may have a same polarization direction (e.g., the polarization directions 2112 and 2131 in FIG. 21) in which an electric field oscillates. The processor may be configured to perform a positioning function with respect to the signal source using the first linearly polarized wave and the second linearly polarized wave in the second frequency band.

According to an example embodiment of the disclosure, the wireless communication circuit may be configured to radiate a second circularly polarized wave (e.g., the circularly polarized wave 2121 in FIG. 21) through a third antenna element (e.g., the second antenna element 2120 in FIG. 21) among the plurality of antenna elements simultaneously with the first circularly polarized wave (e.g., the circularly polarized wave 2111) and the first linearly polarized wave. The processor may be configured to perform the positioning function with respect to the signal source using the first circularly polarized wave and the second circularly polarized wave in the first frequency band.

According to an example embodiment of the disclosure, the antenna array may be disposed on a plane positioned inside of the electronic device. The first antenna element (e.g. the first antenna element 2110 in FIG. 21) and the second antenna element (e.g., the third antenna element 2130) may be aligned in a direction of a first axis of the plane. The first antenna element and the third antenna element (e.g., the second antenna element 2120 in FIG. 21) may be aligned in a direction of a second axis perpendicular to the first axis.

According to an example embodiment of the disclosure, the plurality of antenna elements may include a plurality of conductive patterns disposed on a printed circuit board or non-conductor positioned inside of the electronic device.

According to an example embodiment of the disclosure, the plurality of antenna elements may include a plurality of chip-shaped antenna elements disposed on a printed circuit board positioned inside of the electronic device.

According to an example embodiment of the disclosure, the first antenna element (e.g. the antenna element 1600 in FIG. 16) may include first and third rims (e.g., the first and third rims 1601 and 1603 in FIG. 16) extending in parallel with each other while being spaced apart from each other. The first antenna element may include second and fourth rims (e.g., the second and fourth rims 1602 and 1604 in FIG. 16) extending in parallel with each other while being spaced apart from each other by a distance between the first and third rims. The second and fourth rims may be perpendicular to the first and third rims. The first antenna element may include a first truncated corner (e.g., the first truncated corner 1605 in FIG. 16) provided at an edge at which the first rim and the second rim meet. The first antenna element may include a second truncated corner (e.g., the second truncated corner 1606 in FIG. 16) provided at an edge at which the third rim and the fourth rim meet. The first truncated corner and the second truncated corner may be provided symmetrically with respect to a center of the first antenna element.

According to an example embodiment of the disclosure, the first antenna element (e.g., the first antenna element 2010 in FIG. 20) may include an opening (e.g., the opening 2041 in FIG. 20) corresponding to a center of the first antenna element.

Embodiments disclosed in the disclosure and the drawings are provided as examples for explaining the technical contents and aiding in understanding the disclosure, but are not intended to limit the scope of the disclosure. Accordingly, the scope of the the disclosure should be interpreted as including alterations or modifications in addition to the disclosed embodiments. In addition, it will be understood that any of the embodiment(s) described herein may be used in conjunction with any other embodiment(s) described herein.

What is claimed is:

1. An electronic device comprising:
   an antenna array comprising a plurality of antenna elements;
   a wireless communication circuit configured to perform communication with a signal source outside of the electronic device through the antenna array in an ultra-wideband (UWB); and
   a processor electrically connected to the wireless communication circuit,
   wherein the wireless communication circuit is configured to simultaneously radiate a first linearly polarized wave through a first antenna element among the plurality of antenna elements and a second linearly polarized wave through a second antenna element among the plurality of antenna elements,
   wherein an electric field of the first linearly polarized wave oscillates in a first direction, and wherein an electric field of the second linearly polarized wave oscillates in a second direction at an acute angle with respect to the first direction, and
   wherein the processor is configured to perform a positioning function with respect to the signal source based on a difference between arrival times of signals received from the signal source through the first and second antenna elements.

2. The electronic device of claim 1, wherein the wireless communication circuit is configured to radiate a third linearly polarized wave through a third antenna element among the plurality of antenna elements simultaneously with the first and second linearly polarized waves,
 wherein an electric field of the third linearly polarized wave oscillates in a third direction different to the first direction or the second direction, and
 wherein the processor is configured to perform the positioning function with respect to the signal source based further on a difference between arrival times of signals received from the signal source through the first and third antenna elements.

3. The electronic device of claim 2, wherein the second direction and the third direction are perpendicular to each other.

4. The electronic device of claim 2, wherein the first direction is parallel to the second direction.

5. The electronic device of claim 2, wherein the antenna array is disposed on a plane positioned inside of the electronic device,
 wherein the first antenna element and the second antenna element are aligned in a direction of a first axis of the plane, and
 wherein the first antenna element and the third antenna element are aligned in a direction of a second axis perpendicular to the first axis.

6. The electronic device of claim 1, further comprising:
 wherein the plurality of antenna elements comprises a plurality of patches disposed on a printed circuit board positioned inside of the electronic device.

7. The electronic device of claim 1, wherein the plurality of antenna elements comprises a plurality of conductive patterns disposed on a non-conductor positioned inside of the electronic device.

8. The electronic device of claim 1, wherein the plurality of antenna elements comprises a plurality of chip-shaped antenna elements disposed on a printed circuit board positioned inside of the electronic device.

9. The electronic device of claim 1, further comprising a housing forming at least a portion of a front surface of the electronic device, at least a portion of a rear surface of the electronic device, and at least a portion of a side surface of the electronic device,
 wherein the antenna array is configured to radiate through electromagnetic waves through the front surface.

10. The electronic device of claim 1, further comprising a housing forming at least a portion of a front surface of the electronic device, at least a portion of a rear surface of the electronic device, and at least a portion of a side surface of the electronic device,
 wherein the antenna array is configured to radiate through electromagnetic waves through the rear surface.

11. The electronic device of claim 1, wherein at least antenna element of the plurality of antenna elements comprise:
 first and third rims extending in parallel with each other while being spaced apart from each other; and
 second and fourth rims extending in parallel with each other while being spaced apart from each other by a distance between the first and third rims, the second and fourth rims being perpendicular to the first and third rims.

12. The electronic device of claim 11, wherein the at least one antenna element comprises:
 a first notch provided at the first rim, a second notch provided at the second rim, a third notch provided at the third rim, and a fourth notch provided at the fourth rim,
 wherein the first notch, the second notch, the third notch, and the fourth notch are arranged at an angle of 90 degrees with respect to a center of the at least one antenna element,
 wherein the first notch and the third notch are provided symmetrically with respect to the center of the at least one antenna element, and
 wherein the second notch and the fourth notch are provided symmetrically with respect to the center of the at least one antenna element.

13. The electronic device of claim 11, wherein the at least one antenna element comprises:
 a first notch provided at a first edge at which the first rim and the second rim meet;
 a second notch provided at a second edge at which the second rim and the third rim meet;
 a third notch provided at a third edge at which the third rim and the fourth rim meet; and
 a fourth notch provided at a fourth edge at which the first rim and the fourth rim meet,
 wherein the first notch, the second notch, the third notch, and the fourth notch are arranged by an angle of 90 degrees with respect to a center of the at least one antenna element,
 wherein the first notch and the third notch are provided symmetrically with respect to the center of the at least one antenna element, and
 wherein the second notch and the fourth notch provided symmetrically with respect to the center of the at least one antenna element.

14. An electronic device comprising:
 an antenna array comprising a plurality of antenna elements;
 a wireless communication circuit configured to perform communication with a signal source outside of the electronic device through the antenna array in an ultra-wideband (UWB); and
 a processor electrically connected to the wireless communication circuit,
 wherein the wireless communication circuit is configured to simultaneously radiate a first circularly polarized wave and a first linearly polarized wave through a first antenna element among the plurality of antenna and a second linearly polarized wave through a second antenna element among the plurality of antenna elements,
 wherein the first circularly polarized is included in a first frequency band of the UWB,
 wherein the first linearly polarized wave and the second linearly polarized wave is included in a second frequency band of the UWB at least partially different from or wider than first frequency band,
 wherein the first linearly polarized wave has more dominant electric field in the second frequency band than the first circularly polarized wave,
 wherein the first linearly polarized wave and the second linearly polarized wave have a same polarization direction in which an electric field oscillates, and
 wherein the processor is configured to perform a positioning function with respect to the signal source using the first linearly polarized wave and the second linearly polarized wave in the second frequency band.

15. The electronic device of claim 14, wherein the wireless communication circuit is configured to radiate a second circularly polarized wave through a third antenna element among the plurality of antenna elements simultaneously with the first circularly polarized wave and the linearly polarized wave, and wherein the processor is configured to perform the positioning function with respect to the signal source using the first circularly polarized wave and the second circularly polarized wave in the first frequency band.

16. The electronic device of claim 14, wherein the antenna array is disposed on a plane positioned inside of the electronic device, wherein the first antenna element and the second antenna element are aligned in a direction of a first axis of the plane, and wherein the first antenna element and the third antenna element are aligned in a direction of a second axis perpendicular to the first axis.

17. The electronic device of claim 14, further comprising:

wherein the plurality of antenna elements comprises a plurality of conductive patterns disposed on a printed circuit board or non-conductor positioned inside of the electronic device.

18. The electronic device of claim 14, wherein the plurality of antenna elements comprises a plurality of chip-shaped antenna elements disposed on a printed circuit board positioned inside of the electronic device.

19. The electronic device of claim 14, wherein the first antenna element comprise:

first and third rims extending in parallel with each other while being spaced apart from each other;

second and fourth rims extending in parallel with each other while being spaced apart from each other by a distance between the first and third rims, the second and fourth rims being perpendicular to the first and third rims;

a first truncated corner provided at an edge at which the first rim and the second rim meet;

a second truncated corner provided at an edge at which the third rim and the fourth rim meet, wherein the first truncated corner and the second truncated corner are provided symmetrically with respect to a center of the first antenna element.

20. The electronic device of claim 14, wherein the first antenna element comprises an opening corresponding to a center of the first antenna element.

\* \* \* \* \*